United States Patent
Cai et al.

(10) Patent No.: US 12,492,197 B2
(45) Date of Patent: Dec. 9, 2025

(54) 3,5-DISUBSTITUTED PYRAZOLE COMPOUNDS AS KINASE INHIBITORS AND USES THEREOF

(71) Applicant: IMPACT THERAPEUTICS (SHANGHAI), INC, Shanghai (CN)

(72) Inventors: Sui Xiong Cai, Shanghai (CN); Ye Edward Tian, Shanghai (CN); Xiaozhu Wang, Nanjing (CN)

(73) Assignee: Impact Therapeutics (Shanghai), Inc, Shanghai (CN)

( * ) Notice: Subject to any disclaimer, the term of this patent is extended or adjusted under 35 U.S.C. 154(b) by 951 days.

(21) Appl. No.: 17/640,564

(22) PCT Filed: Sep. 3, 2020

(86) PCT No.: PCT/CN2020/113233
§ 371 (c)(1),
(2) Date: Mar. 4, 2022

(87) PCT Pub. No.: WO2021/043208
PCT Pub. Date: Mar. 11, 2021

(65) Prior Publication Data
US 2022/0356181 A1    Nov. 10, 2022

(30) Foreign Application Priority Data

Sep. 6, 2019 (CN) .......................... 201910845684.8
Mar. 6, 2020 (CN) .......................... 202010155001.9

(51) Int. Cl.
| | | |
|---|---|---|
| C07D 417/14 | (2006.01) | |
| C07D 401/14 | (2006.01) | |
| C07D 403/12 | (2006.01) | |
| C07D 403/14 | (2006.01) | |
| C07D 413/14 | (2006.01) | |

(52) U.S. Cl.
CPC ......... *C07D 417/14* (2013.01); *C07D 401/14* (2013.01); *C07D 403/12* (2013.01); *C07D 403/14* (2013.01); *C07D 413/14* (2013.01)

(58) Field of Classification Search
None
See application file for complete search history.

(56) References Cited

U.S. PATENT DOCUMENTS

| | | |
|---|---|---|
| 7,776,865 B2 | 8/2010 | Paruch et al. |
| 10,010,547 B2 * | 7/2018 | Boyle ................. A61K 45/06 |
| 10,874,670 B2 | 12/2020 | Cai et al. |
| 2009/0048301 A1 | 2/2009 | Chen et al. |

FOREIGN PATENT DOCUMENTS

| | | |
|---|---|---|
| CN | 101321760 A | 12/2008 |
| CN | 106170288 A | 11/2016 |
| CN | 108601781 A | 9/2018 |
| CN | 110167941 A | 8/2019 |
| WO | WO-2002070494 A1 | 9/2002 |
| WO | WO-2003010444 A1 | 2/2003 |
| WO | WO-2004052280 A2 | 6/2004 |
| WO | WO-2005004818 A2 | 1/2005 |
| WO | WO-2005009435 A1 | 2/2005 |
| WO | WO-2005072733 A1 | 8/2005 |
| WO | WO-2006014359 A2 | 2/2006 |
| WO | WO-2006021002 A2 | 2/2006 |
| WO | WO-2006105262 A1 | 10/2006 |
| WO | WO-2010077758 A1 | 7/2010 |
| WO | WO-2012064548 A1 | 5/2012 |
| WO | WO-2015120390 A1 | 8/2015 |

(Continued)

OTHER PUBLICATIONS

Bao, S., et al., "Glioma stem cells promote radioresistance by preferential activation of the DNA damage response," Nature 444(7120):756-60, Springer, Germany (Dec. 2006).
Carrassa, L., et al., "Unleashing Chk1 in cancer therapy," Cell Cycle 10(13):2121-8, Taylor & Francis, United Kingdom (Jul. 2011).
International Search Report and Written Opinion for International Application PCT/CN2020/113233, China National Intellectual Property Administration, China, mailed on Nov. 20, 2020, 7 pages.
Lobrich, M., et al., "The impact of a negligent G2/M checkpoint on genomic instability and cancer induction," Nat Rev Cancer 7(11):861-9, Springer, Germany (Nov. 2007).
Rackman, M.D., et al., "Discovery of high affinity inhibitors of Leishmania donovani N-myristoyltransferas," MedChemComm 6(10):1761-1766, Royal Society of Chemistry, United Kingdom (Aug. 2015).
Sanchez, Y., et al., "Conservation of the Chk1 checkpoint pathway (Continued)

*Primary Examiner* — Adam C Milligan
*Assistant Examiner* — Jason M Nolan
(74) *Attorney, Agent, or Firm* — Sterne, Kessler, Goldstein & Fox P.L.L.C.

(57) ABSTRACT

Compounds represented by Formula I in which $A_0$-$A_2$, $R_0$-$R_6$, L, Z and Q are defined herein. The compounds of Formula I are CHK 1 inhibitors. Therefore, the compounds can be used to treat diseases, disorders and conditions associated with continuous activation of CHK1 or with high internal DNA damage or injury during DNA replication, such as cancers.

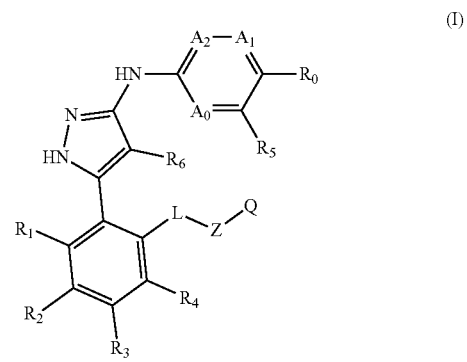

20 Claims, No Drawings

(56) References Cited

FOREIGN PATENT DOCUMENTS

WO   WO-2017132928 A1   8/2017

OTHER PUBLICATIONS n mammals: linkage of DNA damage to Cdk regulation through Cdc25," Science 277(5331):1497-501, American Association for the Advancement of Science, United States (Sep. 1997).
Yu, Z., et al., "Discovery of pyridyl-based inhibitors of Plasmodium falciparum N-myristoy ltransferase," MedChemComm 6(10):1767-1772, Royal Society of Chemistry, United Kingdom (Aug. 2015).
Janetka, J.W., and Ashwell, S., "Checkpoint kinase inhibitors: a review of the patent literature," Expert Opin Ther Pat 19(2):165-197, Taylor and Francis Ltd., United Kingdom (Feb. 2009).

* cited by examiner

3,5-DISUBSTITUTED PYRAZOLE COMPOUNDS AS KINASE INHIBITORS AND USES THEREOF

TECHNICAL FIELD

This disclosure is in the field of pharmaceutical chemistry. In particular, this disclosure relates to 3,5-disubstituted pyrazole compounds, and their uses as therapeutically effective kinase inhibitors and anticancer agents.

BACKGROUND

The growth and proliferation of eukaryotic cells go through a process referred to as mitosis to divide to two daughter cells with identical genetic information of the mother cell. Such a cell proliferation and division process is called cell cycle. The cell cycle consists of four phases: G1 phase in which a great deal of proteins, RNAs and the like are synthesized to prepare cell for DNA synthesis; S phase in which DNAs are replicated; G2 phase as the preparation stage before the mitosis, in this phase cell will make sure that the DNA replication is accurate; and M phase in which mitosis takes place. To ensure the accuracy and integrity of genetic materials during replication, cells are equipped with complex and precise signal pathways including DNA repair, cell cycle checkpoints and apoptosis to monitor DNA damage and respond accordingly. The network of these signal pathways is called DNA-damage-response (DDR) pathway.

When DNA damage occurs, in addition to DNA repair mechanism is activated cell cycle checkpoints are also activated, which includes G1/S checkpoint, Intra-S or S checkpoint and G2/M checkpoint to prevent cell from entering mitosis (Lobrich M et al. Nature reviews Cancer 2007, 7 (11): 861-869). In the process of responding DNA damage, DDR pathway is activated and a series of complex mechanisms mediate the detection and repair of the damaged DNA. Cell cycle checkpoint kinase CHK1 and CHK2 play very important roles in DDR pathway.

CHK1 protein, a serine/threonine kinase (Sanchez Y et al., Science, 1997, 277(5331): 1497-1501), is a core component of cell cycle regulation especially the G2/M checkpoint ATR-CHK1-CDC25C axis. When a DNA damage signal is recognized ATR is activated, ATR in turn phosphorylates CHK1 at multiple serine sites to activate CHK1. The activated CHK1 further phosphorylates downstream CDC25 and causes CDC25 degradation. This degradation reduces the activation of CDK1 and CDK2 by CDC25 and the inactivation of CDK1 and CDK2 inhibits cell cycle process and results in cell survive after repairing DNA damage (Carrassa L, et al., Cell Cycle 2011, 10(13): 2121-2128). Therefore, targeting CHK1 to inhibit its activity interferes cell cycle checkpoint and DNA repair, which allows unrepaired and damaged DNA to accumulate and eventually lead to cell death.

CHK1 protein kinase is highly expressed in various cancer cells including breast cancer, colon cancer, liver cancer and gastric cancer. The insensitivity or resistance of some cancer cells to chemotherapy, radiotherapy and other anticancer agents is often associated with the over activation of CHK1 (Bao S et al., Nature 2006, 444 (7120): 756-760). One of the hot areas in anticancer research is to regulate cell cycle checkpoint such as inhibiting CHK1 kinase to promote cancer cell apoptosis. This is the scientific foundation to explore CHK1 inhibitors as anti-cancer agents.

Several CHK1 kinase inhibitors with various structures have been disclosed. For example, WO03/10444 and WO2005/072733 have disclosed aryl/heteroaryl urea compounds as CHK1 kinase inhibitors; WO02/070494, WO2006/021002, WO2006/105262 and WO2006/014359 have disclosed substituted urea compounds as CHK1 kinase inhibitors; WO2005/009435, WO2010/077758, WO2012/064548, WO2015/120390 and WO2017/132928 have disclosed substituted pyrazole compounds as CHK1 kinase inhibitors.

However, novel compounds that can be used as potential inhibitors of CHK1 and are beneficial to cancer treatment are still needed.

SUMMARY

The disclosure provides novel 3,5-disubstituted pyrazole compounds of Formulae I, IIa, IIb, III and IV or pharmaceutically acceptable salts, geometric isomers, enantiomers, diastereoisomers, racemates, solvates, hydrates or prodrugs thereof, as kinase inhibitors, especially as CHK1 kinase inhibitors.

The disclosure also provides pharmaceutical compositions comprising an effective amount of the compounds of Formula I, IIa, IIb, III or IV or pharmaceutically acceptable salts, geometric isomers, enantiomers, diastereoisomers, racemates, solvates, hydrates or prodrugs thereof, for the treatment of cancer.

In a particular embodiment, the pharmaceutical composition may also comprise one or more pharmaceutically acceptable carriers or diluters, for the treatment of cancer.

In a particular embodiment, the pharmaceutical composition may also comprise at least one known anticancer agent or pharmaceutically acceptable salts thereof, for the treatment of cancer.

The disclosure is also directed to methods for the preparation of novel compounds of Formulae I, IIa, IIb, III and IV or pharmaceutically acceptable salts, geometric isomers, enantiomers, diastereoisomers, racemates, solvates, hydrates or prodrugs thereof.

DETAILED DESCRIPTION

It should be understood that the characteristics of the embodiments described herein can be arbitrarily combined to form the technical solution of this disclosure. The definition of each group herein shall apply to any of the embodiments described herein. For example, the definitions of the substituents of alkyl herein shall apply to any of the embodiments described herein unless the substituents of alkyl are clearly defined in the embodiment.

The term "hydrogen (H)" as used herein includes its isotopes D and T.

The term "alkyl" as used herein refers to alkyl itself or a straight or branched chain radical of up to ten carbons. Useful alkyl groups include straight-chain or branched $C_1$-$C_{10}$ alkyl groups, preferably $C_1$-$C_6$ alkyl groups. In some embodiments, alkyl is $C_1$-$C_4$ alkyl. Typical $C_1$-$C_{10}$ alkyl groups include methyl, ethyl, propyl, isopropyl, butyl, sec-butyl, tert-butyl, 3-pentyl, hexyl and octyl groups.

The term "alkylene" as used herein refers to the alkyl as defined above, which is located between two other chemical groups and is used to connect the two other chemical groups. Typical alkylene groups include, but are not limited to, methylene, ethylidene, propylene and butylene.

The term "alkoxy" as used herein, e.g., methoxy and ethoxy, refers to oxygen substituted by the above mentioned $C_1$-$C_{10}$ alkyl groups, preferred $C_1$-$C_6$ alkyl groups or $C_1$-$C_4$ alkyl groups. The alkyl in alkoxy groups may be optionally substituted. Substituents of alkoxy groups include, but are not limited to, halogen, morpholinyl (including morpholino), amino (including alkylamino and dialkylamino), and carboxy (including esters thereof).

The "amino group" as described herein can be expressed as —NR'R", wherein R' and R" each are independently hydrogen, optionally substituted $C_1$-$C_{10}$ alkyl, optionally substituted cycloalkyl, optionally substituted aryl or optionally substituted heteroaryl; or R' and R" together with the N to which they are attached form an optionally substituted 4-7 membered cyclic amino group, wherein the cyclic amino group optionally comprises one or more (such as 2, 3) additional heteroatoms selected from O, and S. Preferred amino groups include $NH_2$ and the amino groups in which at least one of R' and R" is a $C_1$-$C_6$ alkyl group.

The term "aryl" as used herein by itself or as part of another group refers to monocyclic, bicyclic or tricyclic aromatic group containing 6 to 14 carbon atoms. Aryl may be substituted by one or more substituents as described herein.

Useful aryl groups include $C_6$-$C_{14}$ aryl groups, preferably $C_6$-$C_{10}$ aryl groups. Typical $C_6$-$C_{14}$ aryl groups include phenyl, naphthyl, phenanthryl, anthracyl, indenyl, azulyl, biphenyl, biphenylene and fluorenyl.

Useful cycloalkyl groups are $C_3$-$C_8$ cycloalkyl. Typical cycloalkyl groups include cyclopropyl, cyclobutyl, cyclopentyl, cyclohexyl and cycloheptyl. $C_3$-$C_8$ cycloalkyl may be substituted by one or more substituents as described herein.

Useful halo or halogen groups include fluoro, chloro, bromo and iodo.

Useful acylamino groups are any $C_1$-$C_6$ acyl (alkanoyl) attached to an amino nitrogen, e.g., acetamido, propionamido, butanoylamido, pentanoylamido and hexanoylamido, as well as aryl-substituted $C_1$-$C_6$ acylamino groups, e.g., benzoylamido. Useful acyl groups include $C_1$-$C_6$ acyl groups, such as acetyl. Acyl may be optionally substituted by group selected from aryl and halo, wherein the aryl may be optionally substituted. When acyl is substituted by halo, the number of halogen substituents may be in the range of 1-5. Examples of substituted acyls include chloroacetyl and pentafluorobenzoyl.

The term "heterocyclic group (heterocycle)" as used herein refers to a saturated or partially saturated 3-7 membered monocyclic group, 7-10 membered bicyclic group, spiro group or bridged-ring group, which consists of carbon atoms and one to four heteroatoms independently selected from O, N, and S, wherein the nitrogen and/or sulfur heteroatoms can be optionally oxidized and the nitrogen can be optionally quaternized. The term "heterocyclic group" also includes the fused heterocycles of the bicyclic ring system in which any of the above-defined heterocycles is fused to a benzene ring. The heterocycle can be substituted on carbon atom or nitrogen atom if the resulting compound is stable. Heterocyclic group may be substituted by one or more substituents as described herein.

Useful saturated or partially saturated heterocyclic groups include tetrahydrofuranyl, tetrahydropyranyl, piperidinyl, piperazinyl, 1,4-diazepanyl, pyrrolidinyl, imidazolidinyl, imidazolinyl, indolinyl, isoindolinyl, quinuclidinyl, morpholinyl (such as morpholino), thiomorpholinyl (such as thiomorpholino), isochromanyl, chromanyl, pyrazolidinyl, pyrazolinyl, tetrahydroisoquinolinyl, azetidinyl, tetronoyl and tetramoyl, which may be optionally substituted by one or more substituents as described herein.

The term "heteroaryl (heteroaromatic ring)" as used herein refers to a group having 5 to 14 ring atoms, with 6, 10 or 14π electrons shared in the ring system. Ring atoms of the heteroaryl are carbon atoms and 1-3 heteroatoms selected from oxygen, nitrogen and sulfur. Heteroaryl may be substituted by one or more substituents as described herein.

Useful heteroaryl groups include thienyl (thiophenyl), benzo[d]isothiazol-3-yl, benzo[b]thienyl, naphtho[2,3-b]thienyl, thianthrenyl, furyl (furanyl), pyranyl, isobenzofuranyl, chromenyl, xanthenyl, phenoxanthiinyl, pyrrolyl, imidazolyl, pyrazolyl, pyridyl (pyridinyl, including but not limited to 2-pyridyl, 3-pyridyl, and 4-pyridyl), pyrazinyl, pyrimidinyl, pyridazinyl, indolizinyl, isoindolyl, 3H-indolyl, indolyl, indazolyl, purinyl, 4H-quinolizinyl, isoquinolyl, quinolyl, phthalazinyl, naphthyridinyl, quinozalinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, phenoxazinyl, 1,4-dihydroquinoxaline-2,3-dione, 7-amino-isocoumarin, pyridopyrimidin-4-one, tetrahydropyridopyrimidinyl, tetrahydrocyclopenta[c]pyrazol-3-yl, benzoisoxazolyl such as 1,2-benzoisoxazol-3-yl, benzimidazolyl, 2-oxindolyl, thiadiazolyl, 2-oxobenzimidazolyl, imidazopyridazinyl, imidazopyridyl, triazolopyridazinyl, tetrahydropyridopyrimidinyl, pyrazolopyrimidinyl, pyrrolopyrimidinyl, pyrrolopyridyl, pyrrolopyrazinyl or triazolopyrazinyl. Where the heteroaryl group contains a nitrogen atom in a ring, such nitrogen atom may be in the form of an N-oxide, e.g., a pyridyl N-oxide, pyrazinyl N-oxide and pyrimidinyl N-oxide.

In this disclosure, unless otherwise described, when substituted, the alkyl, cycloalkyl, alkylene, alkoxy, acylamino, carbonyl, heterocyclic group, aryl or heteroaryl as described in any embodiment herein may be substituted by one or more (such as 1, 2, 3, or 4) substituents selected from the group consisting of: halo, cyano, nitro, hydroxy, carboxyl, $C_1$-$C_6$ acylamino, $C_1$-$C_6$ alkoxy, aryloxy, $C_1$-$C_6$ alkyl, $C_1$-$C_6$ acyl, $C_6$-$C_{10}$ aryl, $C_3$-$C_8$ cycloalkyl, heterocyclic group or heteroaryl and carbonyl, and the like. The substituent(s) itself may also be optionally substituted. Preferred substituents include, but are not limited to, halo, carbonyl, $C_1$-$C_6$ acylamino, $C_1$-$C_6$ alkoxy, $C_1$-$C_6$ alkyl and $C_1$-$C_6$ acyl.

It should be understood that in any embodiment of the present disclosure, when the substituent is a heterocyclic group, aryl or heteroaryl, the number thereof is usually 1. It should also be understood that the connection or substitution between groups of the disclosure should follow the valence-bond theory; unless otherwise specified, when the valence-bond theory is not followed, H is usually used to supplement.

Specifically, the disclosure provides compounds as represented in Formula I or pharmaceutically acceptable salts, geometric isomers, enantiomers, diastereoisomers, racemates, solvates, hydrates or prodrugs thereof:

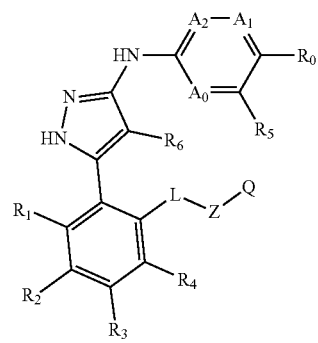

(I)

wherein $A_0$, $A_1$ and $A_2$ are independently selected from N or $CR^a$;

R$_0$ is selected from a group consisting of hydrogen, cyano, alkyl, alkoxy and carbonyl, wherein the alkyl, alkoxy and carbonyl may be optionally substituted;

R$_1$ is selected from a group consisting of halo, hydroxy and an optionally substituted alkoxy;

R$_2$-R$_4$ are independently selected from a group consisting of hydrogen, hydroxy, halo, alkyl, alkoxy, nitro, carbonyl and acylamino, wherein the alkyl, alkoxy, carbonyl and acylamino may be optionally substituted;

R$_5$ is selected from a group consisting of hydrogen, an optionally substituted alkyl and an optionally substituted alkoxy;

R$_6$ is selected from a group consisting of hydrogen, halo, and an optionally substituted alkyl;

L is a bond, —C(R$^b$)$_2$—, O, S or NR$^b$;

Z is a bond or an alkylene;

Q is an optionally substituted heterocyclic group;

R$^a$ is selected from a group consisting of H, an optionally substituted alkyl and halo;

R$^b$ is independently selected from a group consisting of hydrogen and an optionally substituted alkyl.

In compound of Formula I, each alkyl is independently C$_1$-C$_6$ alkyl, preferably C$_1$-C$_4$ alkyl; each alkylene is independently C$_1$-C$_6$ alkylene, preferably C$_1$-C$_4$ alkylene; preferably, when an alkyl (including the alkyl in an alkoxy) is substituted, the substituent(s) may be selected from a group consisting of amino, cyano, hydroxy, nitro, halo and carboxyl, and the like, and the number of the substituent(s) may be 1-5. For example, a substituted alkyl may be a hydroxy alkyl, a dihydroxy alkyl and a halogenated alkyl; substituted alkoxy may be a halogenated alkoxy, etc. It should be understood that when the substituent(s) are cyano, nitro and carboxyl, the number of substituent(s) are usually 1; when the substituent(s) are such as halo, the number of the substituent(s) may be up to 5 halogen groups according to the carbon chain length of the alkyl; examples of such substituent(s) are trifluoromethyl, pentafluoroethyl and the like.

In compound of Formula I, preferably, R$_a$ is H or C$_{1-3}$ alkyl; more preferably, A$_0$ and A$_1$ are N or CH; A$_2$ is N, CH or CCH$_3$. More preferably, A$_0$ and A$_1$ are N; A$_2$ is CH.

In compound of Formula I, preferably, R$_0$ is cyano, C$_{1-3}$ alkyl, C$_{1-3}$ alkoxy or halogenated C$_{1-3}$ alkyl.

In compound of Formula I, preferably, R$_1$ is halo, hydroxy, C$_{1-3}$ alkoxy or halogenated C$_{1-3}$ alkoxy.

In compound of Formula I, preferably, when R$_2$-R$_4$ are substituted, the substituent(s) may be selected from a group consisting of hydroxy, halo and amino, and the like. Preferred R$_2$-R$_4$ are independently hydrogen, halo, C$_1$-C$_3$ alkyl, C$_1$-C$_3$ alkoxy or halogenated C$_{1-3}$ alkyl. More preferably, R$_2$-R$_4$ are independently selected from a group consisting of hydrogen, halo, C$_1$-C$_3$ alkyl and halogenated C$_{1-3}$ alkyl. In some embodiments, R$_2$-R$_4$ each are hydrogen. In some embodiments, only one of R$_2$-R$_4$ is halo, C$_1$-C$_3$ alkyl or halogenated C$_{1-3}$ alkyl, preferably, the other groups of R$_2$-R$_4$ are H.

In compound of Formula I, preferably, R$_5$ is hydrogen or C$_1$-C$_3$ alkyl.

In compound of Formula I, preferably, R$_6$ is hydrogen or C$_1$-C$_3$ alkyl.

In compound of Formula I, preferably, L is C$_{1-3}$ alkylene, O, S or NR$^b$, preferred R$^b$ is hydrogen or C$_{1-3}$ alkyl.

In compound of Formula I, preferably, Z is C$_{1-3}$ alkylene, more preferably methylene.

In compound of Formula I, preferably, the substituent(s) on Q are selected from a group consisting of halo, hydroxy, amino, carboxyl, an optionally substituted alkyl, an optionally substituted alkoxy, an optionally substituted aryl, an optionally substituted heteroaryl and an optionally substituted heterocyclic group, and the like. The substituent(s) on the optionally substituted alkyl and alkoxy may be one or more substituents selected from a group consisting of amino, halo, hydroxy and carboxyl. For example, the alkyl may be substituted by —NR'R", wherein R' and R" are as defined herein, preferably are independently H or C$_1$-C$_6$ alkyl; the substituent(s) on the optionally substituted aryl, heteroaryl and heterocyclic group may be one or more substituents selected from a group consisting of amino, halo, hydroxy, carboxyl, alkyl and alkoxy. Preferably, the substituent(s) on Q are at the ortho, meta and/or para position to the connecting position, and not at the connecting position.

More preferably, in compound of Formula I, heteroatom of Q may be selected from N, O and S. Preferably, Q comprises 1-3 heteroatoms. More preferably, Q is an unsubstituted saturated 3-7 membered heterocyclic group or a saturated 3-7 membered heterocyclic group substituted by 1-2 optionally substituted C$_{1-3}$ alkyls, wherein the substituent(s) are at the ortho, meta and/or para position to the connecting position, and not at the connecting position. Preferred heterocyclic groups include but are not limited to piperidinyl, piperazinyl, pyrrolidinyl, morpholinyl (such as morpholino), thiomorpholinyl (such as thiomorpholino), tetrahydropyranyl and azetidinyl. Preferred Q includes the following groups:

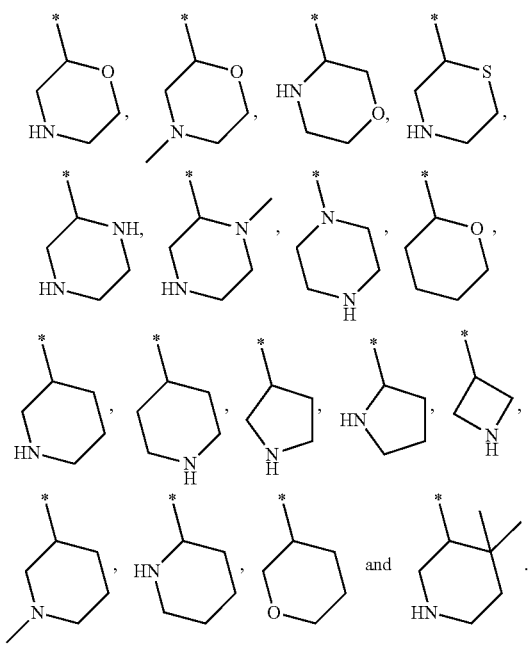

wherein * refers to the connecting position of the group to the rest of the compound.

The compound as represented in Formula I of the disclosure may have the structure as represented in the following Formula IIa:

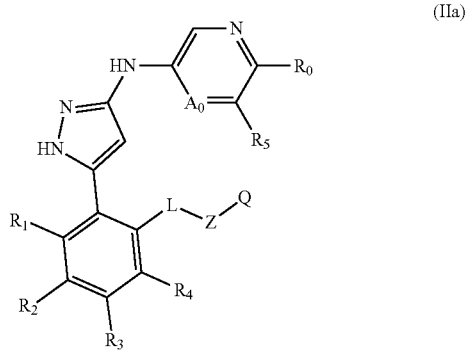

(IIa)

wherein $A_0$ is selected from N or $CR^a$;
$R_0$ is selected from a group consisting of hydrogen, cyano, alkyl, alkoxy and carbonyl, wherein the alkyl, alkoxy and carbonyl may be optionally substituted;
$R_1$ is selected from a group consisting of halo, hydroxy and an optionally substituted alkoxy;
$R_2$-$R_4$ are independently selected from a group consisting of hydrogen, halo, alkyl, alkoxy, nitro, carbonyl and acylamino, wherein the alkyl, alkoxy, carbonyl and acylamino may be optionally substituted;
$R_5$ is selected from a group consisting of hydrogen, an optionally substituted alkyl and an optionally substituted alkoxy;
L is a bond, —$C(R^b)_2$—, O, S or $NR^b$;
Z is a bond or alkylene;
Q is an optionally substituted heterocyclic group, wherein, the substituent(s) are at the ortho, meta and/or para position to the connecting position and not at the connecting position;
$R^a$ is selected from a group consisting of H, an optionally substituted alkyl and halo;
$R^b$ is independently hydrogen or an optionally substituted alkyl;

In compound of Formula IIa, each alkyl is independently $C_1$-$C_6$ alkyl, preferably $C_1$-$C_4$ alkyl; each alkylene is independently $C_1$-$C_6$ alkylene, preferably $C_1$-$C_4$ alkylene. Preferably, when an alkyl (including the alkyl in an alkoxy) is substituted, the substitutent(s) may be selected from a group consisting of amino, cyano, hydroxy, nitro, halo and carboxyl, and the like, and the number of the substituent(s) may be 1-5. For example, a substituted alkyl may be a hydroxy alkyl, a dihydroxy alkyl or a halogenated alkyl; a substituted alkoxy may be a halogenated alkoxy, etc. It should be understood that when the substituent is cyano, nitro and carboxyl, the number of the substituent(s) are usually 1; when the substituent(s) are such as halo, the number of the substituent(s) may be up to 5 halogen groups according to the carbon chain length of the alkyl; examples of such substituents are trifluoromethyl and pentafluoroethyl, and the like.

In compound of Formula IIa, preferably, $A_0$ is N or CH.

In compound of Formula IIa, preferably, $R_0$ is cyano, $C_{1-3}$ alkyl, $C_{1-3}$ alkoxy or halogenated $C_{1-3}$ alkyl.

In compound of Formula IIa, preferably, $R_1$ is halo, hydroxy, $C_1$-$C_3$ alkoxy or halogenated $C_{1-3}$ alkoxy, more preferably $C_{1-3}$ alkoxy or halogenated $C_{1-3}$ alkoxy.

In compound of Formula IIa, preferably, when $R_2$-$R_4$ are substituted, the substituent(s) may be selected from a group consisting of hydroxy, halo and amino, and the like. Preferred $R_2$-$R_4$ are independently selected from a group consisting of hydrogen, halo, $C_1$-$C_3$ alkyl, $C_1$-$C_3$ alkoxy and halogenated $C_{1-3}$ alkyl. More preferably, $R_2$-$R_4$ are independently selected from a group consisting of hydrogen, halo, $C_{1-3}$ alkyl and halogenated $C_{1-3}$ alkyl. In some embodiments, $R_2$-$R_4$ each are hydrogen. In some embodiments, only one of $R_2$-$R_4$ is halo, $C_1$-$C_3$ alkyl or halogenated $C_{1-3}$ alkyl, preferably, the other groups are H.

In compound of Formula IIa, preferably, $R_5$ is hydrogen or $C_1$-$C_3$ alkyl.

In compound of Formula IIa, preferably, L is $C_{1-3}$ alkylene, O, S or $NR^b$, preferred $R^b$ is hydrogen or $C_{1-3}$ alkyl.

In compound of Formula IIa, preferably, Z is $C_{1-3}$ alkylene, more preferably methylene.

In compound of Formula IIa, Q is preferably piperidinyl, piperazinyl, pyrrolidinyl, morpholinyl (such as morpholino), thiomorpholinyl (such as thiomorpholino), tetrahydropyranyl and azetidinyl, which are optionally substituted. Preferably, the substituent(s) on Q are selected from a group consisting of halo, hydroxy, amino, carboxyl, an optionally substituted alkyl, an optionally substituted alkoxy, an optionally substituted aryl, an optionally substituted heteroaryl and an optionally substituted heterocyclic group, and the like. The substituent(s) on the optionally substituted alkyl and alkoxy may be one or more substituents selected from a group consisting of amino, halo, hydroxy and carboxyl, for example, alkyl may be substituted by —NR'R", wherein R' and R" are as defined above, preferably are independently H or $C_1$-$C_6$ alkyl; the substituent(s) on the optionally substituted aryl, heteroaryl and heterocyclic group may be one or more substituents selected from a group consisting of amino, halo, hydroxy, carboxyl, alkyl and alkoxy. Preferably, the substituent(s) on Q are at the ortho, meta and/or para position to the connection position.

More preferably, in compound of Formula IIa, heteroatom on Q may be selected from N, O and S. Preferably, Q comprises 1-3 heteroatoms. More preferably, Q is an unsubstituted saturated 3-7 membered heterocyclic group or a saturated 3-7 membered heterocyclic group substituted by 1-2 optionally substituted $C_{1-3}$ alkyls, wherein the substituent(s) are at the ortho, meta and/or para position to the connecting position, and not at the connecting position. Preferred heterocyclic groups include but are not limited to piperidinyl, piperazinyl, pyrrolidinyl, morpholinyl (such as morpholino), thiomorpholinyl (such as thiomorpholino), tetrahydropyranyl and azetidinyl. Preferred Q includes the following groups:

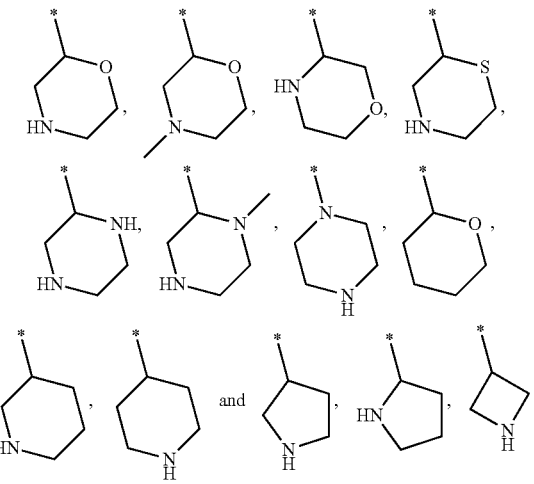

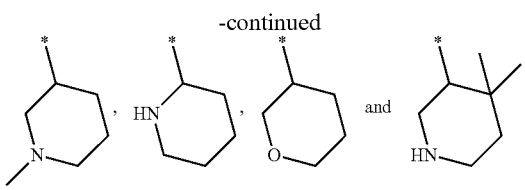

wherein * refers to the connecting position of the group to the rest of the compound.

One group of the preferred compounds of the disclosure is represented as compounds of Formula IIb or pharmaceutically acceptable salts, geometric isomers, enantiomers, diastereoisomers, racemates, solvates, hydrates or prodrugs thereof:

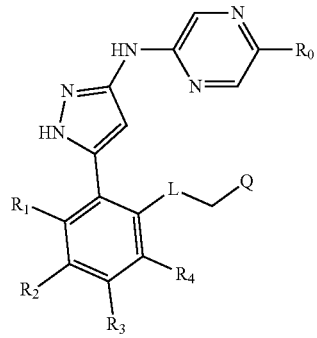

(IIb)

wherein, $R_0$-$R_4$ and L are as described in any embodiment of Formula I above;

Q is an unsubstituted saturated 3-7 membered heterocyclic group, or a saturated 3-7 membered heterocyclic group substituted by 1-2 optionally substituted $C_{1-3}$ alkyls, wherein the substituent(s) are at the ortho, meta and/or para position to the connecting position, and not at the connecting position.

In compound of Formula IIb, preferably, $R_0$ is cyano, $C_{1-3}$ alkyl, $C_{1-3}$ alkoxy or halogenated $C_{1-3}$ alkyl.

In compound of Formula IIb, preferably, $R_1$ is halo, hydroxy, $C_1$-$C_3$ alkoxy or halogenated $C_1$-$C_3$ alkoxy.

In compound of Formula IIb, preferably, $R_2$-$R_4$ are independently hydrogen, halo, $C_1$-$C_3$ alkyl, $C_1$-$C_3$ alkoxy or halogenated $C_1$-$C_3$ alkyl; more preferably, $R_2$-$R_4$ are independently hydrogen, halo, $C_1$-$C_3$ alkyl or halogenated $C_1$-$C_3$ alkyl; in some embodiments, $R_2$-$R_4$ each are hydrogen; in some embodiments, only one of $R_2$-$R_4$ is halo, $C_{1-3}$ alkyl or halogenated $C_{1-3}$ alkyl.

In compound of Formula IIb, preferably, L is $C_{1-3}$ alkylene, O, S or $NR^b$, preferred $R^b$ is hydrogen or $C_{1-3}$ alkyl.

In compound of Formula IIb, preferred heterocyclic groups in Q include but are not limited to piperidinyl, piperazinyl, pyrrolidinyl, morpholinyl (such as morpholino), thiomorpholinyl (such as thiomorpholino), tetrahydropyranyl and azetidinyl. Preferred Q includes the following groups:

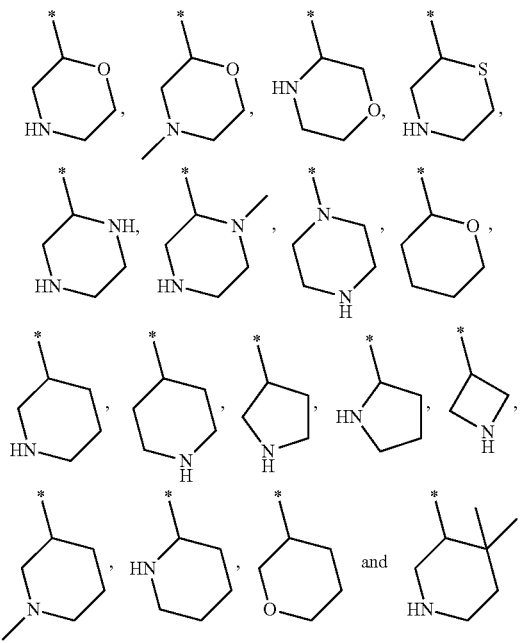

More preferred Q is the following groups:

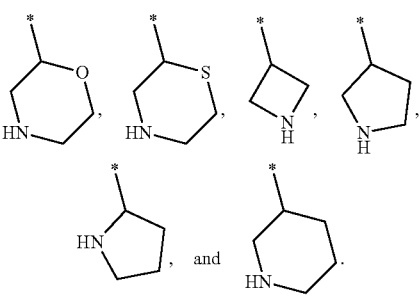

wherein * refers to the connecting position of the group to the rest of the compound.

One group of the preferred compounds of the disclosure is represented as compounds of Formula III or pharmaceutically acceptable salts, geometric isomers, enantiomers, diastereoisomers, racemates, solvates, hydrates or prodrugs thereof:

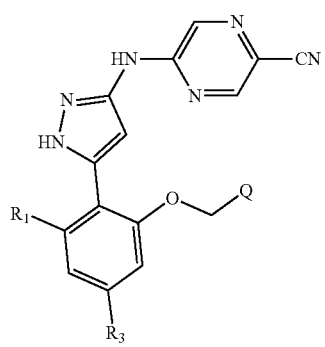

(III)

wherein $R_1$, $R_3$ and Q are as described in any embodiment of Formulae I, IIa and IIb above.

In compound of Formula III, preferably, $R_1$ is halo, hydroxy, $C_1$-$C_3$ alkoxy or halogenated $C_1$-$C_3$ alkoxy.

In compound of Formula III, preferably, $R_3$ is hydrogen, halo, $C_1$-$C_3$ alkyl, $C_1$-$C_3$ alkoxy or halogenated $C_1$-$C_3$ alkyl; more preferably, $R_3$ is hydrogen, halo, $C_1$-$C_3$ alkyl or halogenated $C_1$-$C_3$ alkyl.

In compound of Formula III, Q is an unsubstituted saturated 3-7 membered heterocyclic group or a saturated 3-7 membered heterocyclic group substituted by 1-2 optionally substituted $C_{1-3}$ alkyls, wherein the substituent(s) are at the ortho, meta and/or para position to the connecting position, and not at the connecting position. Preferred heterocyclic groups in Q include but are not limited to piperidinyl, piperazinyl, pyrrolidinyl, morpholinyl (such as morpholino), thiomorpholinyl (such as thiomorpholino), tetrahydropyranyl and azetidinyl. Preferred Q includes the following groups:

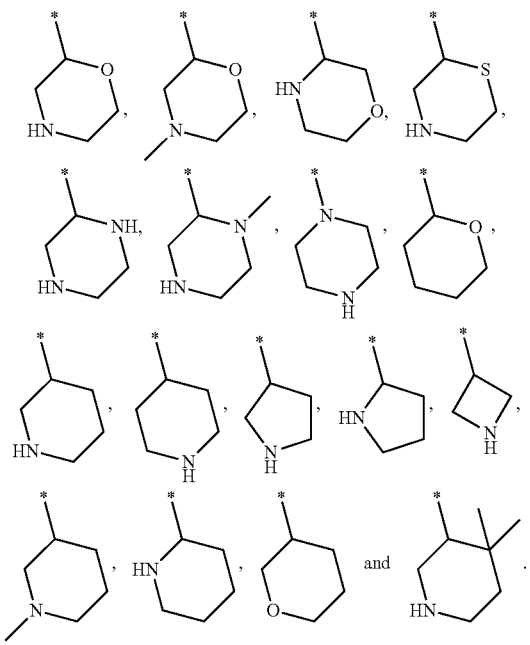

More preferred Q is the following groups:

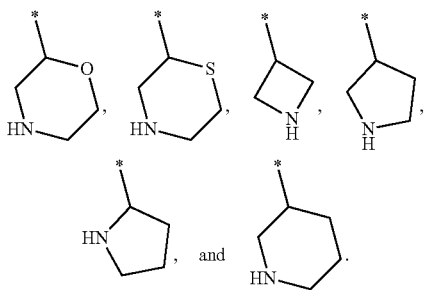

wherein, * refers to the connecting position of the group to the rest of the compound.

One group of the preferred compounds of the disclosure is represented as compounds of Formula IV or pharmaceutically acceptable salts, geometric isomers, enantiomers, diastereoisomers, racemates, solvates, hydrates or prodrugs thereof:

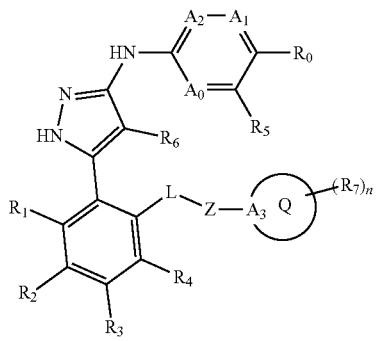

wherein $A_0$, $A_1$, $A_2$, $R_0$-$R_6$, L, and Z are defined as any of the above-mentioned embodiments;

$A_3$ is CH or N;

ring Q is a 3-7 membered heterocyclic group;

$R_7$ is selected from a group consisting of halo, hydroxy, amino, carboxyl, an optionally substituted alkyl, an optionally substituted alkoxy, an optionally substituted aryl, an optionally substituted heteroaryl and an optionally substituted heterocyclic group;

n is an integer selected from the group consisting of 0-3, preferably 0-2.

In compound of Formula IV, preferably, ring Q is a 3-7 membered heterocyclic group containing 1 or 2 heteroatoms selected from a group consisting of O, S and N. Preferably, ring Q is selected from the group consisting of piperidinyl, piperazinyl, pyrrolidinyl, morpholinyl (such as morpholino), thiomorpholinyl (such as thiomorpholino), tetrahydropyranyl and azetidinyl and the like.

In compound of Formula IV, preferably, $R_7$ is a $C_1$-$C_3$ alkyl. In some embodiments, n is 0.

In compound of Formula IV, each alkyl is independently $C_1$-$C_6$ alkyl, preferably $C_1$-$C_4$ alkyl; each alkylene is independently $C_1$-$C_6$ alkylene, preferably $C_1$-$C_4$ alkylene; preferably, when an alkyl (including the alkyl in an alkoxy) is substituted, the substituent(s) may be selected from a group consisting of amino, cyano, hydroxy, nitro, halo and carboxyl, and the like, and the number of the substituent(s) may be 1-5. For example, a substituted alkyl may be a hydroxy alkyl, a dihydroxy alkyl and a halogenated alkyl; substituted alkoxy may be a halogenated alkoxy, etc. It should be understood that when the substituent(s) are cyano, nitro and carboxyl, the number of substituent(s) are usually 1; when the substituent(s) are such as halo, the number of the substituent(s) may be up to 5 halogen groups according to the carbon chain length of the alkyl; examples of such substituent(s) are trifluoromethyl, pentafluoroethyl and the like.

In compound of Formula IV, preferably, $R_a$ is H or $C_{1-3}$ alkyl; more preferably, $A_0$ and $A_1$ are N or CH; $A_2$ is N, CH or CCH$_3$. More preferably, $A_0$ and $A_1$ are N; $A_2$ is CH.

In compound of Formula IV, preferably, $R_0$ is cyano, $C_{1-3}$ alkyl, $C_{1-3}$ alkoxy or halogenated $C_{1-3}$ alkyl.

In compound of Formula IV, preferably, $R_1$ is halo, hydroxy, $C_{1-3}$ alkoxy or halogenated $C_{1-3}$ alkoxy.

In compound of Formula IV, preferably, when $R_2$-$R_4$ are substituted, the substituent(s) may be selected from a group consisting of hydroxy, halo and amino, and the like. Preferred $R_2$-$R_4$ are independently hydrogen, halo, $C_1$-$C_3$ alkyl, $C_{1-3}$ alkoxy or halogenated $C_{1-3}$ alkyl. More preferably, $R_2$-$R_4$ are independently selected from a group consisting of hydrogen, halo, $C_1$-$C_3$ alkyl and halogenated $C_{1-3}$ alkyl. In some embodiments, $R_2$-$R_4$ each are hydrogen. In some embodiments, only one of $R_2$-$R_4$ is halo, $C_1$-$C_3$ alkyl or halogenated $C_{1-3}$ alkyl, preferably, the other groups of $R_2$-$R_4$ are H.

In compound of Formula IV, preferably, $R_5$ is hydrogen or $C_1$-$C_3$ alkyl; more preferably, $R_5$ is hydrogen.

In compound of Formula IV, preferably, $R_6$ is hydrogen, halo or $C_1$-$C_3$ alkyl; more preferably, $R_6$ is hydrogen.

In compound of Formula IV, preferably, L is $C_{1-3}$ alkylene, O, S or $NR^b$, preferred $R^b$ is hydrogen or $C_{1-3}$ alkyl.

In compound of Formula IV, preferably, Z is $C_{1-3}$ alkylene, more preferably methylene.

In compound of Formula IV, preferably, the ring Q optionally substituted by —($R_7$)$_n$ is selected from a group consisting of

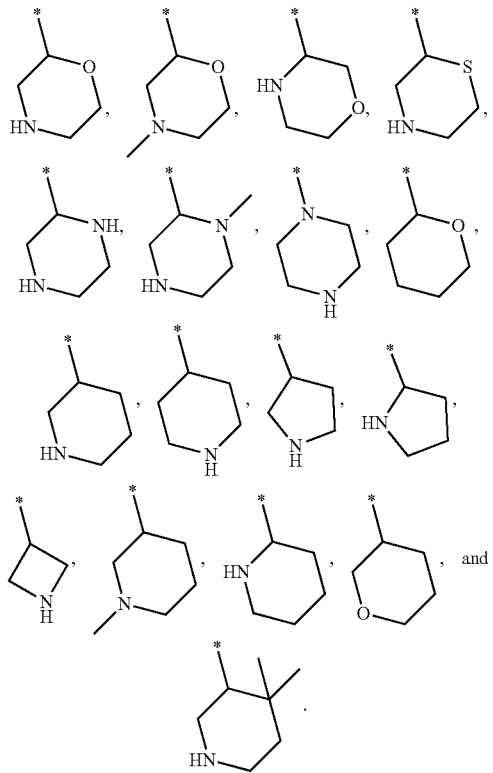

wherein * refers to the connecting position of the group to the rest of the compound.

In compound of Formula IV, preferably, $A_0$ is N; $A_1$ is N; $A_2$ is CH; $A_3$ is CH; $R_0$ is cyano; $R_1$ is halo, hydroxy, or $C_1$-$C_3$ alkoxy; $R_a$ is hydrogen; $R_3$ is hydrogen, halo, $C_1$-$C_3$ alkyl, or halogenated $C_{1-3}$ alkyl; $R_4$ is hydrogen; $R_5$ is hydrogen; $R_6$ is hydrogen; L is O; Z is $C_{1-3}$ alkylene, more preferably methylene; ring Q is a unsubstituted saturated 3-7 membered heterocyclic group; preferably, the unsubstituted saturated 3-7 membered heterocyclic group is selected from a group consisting of piperidinyl, piperazinyl, pyrrolidinyl, morpholinyl (such as morpholino), thiomorpholinyl (such as thiomorpholino) and azetidinyl; and n is 0.

In some embodiments of Formula IV, preferably, $A_0$ is N; $A_1$ is N; $A_2$ is CH; $A_3$ is CH; $R_0$ is cyano; $R_1$ is $C_1$-$C_3$ alkoxy; $R_2$ is hydrogen, halo, or $C_1$-$C_3$ alkyl; $R_4$ is hydrogen; $R_5$ is hydrogen; $R_6$ is hydrogen; L is O; Z is $C_{1-3}$ alkylene, more preferably methylene; ring Q is a unsubstituted saturated 3-7 membered heterocyclic group; preferably, the unsubstituted saturated 3-7 membered heterocyclic group is selected from a group consisting of piperidinyl, pyrrolidinyl, and thiomorpholinyl; and n is 0.

Embodiments of the preferred compounds of Formula I include but are not limited to:

(S)-5-((5-(2-methoxy-6-(morpholin-2-ylmethoxy)phenyl)-1H-pyrazol-3-yl)amino)pyrazine-2-carbonitrile (Example 1);

(S)-5-((5-(2-methoxy-6-(morpholin-2-ylmethoxy)phenyl)-1H-pyrazol-3-yl)amino)picolinonitrile (Example 2);

(R)-5-((5-(2-methoxy-6-(morpholin-2-ylmethoxy)phenyl)-1H-pyrazol-3-yl)amino)pyrazine-2-carbonitrile (Example 3);

(S)-5-((5-(2-methoxy-6-((4-methylmorpholin-2-yl)methoxy)phenyl)-1H-pyrazol-3-yl)amino)pyrazine-2-carbonitrile (Example 4);

(S)—N-(5-(2-methoxy-6-(morpholin-2-ylmethoxy)phenyl)-1H-pyrazol-3-yl)-5-(trifluoromethyl)pyrazin-2-amine (Example 5);

(S)—N-(5-(2-methoxy-6-(morpholin-2-ylmethoxy)phenyl)-1H-pyrazol-3-yl)-5-methylpyrazin-2-amine (Example 6);

(R)-5-((5-(2-methoxy-6-(morpholin-3-ylmethoxy)phenyl)-1H-pyrazol-3-yl)amino)pyrazine-2-carbonitrile (Example 7);

(S)-5-((5-(2-methoxy-6-((tetrahydro-2H-pyran-2-yl)methoxy)phenyl)-1H-pyrazol-3-yl)amino)pyrazine-2-carbonitrile (Example 8);

(S)-5-((5-(2-methoxy-6-(piperidin-3-ylmethoxy)phenyl)-1H-pyrazol-3-yl)amino)pyrazine-2-carbonitrile (Example 9);

(S)-5-((5-(2-methoxy-6-(piperazin-2-ylmethoxy)phenyl)-1H-pyrazol-3-yl)amino)pyrazine-2-carbonitrile (Example 10);

(S)-5-((5-(2-methoxy-6-((1-methylpiperazin-2-yl)methoxy)phenyl)-1H-pyrazol-3-yl)amino)pyrazine-2-carbonitrile (Example 11);

5-((5-(2-methoxy-6-(piperidin-4-ylmethoxy)phenyl)-1H-pyrazol-3-yl)amino)pyrazine-2-carbonitrile (Example 12);

(S)-5-((5-(2-methoxy-6-(pyrrolidin-3-ylmethoxy)phenyl)-1H-pyrazol-3-yl)amino)pyrazine-2-carbonitrile (Example 13);

(S)-5-((5-(4-fluoro-2-methoxy-6-(morpholin-2-ylmethoxy)phenyl)-1H-pyrazol-3-yl)amino)pyrazine-2-carbonitrile (Example 14);

(S)-5-((5-(3-chloro-2-methoxy-6-(morpholin-2-ylmethoxy)phenyl)-1H-pyrazol-3-yl)amino)pyrazine-2-carbonitrile (Example 15);

(S)-5-((5-(4-chloro-2-methoxy-6-(morpholin-2-ylmethoxy)phenyl)-1H-pyrazol-3-yl)amino)pyrazine-2-carbonitrile (Example 16);

(S)-5-((5-(3-chloro-6-methoxy-2-(morpholin-2-ylmethoxy)phenyl)-1H-pyrazol-3-yl)amino)pyrazine-2-carbonitrile (Example 17);

(S)-5-((5-(4-bromo-2-methoxy-6-(morpholin-2-ylmethoxy)phenyl)-1H-pyrazol-3-yl)amino)pyrazine-2-carbonitrile (Example 18);

(S)-5-((5-(2-methoxy-6-(morpholin-2-ylmethoxy)-4-(trifluoromethyl)phenyl)-1H-pyrazol-3-yl)amino)pyrazine-2-carbonitrile (Example 19);

(S)-5-((5-(2-(morpholin-2-ylmethoxy)-6-(trifluoromethoxy)phenyl)-1H-pyrazol-3-yl)amino)pyrazine-2-carbonitrile (Example 20);

(S)-5-((5-(2-methoxy-6-((morpholin-2-ylmethyl)amino)phenyl)-1H-pyrazol-3-yl)amino)pyrazine-2-carbonitrile (Example 21);

(S)-5-((5-(2-methoxy-6-(methyl(morpholin-2-ylmethyl)
amino)phenyl)-1H-pyrazol-3-yl)amino)pyrazine-2-carbonitrile (Example 22);

5-((5-(2-methoxy-6-(2-(piperazin-1-yl)ethyl)phenyl)-1H-pyrazol-3-yl)amino)pyrazine-2-carbonitrile (Example 23);

(S)-6-((5-(2-methoxy-6-(piperidin-3-ylmethoxy)phenyl)-1H-pyrazol-3-yl)amino)nicotinonitrile (Example 24);

(S)-6-((5-(2-methoxy-6-(piperidin-3-ylmethoxy)phenyl)-1H-pyrazol-3-yl)amino)pyridazine-3-carbonitrile (Example 25);

(S)-5-methoxy-N-(5-(2-methoxy-6-(piperidin-3-ylmethoxy)phenyl)-1H-pyrazol-3-yl)pyrazin-2-amine (Example 26);

(S)-5-ethyl-N-(5-(2-methoxy-6-(piperidin-3-ylmethoxy)phenyl)-1H-pyrazol-3-yl)pyrazin-2-amine (Example 27);

(S)-5-((5-(2-methoxy-6-(piperidin-3-ylmethoxy)phenyl)-1H-pyrazol-3-yl)amino)-3-methylpyrazine-2-carbonitrile (Example 28);

(S)-5-((5-(2-methoxy-6-(piperidin-3-ylmethoxy)phenyl)-1H-pyrazol-3-yl)amino)-6-methylpyrazine-2-carbonitrile (Example 29);

5-((5-(2-methoxy-6-(piperidin-4-yloxy)phenyl)-1H-pyrazol-3-yl)amino)pyrazine-2-carbonitrile (Example 30);

5-((5-(2-(azetidin-3-ylmethoxy)-6-methoxyphenyl)-1H-pyrazol-3-yl)amino)pyrazine-2-carbonitrile (Example 31);

(S)-5-((5-(2-methoxy-6-((1-methylpiperidin-3-yl)methoxy)phenyl)-1H-pyrazol-3-yl)amino)pyrazine-2-carbonitrile (Example 32);

(R)-5-((5-(2-methoxy-6-(piperidin-2-ylmethoxy)phenyl)-1H-pyrazol-3-yl)amino)pyrazine-2-carbonitrile (Example 33);

(S)-5-((5-(2-methoxy-6-((tetrahydro-2H-pyran-3-yl)methoxy)phenyl)-1H-pyrazol-3-yl)amino)pyrazine-2-carbonitrile (Example 34);

(S)-5-((5-(2-ethoxy-6-(piperidin-3-ylmethoxy)phenyl)-1H-pyrazol-3-yl)amino)pyrazine-2-carbonitrile (Example 35);

(S)-5-((5-(2-isopropoxy-6-(piperidin-3-ylmethoxy)phenyl)-1H-pyrazol-3-yl)amino)pyrazine-2-carbonitrile (Example 36);

(S)-5-((5-(3-fluoro-2-methoxy-6-(piperidin-3-ylmethoxy)phenyl)-1H-pyrazol-3-yl)amino)pyrazine-2-carbonitrile (Example 37);

(S)-5-((5-(4-fluoro-2-methoxy-6-(piperidin-3-ylmethoxy)phenyl)-1H-pyrazol-3-yl)amino)pyrazine-2-carbonitrile (Example 38);

(S)-5-((5-(4-fluoro-2-methoxy-6-(pyrrolidin-3-ylmethoxy)phenyl)-1H-pyrazol-3-yl)amino)pyrazine-2-carbonitrile (Example 39);

(S)-5-((5-(4-chloro-2-methoxy-6-(piperidin-3-ylmethoxy)phenyl)-1H-pyrazol-3-yl)amino)pyrazine-2-carbonitrile (Example 40);

(S)-5-((5-(4-bromo-2-methoxy-6-(piperidin-3-ylmethoxy)phenyl)-1H-pyrazol-3-yl)amino)pyrazine-2-carbonitrile (Example 41);

(S)-5-((5-(2-methoxy-3-methyl-6-(piperidin-3-ylmethoxy)phenyl)-1H-pyrazol-3-yl)amino)pyrazine-2-carbonitrile (Example 42);

(S)-5-((5-(2-methoxy-4-methyl-6-(piperidin-3-ylmethoxy)phenyl)-1H-pyrazol-3-yl)amino)pyrazine-2-carbonitrile (Example 43);

(S)-5-((5-(2-methoxy-4-methyl-6-(morpholin-2-ylmethoxy)phenyl)-1H-pyrazol-3-yl)amino)pyrazine-2-carbonitrile (Example 44);

(S)-5-((5-(2-methoxy-6-(piperidin-3-ylmethoxy)-4-(trifluoromethyl)phenyl)-1H-pyrazol-3-yl)amino)pyrazine-2-carbonitrile (Example 45);

(S)-5-((5-(2-fluoro-6-(piperidin-3-ylmethoxy)phenyl)-1H-pyrazol-3-yl)amino)pyrazine-2-carbonitrile (Example 46);

(S)-5-((5-(2-chloro-6-(piperidin-3-ylmethoxy)phenyl)-1H-pyrazol-3-yl)amino)pyrazine-2-carbonitrile (Example 47);

(S)-5-((5-(2-hydroxy-6-(piperidin-3-ylmethoxy)phenyl)-1H-pyrazol-3-yl)amino)pyrazine-2-carbonitrile (Example 48);

(S)-5-((5-(2-((4,4-dimethylpiperidin-3-yl)methoxy)-6-methoxyphenyl)-1H-pyrazol-3-yl)amino)pyrazine-2-carbonitrile (Example 49);

5-((5-(2-((4,4-dimethylpiperidin-3-yl)methoxy)-4-fluoro-6-methoxyphenyl)-1H-pyrazol-3-yl)amino)pyrazine-2-carbonitrile (Example 50);

(S)-5-((5-(2-methoxy-6-(piperidin-3-ylmethoxy)phenyl)-4-methyl-1H-pyrazol-3-yl)amino)pyrazine-2-carbonitrile (Example 51);

(S)-5-((4-bromo-5-(2-methoxy-6-(piperidin-3-ylmethoxy)phenyl)-1H-pyrazol-3-yl)amino)pyrazine-2-carbonitrile (Example 52);

5-((5-(2-(azetidin-3-ylmethoxy)-6-fluorophenyl)-1H-pyrazol-3-yl)amino)pyrazine-2-carbonitrile (Example 53);

(S)-5-((5-(2-fluoro-6-(pyrrolidin-3-ylmethoxy)phenyl)-1H-pyrazol-3-yl)amino)pyrazine-2-carbonitrile (Example 54);

(S)-5-((5-(2-fluoro-6-(morpholin-2-ylmethoxy)phenyl)-1H-pyrazol-3-yl)amino)pyrazine-2-carbonitrile (Example 55);

(S)-5-((5-(2,4-difluoro-6-(piperidin-3-ylmethoxy)phenyl)-1H-pyrazol-3-yl)amino)pyrazine-2-carbonitrile (Example 56);

(S)-5-((5-(4-chloro-2-fluoro-6-(piperidin-3-ylmethoxy)phenyl)-1H-pyrazol-3-yl)amino)pyrazine-2-carbonitrile (Example 57);

(S)-5-((5-(4-chloro-2-fluoro-6-(morpholin-2-ylmethoxy)phenyl)-1H-pyrazol-3-yl)amino)pyrazine-2-carbonitrile (Example 58);

(S)-5-((5-(4-bromo-2-fluoro-6-(piperidin-3-ylmethoxy)phenyl)-1H-pyrazol-3-yl)amino)pyrazine-2-carbonitrile (Example 59);

(S)-5-((5-(4-bromo-2-fluoro-6-(morpholin-2-ylmethoxy)phenyl)-1H-pyrazol-3-yl)amino)pyrazine-2-carbonitrile (Example 60);

5-((5-(2-(azetidin-3-ylmethoxy)-6-fluoro-4-methylphenyl)-1H-pyrazol-3-yl)amino)pyrazine-2-carbonitrile (Example 61);

(S)-5-((5-(2-fluoro-4-methyl-6-(pyrrolidin-3-ylmethoxy)phenyl)-1H-pyrazol-3-yl)amino)pyrazine-2-carbonitrile (Example 62);

(S)-5-((5-(2-fluoro-4-methyl-6-(piperidin-3-ylmethoxy)phenyl)-1H-pyrazol-3-yl)amino)pyrazine-2-carbonitrile (Example 63);

(S)-5-((5-(2-fluoro-4-methyl-6-(morpholin-2-ylmethoxy)phenyl)-1H-pyrazol-3-yl)amino)pyrazine-2-carbonitrile (Example 64);

(R)-5-((5-(2-methoxy-6-(pyrrolidin-2-ylmethoxy)phenyl)-1H-pyrazol-3-yl)amino)pyrazine-2-carbonitrile (Example 65);

(R)-5-((5-(4-fluoro-2-methoxy-6-(pyrrolidin-2-ylmethoxy)phenyl)-1H-pyrazol-3-yl)amino)pyrazine-2-carbonitrile (Example 66);

5-((5-(2-(azetidin-3-ylmethoxy)-4-chloro-6-methoxyphenyl)-1H-pyrazol-3-yl)amino)pyrazine-2-carbonitrile (Example 67);

(S)-5-((5-(4-chloro-2-methoxy-6-(pyrrolidin-3-ylmethoxy)phenyl)-1H-pyrazol-3-yl)amino)pyrazine-2-carbonitrile (Example 68);

5-((5-(2-(azetidin-3-ylmethoxy)-4-bromo-6-methoxyphenyl)-1H-pyrazol-3-yl)amino)pyrazine-2-carbonitrile (Example 69);

(S)-5-((5-(4-bromo-2-methoxy-6-(pyrrolidin-3-ylmethoxy)phenyl)-1H-pyrazol-3-yl)amino)pyrazine-2-carbonitrile (Example 70);

(R)-5-((5-(4-bromo-2-methoxy-6-(pyrrolidin-2-ylmethoxy)phenyl)-1H-pyrazol-3-yl)amino)pyrazine-2-carbonitrile (Example 71);

5-((5-(2-(azetidin-3-ylmethoxy)-6-methoxy-4-methylphenyl)-1H-pyrazol-3-yl)amino)pyrazine-2-carbonitrile (Example 72);

(S)-5-((5-(2-methoxy-4-methyl-6-(pyrrolidin-3-ylmethoxy)phenyl)-1H-pyrazol-3-yl)amino)pyrazine-2-carbonitrile (Example 73);

(R)-5-((5-(2-methoxy-4-methyl-6-(pyrrolidin-2-ylmethoxy)phenyl)-1H-pyrazol-3-yl)amino)pyrazine-2-carbonitrile (Example 74);

(S)-5-((5-(4-ethyl-2-methoxy-6-(piperidin-3-ylmethoxy)phenyl)-1H-pyrazol-3-yl)amino)pyrazine-2-carbonitrile (Example 75);

(S)-5-((5-(2-methoxy-6-(thiomorpholin-2-ylmethoxy)phenyl)-1H-pyrazol-3-yl)amino)pyrazine-2-carbonitrile and (R)-5-((5-(2-methoxy-6-(thiomorpholin-2-ylmethoxy)phenyl)-1H-pyrazol-3-yl)amino)pyrazine-2-carbonitrile (Example 76);

(S)-5-((5-(4-fluoro-2-methoxy-6-(thiomorpholin-2-ylmethoxy)phenyl)-1H-pyrazol-3-yl)amino)pyrazine-2-carbonitrile and (R)-5-((5-(4-fluoro-2-methoxy-6-(thiomorpholin-2-ylmethoxy)phenyl)-1H-pyrazol-3-yl)amino)pyrazine-2-carbonitrile (Example 77);

(S)-5-((5-(4-chloro-2-methoxy-6-(thiomorpholin-2-ylmethoxy)phenyl)-1H-pyrazol-3-yl)amino)pyrazine-2-carbonitrile and (R)-5-((5-(4-chloro-2-methoxy-6-(thiomorpholin-2-ylmethoxy)phenyl)-1H-pyrazol-3-yl)amino)pyrazine-2-carbonitrile (Example 78);

(S)-5-((5-(4-bromo-2-methoxy-6-(thiomorpholin-2-ylmethoxy)phenyl)-1H-pyrazol-3-yl)amino)pyrazine-2-carbonitrile and (R)-5-((5-(4-bromo-2-methoxy-6-(thiomorpholin-2-ylmethoxy)phenyl)-1H-pyrazol-3-yl)amino)pyrazine-2-carbonitrile (Example 79);

(S)-5-((5-(2-methoxy-4-methyl-6-(thiomorpholin-2-ylmethoxy)phenyl)-1H-pyrazol-3-yl)amino)pyrazine-2-carbonitrile and (R)-5-((5-(2-methoxy-4-methyl-6-(thiomorpholin-2-ylmethoxy)phenyl)-1H-pyrazol-3-yl)amino)pyrazine-2-carbonitrile (Example 80);

or pharmaceutically acceptable salts, geometric isomers, enantiomers, diastereoisomers, racemates, solvates, hydrates or prodrugs thereof.

Some of the compounds of the present disclosure may exist as stereoisomers including optical isomers. The disclosure includes all stereoisomers and the racemic mixtures of such stereoisomers as well as the individual enantiomers that may be separated according to methods that are well known to those of ordinary skill in the art.

In the present disclosure, examples of pharmaceutically acceptable salts include inorganic and organic acid salts, such as hydrochloride, hydrobromide, phosphate, sulphate, citrate, lactate, tartrate, maleate, fumarate, mandelate and oxalate; and inorganic and organic base salts formed with bases such as sodium hydroxy, tris(hydroxymethyl)aminomethane (TRIS, tromethamine) and N-methyl-glucamine.

Examples of prodrugs of the compounds of the disclosure include the simple esters of carboxylic acid-containing compounds (e.g., those obtained by condensation with a $C_1$-$C_4$ alcohol according to methods known in the art); esters of hydroxy-containing compounds (e.g., those obtained by condensation with a $C_1$-$C_4$ carboxylic acid, $C_3$-$C_6$ diacid or anhydride thereof such as succinic anhydride and fumaric anhydride, according to methods known in the art); imines of amino-containing compounds (e.g., those obtained by condensation with a $C_1$-$C_4$ aldehyde or ketone according to methods known in the art); carbamate of amino-containing compounds, such as those described by Leu, et al. (*J. Med. Chem.* 42:3623-3628 (1999)) and Greenwald, et al. (*J. Med. Chem.* 42:3657-3667 (1999)); and acetals and ketals of alcohol-containing compounds (e.g., those obtained by condensation with chloromethyl methyl ether or chloromethyl ethyl ether according to methods known in the art).

The compounds of this disclosure may be prepared using methods known to those skilled in the art, or the novel methods of this disclosure. Specifically, the compounds of this disclosure with Formula I can be prepared as illustrated by the exemplary reaction in Scheme 1. The mixture of 1-(2-hydroxy-6-methoxyphenyl)acetophenone and N,N-dimethylformamide dimethyl acetal was reacted under heating to produce (2E)-3-(dimethylamino)-1-(2-hydroxy-6-methoxyphenyl)-2-propenyl-1-one. (2E)-3-(Dimethylamino)-1-(2-hydroxy-6-methoxyphenyl)-2-propenyl-1-one and hydroxylamine hydrochloride were reacted in ethanol under heating to produce 3-methoxy-2-(1,2-oxazol-5-yl)phenol. Triphenylphosphine and diisopropyl azodicarboxylate were stirred at low temperature in tetrahydrofuran, then added with 3-methoxy-2-(1,2-oxazol-5-yl)phenol and tert-butyl (2S)-2-(hydroxymethyl)morpholine-4-carboxylate, and reacted at room temperature to produce tert-butyl (2S)-2-[3-methoxy-2-(1,2-oxazol-5-yl)phenoxymethyl]morpholine-4-carboxylate. Tert-butyl (2S)-2-[3-methoxy-2-(1,2-oxazol-5-yl)phenoxymethyl]morpholine-4-carboxylate and potassium hydroxide were reacted in ethanol and water at room temperature to produce tert-butyl (2S)-2-[2-(2-cyanoacetyl)-3-methoxyphenoxymethyl]morpholine-4-carboxylate. Tert-butyl (2S)-2-[2-(2-cyanoacetyl)-3-methoxyphenoxymethyl]morpholine-4-carboxylate and hydrazine hydrate were stirred in tetrahydrofuran, water and methanol, acetic acid was added, and the mixture was heated to produce tert-butyl (2S)-2-[2-(5-amino-2H-pyrazol-3-yl)-3-methoxyphenoxymethyl]morpholine-4-carboxylate. Tert-butyl (2S)-2-[2-(5-amino-2H-pyrazol-3-yl)-3-methoxyphenoxymethyl]morpholine-4-carboxylate, 5-chloropyrazine-2-carbonitrile and N-ethyl morpholine in dimethyl sulfoxide were heated to produce tert-butyl (2S)-2-(2-[5-[(5-cyanopyrazin-2-yl)amino]-2H-pyrazol-3-yl]-3-methoxyphenoxy)morpholine-4-carboxylate. Tert-butyl (2S)-2-(2-[5-[(5-cyanopyrazin-2-yl)amino]-2H-pyrazol-3-yl]-3-methoxyphenoxy)morpholine-4-carboxylate and trifluoroacetic acid in dichloromethane were reacted at room temperature to obtain the target compound (S)-5-((5-(2-methoxy-6-(morpholin-2-ylmethoxy)phenyl)-1H-pyrazol-3-yl)amino)pyrazine-2-carbonitrile.

Scheme 1

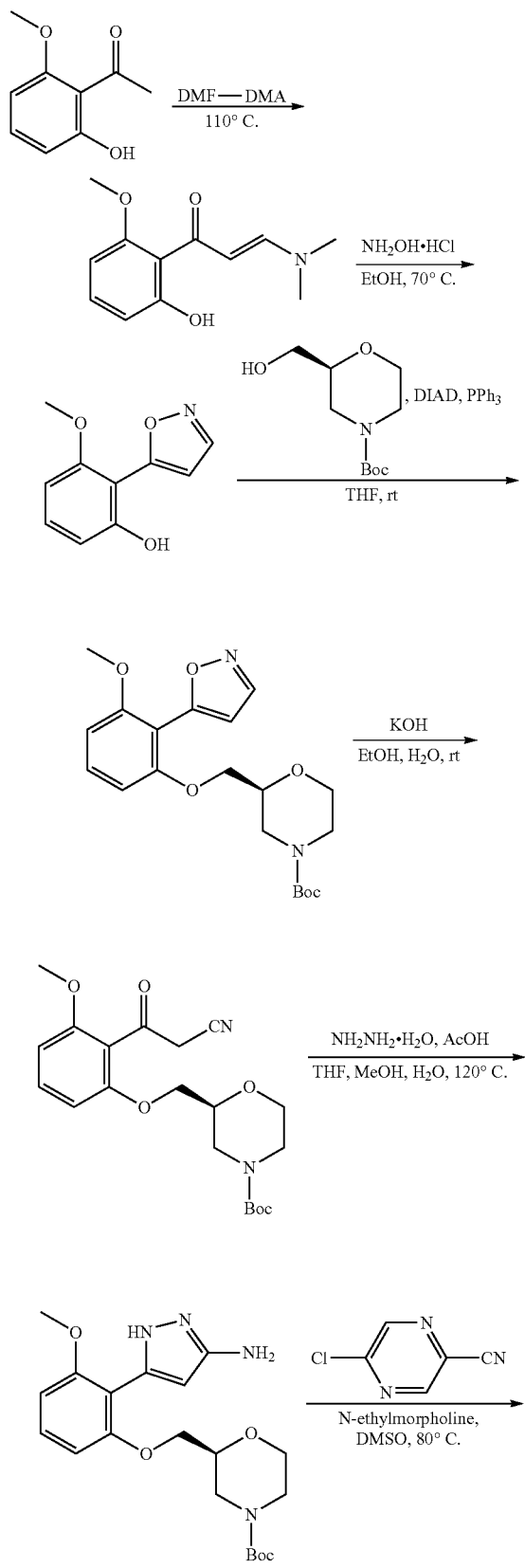

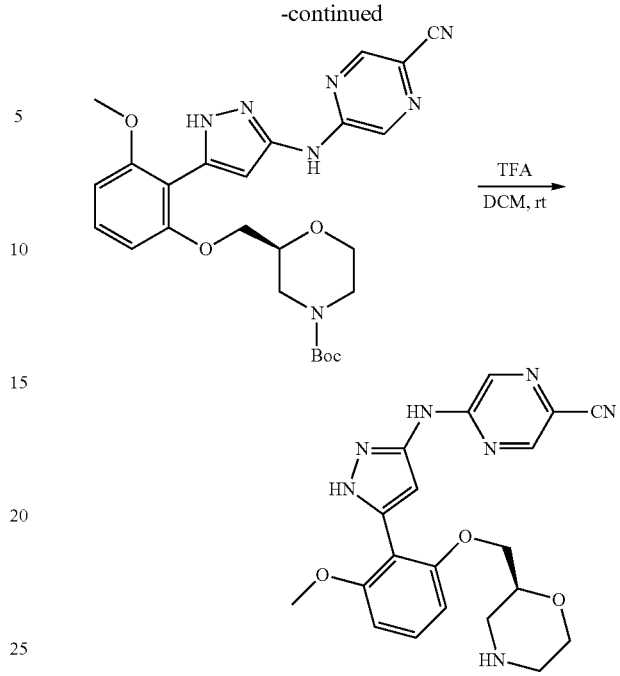

Other related compounds can be prepared similarly. For example, replacement of 5-chloropyrazine-2-carbonitrile with 5-bromocyanopyridine produced the target compound (S)-5-((5-(2-methoxy-6-(morpholin-2-ylmethoxy)phenyl)-1H-pyrazol-3-yl)amino) picolinonitrile; replacement of 5-chloropyrazine-2-carbonitrile with 2-chloro-5-(trifluoromethyl)pyrazine produced the target compound (S)—N-(5-(2-methoxy-6-(morpholin-2-ylmethoxy)phenyl)-1H-pyrazol-3-yl)-5-(trifluoromethyl)pyrazin-2-amine. Replacement of 5-chloropyrazine-2-carbonitrile with 2-chloro-5-methylpyrazine produced the target compound (S)—N-(5-(2-methoxy-6-(morpholin-2-ylmethoxy)phenyl)-1H-pyrazol-3-yl)-5-methylpyrazin-2-amine. Replacement of tert-butyl (2S)-2-(hydroxymethyl)morpholine-4-carboxylate with (S)-(tetrahydro-2H-pyran-2-yl)methanol produced the target compound (S)-5-((5-(2-methoxy-6-((tetrahydro-2H-pyran-2-yl)methoxy)phenyl)-1H-pyrazol-3-yl)amino) pyrazine-2-carbonitrile. Replacement of tert-butyl (2S)-2-(hydroxymethyl)morpholine-4-carboxylate with tert-butyl (S)-3-(hydroxymethyl)piperidine-1-carboxylate produced the target compound (S)-5-((5-(2-methoxy-6-(piperidin-3-ylmethoxy)phenyl)-1H-pyrazol-3-yl)amino)pyrazine-2-carbonitrile. Replacement of 1-(2-hydroxy-6-methoxyphenyl)-1-ethanone with 1-(4-fluoro-2-hydroxy-6-methoxyphenyl)-1-ethanone produced the target compound (S)-5-((5-(4-fluoro-2-methoxy-6-(morpholin-2-ylmethoxy)phenyl)-1H-pyrazol-3-yl)amino)pyrazine-2-carbonitrile. Replacement of 1-(2-hydroxy-6-methoxyphenyl)-1-ethanone with 1-(3-chloro-6-hydroxy-2-methoxyphenyl)-1-ethanone produced the target compound (S)-5-((5-(3-chloro-2-methoxy-6-(morpholin-2-ylmethoxy)phenyl)-1H-pyrazol-3-yl)amino)pyrazine-2-carbonitrile. Replacement of 1-(2-hydroxy-6-methoxyphenyl)-1-ethanone with 1-(2-hydroxy-6-(trifluoromethoxy)phenyl)-1-ethanone produced the target compound (S)-5-(5-(2-(morpholin-2-ylmethoxy)-6-(trifluoromethoxy)phenyl)-1H-pyrazol-3-yl)amino)pyrazine-2-carbonitrile. Replacement of 1-(2-hydroxy-6-methoxyphenyl)-1-ethanone with 1-(2-amino-6-methoxyphenyl)-1-ethanone produced the target compound (S)-5-((5-(2-methoxy-6-((morpholin-2-ylmethyl)amino)phenyl)-1H-pyrazol-3-yl)

amino)pyrazine-2-carbonitrile. Replacement of 1-(2-hydroxy-6-methoxyphenyl)ethanone with 1-(2-hydroxy-6-ethoxyphenyl)ethanone produced the target compound (S)-5-(5-(2-ethoxy-6-(piperidin-3-ylmethoxy)phenyl)-1H-pyrazol-3-yl)amino)pyrazine-2-carbonitrile. Replacement of 1-(2-hydroxy-6-methoxyphenyl)ethanone with 1-(4-chloro-2-hydroxy-6-methoxyphenyl)ethanone produced the target compound (S)-5-((5-(4-chloro-2-methoxy-6-(piperidin-3-ylmethoxy)phenyl)-1H-pyrazol-3-yl)amino)pyrazine-2-carbonitrile. Replacement of 1-(2-hydroxy-6-methoxyphenyl)ethanone with 1-(4-methyl-2-hydroxy-6-methoxyphenyl)ethanone produced the target compound (S)-5-((5-(2-methoxy-4-methyl-6-(morpholin-2-ylmethoxy)phenyl)-1H-pyrazol-3-yl)amino)pyrazine-2-carbonitrile. Replacement of 1-(2-hydroxy-6-methoxyphenyl)ethanone with 1-(2-fluoro-6-hydroxyphenyl)ethanone produced the target compound (S)-5-((5-(2-fluoro-6-(piperidin-3-ylmethoxy)phenyl)-1H-pyrazol-3-yl)amino)pyrazine-2-carbonitrile.

The compounds of this disclosure can be prepared as illustrated by the exemplary reaction in Scheme 2. 1-(2-Hydroxy-6-methoxyphenyl)ethenone, p-methoxybenzyl chloride (PMBC1) and $K_2CO_3$ were reacted in DMF at room temperature to produce 1-(2-methoxy-6-((4-methoxybenzyl)oxy)phenyl)ethan-1-one. 1-(2-Methoxy-6-((4-methoxybenzyl)oxy)phenyl)ethan-1-one, t-BuOLi, $CS_2$ and MeI were reacted in anhydrous DMSO at room temperature to produce 1-(2-methoxy-6-((4-methoxyphenyl)methoxy)phenyl)-3,3-bis(methylsulfonyl)-2-propen-1-one. 5-aminopyrazine-2-carbonitrile and NaH was reacted in THF at low temperature, then added with 1-(2-methoxy-6-((4-methoxyphenyl)methoxy)phenyl)-3,3-bis(methylsulfonyl)-2-propen-1-one and reacted under heating to produce 5-(((E)-3-(2-methoxy-6-((4-methoxyphenyl)methoxy)phenyl)-1-methylsulfonyl-3-oxo-1-propenyl)amino)pyrazine-2-carbonitrile. 5-(((E)-3-(2-Methoxy-6-((4-methoxyphenyl)methoxy)phenyl)-1-methylsulfonyl-3-oxo-1-propenyl)amino)pyrazine-2-carbonitrile, AcOH and $N_2H_4 \cdot H_2O$ were reacted in EtOH under heating to produce 5-((5-2-methoxy-6-((4-methoxyphenyl)methoxy)phenyl)-1H-pyrazol-3-yl)amino)pyrazine-2-carbonitrile. 5-((5-(2-Methoxy-6-((4-methoxyphenyl)methoxy)phenyl)-1H-pyrazol-3-yl)amino)pyrazine-2-carbonitrile was deprotected under acidic conditions such as HCl in dioxane at room temperature to produce 5-((5-(2-hydroxy-6-methoxy-phenyl)-1H-pyrazol-3-yl)amino)pyrazine-2-methylnitrile dihydrochloride. 5-((5-(2-Hydroxy-6-methoxy-phenyl)-1H-pyrazol-3-yl)amino)pyrazine-2-methylnitrile dihydrochloride, TEA, triphenylphosphorus, diisopropyl azodicarboxylate (DIAD) and tert-butyl (2R)-2-(hydroxymethyl)morpholine-4-carboxylate were reacted in THF under heating to produce tert-butyl (2R)-2-((2-[3-((5-cyanopyrazin-2-yl)amino)-1H-pyrazol-5-yl]-3-methoxyphenoxy)methyl]morpholine-4-carboxylate. Tert-butyl (2R)-2-((2-[3-((5-cyanopyrazin-2-yl]amino)-1H-pyrazol-5-yl]-3-methoxyphenoxy)methyl]morpholine-4-carboxylate and TFA in DCM were deprotected at room temperature to obtain the target compound (R)-5-((5-(2-methoxy-6-(morpholin-2-ylmethoxy)phenyl)-1H-pyrazol-3-yl)amino)pyrazine-2-carbonitrile.

Scheme 2

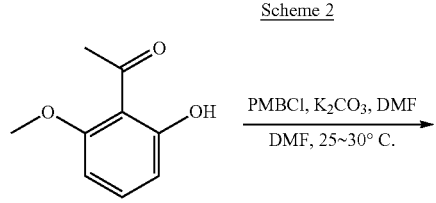

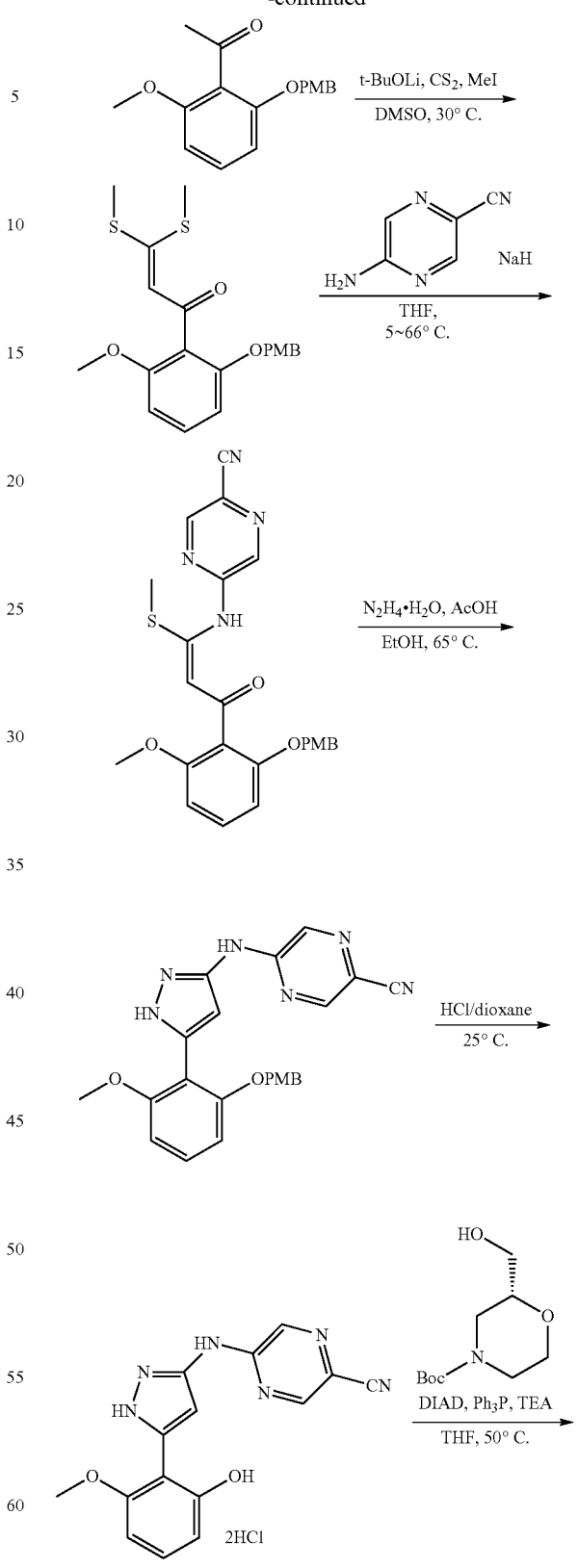

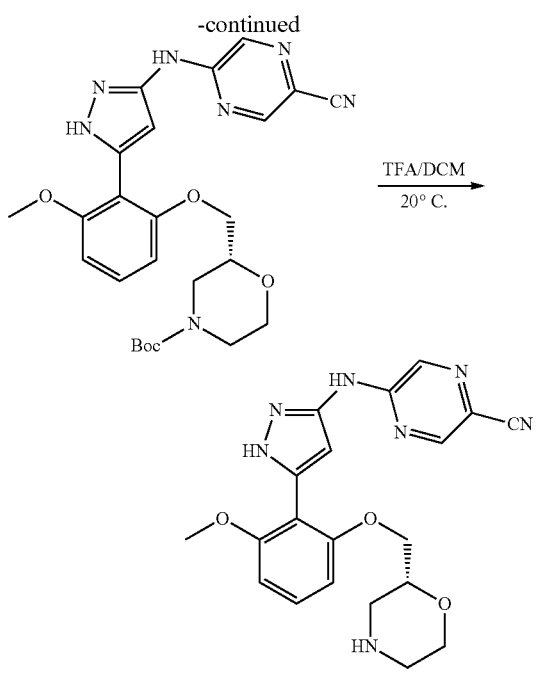

Other related compounds can be prepared similarly. For example, replacement of tert-butyl (2R)-2-(hydroxymethyl)morpholine-4-carboxylate with tert-butyl (3S)-3-(hydroxymethyl)morpholine-4-carboxylate produced the target compound (R)-5-((5-(2-methoxy-6-(morpholin-3-ylmethoxy)phenyl)-1H-pyrazol-3-yl)amino)pyrazine-2-carbonitrile. Replacement of tert-butyl (2R)-2-(hydroxymethyl)morpholine-4-carboxylate with 1-allyloxycarbonyl-4-tert-butoxycarbonyl-(s)-2-hydroxymethylpiperazine produced the target compound (S)-5-((5-(2-methoxy-6-(piperazin-2-ylmethoxy)phenyl)-1H-pyrazol-3-yl)amino)pyrazine-2-carbonitrile. Replacement of tert-butyl (2R)-2-(hydroxymethyl)morpholine-4-carboxylate with tert-butyl 4-(hydroxymethyl)piperidine-1-carboxylate produced the target compound 5-((5-(2-methoxy-6-(piperidin-4-ylmethoxy)phenyl)-1H-pyrazol-3-yl)amino)pyrazine-2-carbonitrile. Replacement of tert-butyl (2R)-2-(hydroxymethyl)morpholine-4-carboxylate with tert-butyl (S)-3-(hydroxymethyl)pyrrolidine-1-carboxylate produced the target compound (S)-5-((5-(2-methoxy-6-(pyrrolidin-3-ylmethoxy)phenyl)-1H-pyrazol-3-yl)amino)pyrazine-2-carbonitrile. Replacement of tert-butyl (2R)-2-(hydroxymethyl)morpholine-4-carboxylate with tert-butyl 4-hydroxypiperidine-1-carboxylate produced the target compound 5-((5-(2-methoxy-6-(piperidin-4-yloxy)phenyl)-1H-pyrazol-3-yl)amino)pyrazine-2-carbonitrile. Replacement of tert-butyl (2R)-2-(hydroxymethyl)morpholine-4-carboxylate with tert-butyl 2-(hydroxymethyl)thiomorpholine-4-carboxylate produced the target compounds (R)-5-((5-(2-methoxy-6-(thiomorpholin-2-ylmethoxy)phenyl)-1H-pyrazol-3-yl)amino)pyrazine-2-carbonitrile and (S)-5-((5-(2-methoxy-6-(thiomorpholin-2-ylmethoxy)phenyl)-1H-pyrazol-3-yl)amino)pyrazine-2-carbonitrile.

One important aspect of the present disclosure is the find that the compounds of Formula I (including the compounds of Formulae IIa, IIb, III and IV as described herein) are kinase inhibitors, especially CHK1 kinase inhibitors. Therefore, the compounds of Formula I (including the compounds of Formulae IIa, IIb, III and IV as described herein) or stereoisomers, tautomers, N-oxides, hydrates, solvates or salts thereof, or mixtures thereof, or prodrugs thereof can be used for the treatment of diseases, disorders and conditions associated with continuous activation of CHK1 or with high internal DNA damage or injury during DNA replication, or for the preparation of medicament for the treatment of diseases, disorders and conditions associated with continuous activation of CHK1 or with high internal DNA damage or injury during DNA replication.

In the present disclosure, the diseases, disorders and conditions associated with continuous activation of CHK1 or with high internal DNA damage or injury during DNA replication includes cancer. Cancer can be a solid tumor or a blood tumor, including but not limited to liver cancer, melanoma, Hodgkin's disease, non-Hodgkin's lymphoma, acute lymphocytic leukemia, chronic lymphocytic leukemia, multiple myeloma, neuroblastoma, breast cancer, ovarian cancer, lung cancer, Wilms tumor, cervical cancer, testicular cancer, soft tissue sarcoma, primary macroglobulinemia, bladder cancer, chronic myeloid leukemia, primary brain cancer, malignant melanoma, small cell lung cancer, gastric cancer, colon cancer, malignant pancreatic islet tumor, malignant carcinoid cancer, choriocarcinoma, mycosis fungoides, head and neck cancer, osteogenic sarcoma, pancreatic cancer, acute myeloid leukemia, hairy cell leukemia, rhabdomyosarcoma, Kaposi's sarcoma, urogenital tumors, thyroid cancer, esophageal cancer, malignant hypercalcemia, cervical hyperplasia, renal cell carcinoma, endometrial cancer, polycythemia vera, idiopathic thrombocythemia, adrenocortical carcinoma, skin cancer and prostate cancer. Preferably, the cancer is related to continuous activation of CHK1 or to high internal DNA damage or injury during DNA replication; the phrase "related to" means that it plays a role in the occurrence and development of cancer, such as leading to the occurrence of cancer, and/or promoting the development or metastasis of cancer.

Therefore, the disclosure also provides a method for the treatment or prevention of diseases, disorders and conditions associated with continuous activation of CHK1 or with high internal DNA damage or injury during DNA replication, the method comprising administering to a subject in need thereof an effective amount of a compound of Formula I (including the compounds of Formulae IIa, IIb, III and IV as described herein) or a pharmaceutically acceptable salt, geometric isomer, enantiomer, diastereoisomer, racemate, solvate, hydrate or prodrug thereof, or a pharmaceutical composition comprising an effective amount of a compound of Formula I (including the compounds of Formulae IIa, IIb, III and IV as described herein) or a pharmaceutically acceptable salt, geometric isomer, enantiomer, diastereoisomer, racemate, solvate, hydrate or prodrug thereof. In the disclosure, the subject includes mammal, more specifically human.

In practicing the therapeutic methods of the disclosure, effective amounts of pharmaceutical preparations are administered to a patient exhibiting one or more of these symptoms. The pharmaceutic preparation comprises therapeutically effective concentrations of the compounds of Formula I (including the compounds of Formulae IIa, IIb, III and IV as described herein) for oral, intravenous, local or topical application, for the treatment of cancer and other diseases. The amounts are effective to ameliorate or eliminate one or more symptoms. An effective amount of a compound for treating a particular disease is an amount that is sufficient to ameliorate or in some manner relieve symptoms associated with a disease. Such amount may be administered as a single dosage or may be administered according to an effective regimen. The amount may cure the disease but, typically, is administered in order to ameliorate symptoms of a disease. Typically, repeated administration is required to achieve the desired amelioration of symptoms.

In another embodiment, there is provided a pharmaceutical composition comprising a compound of Formula I of the disclosure (including the compounds of Formulae IIa, IIb, III and IV as described herein) or a pharmaceutically acceptable salt, geometric isomer, enantiomer, diastereoisomer, racemate, solvate, hydrate or prodrug thereof as a CHK1 inhibitor, and a pharmaceutically acceptable carrier.

Another embodiment of the present disclosure is directed to a pharmaceutical composition effective to treat a cancer comprising a compound of Formula I, IIa, IIb, III or IV of the disclosure, or a pharmaceutically acceptable salt, geometric isomer, enantiomer, diastereoisomer, racemate, solvate, hydrate or prodrug thereof as a CHK1 inhibitor, and at least one known anticancer agent or a pharmaceutically acceptable salt thereof. The at least one known anticancer agent or a pharmaceutically acceptable salt thereof includes other anticancer agents related to the mechanism of DNA damage and repair, including PARP inhibitors Olaparib, Niraprib, Rucaparib, Talazoparib and Senaparib; HDAC inhibitors Volinota, Romididesin, Papiseta and Bailesta; and so on. The at least one known anticancer agent or a pharmaceutically acceptable salt thereof also includes other anticancer agents related to cell division checkpoints, including CDK4/6 inhibitors, such as Palbociclib, ATM/ATR inhibitors, and so on. Other known anticancer agents which may be used for anticancer combination therapy include, but are not limited to alkylating agents, such as busulfan, melphalan, chlorambucil, cyclophosphamide, ifosfamide, temozolomide, bendamustine, cis-platin, mitomycin C, bleomycin and carboplatin; topoisomerase I inhibitors, such as camptothecin, irinotecan and topotecan; topoisomerase II inhibitors, such as doxorubicin, epirubicin, aclacinomycin, mitoxantrone, elliptinium and etoposide; RNA/DNA antimetabolites, such as 5-azacytidine, gemcitabine, 5-fluorouracil, capecitabine and methotrexate; DNA antimetabolites, such as 5-fluoro-2'-deoxy-uridine, fludarabine, nelarabine, ara-C, pralatrexate, pemetrexed, hydroxyurea and thioguanine; antimitotic agent, such as colchicine, vinblastine, vincristine, vinorelbine, paclitaxel, ixabepilone, cabazitaxel and docetaxel; antibodies, such as mAb, panitumumab, necitumumab, nivolumab, pembrolizumab, ramucirumab, bevacizumab, pertuzumab, trastuzumab, cetuximab, obinutuzumab, ofatumumab, rituximab, alemtuzumab, ibritumomab, tositumomab, brentuximab, daratumumab, elotuzumab, T-DM1, Ofatumumab, Dinutuximab, Blinatumomab, ipilimumab, avastin, herceptin and mabthera; kinase inhibitors, such as imatinib, gefitinib, erlotinib, osimertinib, afatinib, ceritinib, alectinib, crizotinib, erlotinib, lapatinib, sorafenib, regorafenib, vemurafenib, dabrafenib, aflibercept, sunitinib, nilotinib, dasatinib, bosutinib, ponatinib, ibrutinib, cabozantinib, lenvatinib, vandetanib, trametinib, cobimetinib, axitinib, temsirolimus, Idelalisib, pazopanib, Torisel and everolimus. Other known anticancer agents which may be used for anticancer combination therapy include tamoxifen, letrozole, fulvestrant, mitoguazone, octreotide, retinoic acid, arsenic, zoledronic acid, bortezomib, carfilzomib, Ixazomib, vismodegib, sonidegib, denosumab, thalidomide, lenalidomide, Venetoclax, Aldesleukin (recombinant human interleukin-2) and Sipueucel-T (prostate cancer treatment vaccine).

In practicing the methods of the present disclosure, the compound(s) of the disclosure may be administered together with at least one known anticancer agent in a unitary pharmaceutical composition. Alternatively, the compound(s) of the disclosure may be administered separately from at least one known anticancer agent. In one embodiment, the compound(s) of the disclosure and at least one known anticancer agent are administered substantially simultaneously, i.e. all compound(s) or agent(s) are administered at the same time or one after another, provided that the compound(s) or agent(s) reach therapeutic concentrations in the blood at the same time. In another embodiment, the compound(s) of the disclosure and at least one known anticancer agent are administered according to individual dosage regimens, provided that the compound(s) reach therapeutic concentrations in the blood.

Another embodiment of the present disclosure is directed to a bioconjugate, which functions as a kinase inhibitor that comprises a compound of the disclosure and is effective to inhibit tumor. The bioconjugate of the disclosure comprises or consists of the compound(s) of the disclosure and at least one known therapeutically useful antibody, such as trastuzumab or rituximab, or growth factor, such as EGF or FGF, or cytokine, such as IL-2 or IL-4, or any molecule that can bind to cell surface. The antibodies and other molecules could deliver the compound(s) described herein to the targets, making it an effective anticancer agent. The bioconjugates could also enhance the anticancer effects of the therapeutically useful antibodies, such as trastuzumab or rituximab.

Another embodiment of the present disclosure is directed to a pharmaceutical composition effective to inhibit tumor comprising the CHK1 inhibitor of Formula I, IIa, IIb, III or IV or a pharmaceutically acceptable salt, geometric isomer, enantiomer, diastereoisomer, racemate, solvate, hydrate or prodrug thereof, in combination with radiation therapy. In this embodiment, the compound(s) of the disclosure may be administered at the same time or at a different time as the radiation therapy.

Another embodiment of the present disclosure is directed to a pharmaceutical composition effective for post-surgical treatment of cancer, comprising the CHK1 inhibitor of Formula I, IIa, IIb, III or IV, or a pharmaceutically acceptable salt, geometric isomer, enantiomer, diastereoisomer, racemate, solvate, hydrate or prodrug thereof. The disclosure also relates to a method of surgically removing tumor and then treating the cancer of the mammal with the pharmaceutical composition of the disclosure.

Pharmaceutical compositions of the disclosure include all pharmaceutical preparations which contain the compound(s) of the present disclosure in an amount that is effective to achieve its intended purpose. While individual needs are different, the skill of the art could determine optimal amounts of each component in the pharmaceutical preparations. Typically, the compound(s) or the pharmaceutically acceptable salts thereof may be administered to mammals orally at a dose of about 0.0025 to 50 mg per kg body weight per day. Preferably, from approximately 0.01 mg/kg to approximately 10 mg/kg body weight is orally administered. If a known anticancer agent is also administered, it is administered in an amount that is effective to achieve its intended purpose. The optimal amounts of such known anticancer agents are well known to those skilled in the art.

The unit oral dose may comprise from approximately 0.01 to approximately 50 mg, preferably approximately 0.1 to approximately 10 mg of the compound(s) of the disclosure. The unit dose may be administered one or more times, with one or more tablets daily, each containing from approximately 0.1 to approximately 50 mg, conveniently approximately 0.25 to 10 mg of the compound(s) of the disclosure or solvates thereof.

In a topical formulation, the compound(s) of the disclosure may be present at a concentration of approximately 0.01 to 100 mg per gram of carrier.

The compound(s) of the disclosure may be administered as a raw chemical. The compound(s) of the disclosure may also be administered as part of a suitable pharmaceutical preparation containing pharmaceutically acceptable carriers (comprising excipients and auxiliaries). Such pharmaceutically acceptable carriers facilitate the manufacture of pharmaceutically acceptable preparations from the compound(s). Preferably, the pharmaceutical preparations, particularly oral preparations and those used for the preferred administration routes, such as tablets, lozenges, and capsules, as well as solutions suitable for injection or oral administration, contain from approximately 0.01% to 99%, preferably from approximately 0.25% to 75% of active compound(s), together with excipient(s).

Also included within the scope of the present disclosure are the non-toxic pharmaceutically acceptable salts of the compound(s) of the present disclosure. Acid addition salts are formed by mixing a solution of the compound(s) of the present disclosure with a solution of a pharmaceutically acceptable non-toxic acid, such as hydrochloric acid, fumaric acid, maleic acid, succinic acid, acetic acid, citric acid, tartaric acid, carbonic acid, phosphoric acid, oxalic acid, and the like. Base addition salts are formed by mixing a solution of the compounds of the present disclosure with a solution of a pharmaceutically acceptable non-toxic base, such as sodium hydroxide, potassium hydroxide, choline hydroxide, sodium carbonate, tris(hydroxymethyl)aminomethane, N-methyl-glucamine and the like.

The pharmaceutical preparations of the disclosure may be administered to any mammal, so long as they may experience the therapeutic effects of the compound(s) of the disclosure. Foremost among such mammals are humans and veterinary animals, although the disclosure is not intended to be so limited.

The pharmaceutical preparations of the present disclosure may be administered by any means that achieve their intended purpose. For example, administration may be by parenteral, subcutaneous, intravenous, intramuscular, intraperitoneal, transdermal, buccal, intrathecal, intracranial, intranasal or topical routes. Alternatively or additionally, administration may be by oral route. The dosage administered will be dependent upon the age, health, and weight of the subject, the combined therapy, frequency of treatment, and the desired therapeutic efficacy.

The pharmaceutical preparations of the present disclosure can be manufactured in a known manner, e.g., by conventional mixing, granulating, dragee-making, dissolving, or lyophilizing. Pharmaceutical preparations for oral use may be obtained by combining the active compound(s) with solid excipient(s), optionally grinding the resulting mixture, adding suitable auxiliaries if desired or necessary, processing the mixture of granules, thereby obtaining tablets or lozenge cores.

Suitable excipients are, in particular, fillers, such as saccharides, e.g. lactose or sucrose, mannitol or sorbitol; cellulose preparations and/or calcium phosphates, e.g. tricalcium phosphate or calcium hydrogen phosphate; as well as binders, such as starch paste, including maize starch, wheat starch, rice starch, potato starch, gelatin, tragacanth, methylcellulose, hydroxypropylmethylcellulose, sodium carboxymethylcellulose, and/or polyvinyl pyrrolidone. If desired, disintegrating agents may be added, such as the above-mentioned starches and carboxymethyl-starch, cross-linked polyvinyl pyrrolidone, agar, or alginic acid or a salt thereof, such as sodium alginate. Auxiliaries are, in particular, flow-regulating agents and lubricants, e.g., silica, talc, stearic acid or salts thereof, such as magnesium stearate or calcium stearate, and/or polyethylene glycol. If desired, lozenge cores can be provided with suitable coatings against gastric juices. For this purpose, concentrated saccharide solutions may be used, which may optionally contain gum arabic, talc, polyvinyl pyrrolidone, polyethylene glycol and/or titanium dioxide, lacquer solutions and suitable organic solvents or solvent mixtures. In order to produce coatings against gastric juices, solutions of suitable cellulose preparations, such as acetylcellulose phthalate or hydroxypropylmethylcellulose phthalate, are used. Dyes or pigments may be added to the tablets or lozenge coatings, e.g., a combination to recognize or characterize a dose of active compound(s).

Other pharmaceutical preparations, which may be used orally, include push-fit capsules made of gelatin, as well as soft sealed capsules made of gelatin and a plasticizer, such as glycerol or sorbitol. The push-fit capsules may contain the active compound(s) in the form of granules, which may be mixed with fillers, such as lactose; binders, such as starches; and/or lubricants, such as talc or magnesium stearate; and stabilizers. In soft capsules, the active compound(s) are preferably dissolved or suspended in suitable liquids, such as fatty oils or liquid paraffin, in which stabilizers may be added.

Suitable formulations for parenteral administration include aqueous solutions of the active compounds, e.g., aqueous solutions and alkaline solutions of water-soluble salts. In addition, suspensions of the active compounds as appropriate oily injection suspensions may be administered. Suitable lipophilic solvents or vehicles include fatty oils, e.g., sesame oil, or synthetic fatty acid esters, e.g., ethyl oleate or triglycerides or polyethylene glycol-400, or cremophor, or cyclodextrins. Aqueous injection suspensions may contain substances which increase the viscosity of the suspension, e.g., sodium carboxymethyl cellulose, sorbitol, and/or dextran. Optionally, suspension stabilizers may also be contained.

In accordance with one aspect of the present disclosure, compounds of the disclosure are provided in topical and parenteral formulations and are used for the treatment of skin cancer.

The topical formulations of this disclosure can be formulated as oils, creams, lotions, ointments and the like by suitable carriers. Suitable carriers include vegetable or mineral oils, white petrolatum (white soft paraffin), branched chain fats or oils, animal fats and high molecular weight alcohol (greater than Cu). Preferred carriers are those in which the active ingredient(s) are soluble. Emulsifiers, stabilizers, humectants and antioxidants may also be included, as well as agents imparting color or fragrance, if desired. Additionally, transdermal penetration enhancers may be included in these topical formulations. Examples of such enhancers can be found in U.S. Pat. Nos. 3,989,816 and 4,444,762.

Creams are preferably formulated from a mixture of mineral oil, self-emulsifying beeswax and water, which is mixed with the active ingredient(s) dissolved in a small amount of an oil, such as almond oil. A typical example of such a cream is one which includes approximately 40 parts water, approximately 20 parts beeswax, approximately 40 parts mineral oil and approximately 1 part almond oil.

Ointments may be formulated by mixing a solution of the active ingredient(s) in a vegetable oil, such as almond oil, with warm soft paraffin and allowing the mixture to cool. A typical example of such ointments is one which includes approximately 30% by weight of almond oil and approximately 70% by weight of white soft paraffin.

The present disclosure also involves use of the compounds of the disclosure for the preparation of medicaments for the treatment of diseases, disorders and clinical symptoms related to continuous activation of CHK1 or to high internal DNA damage or injury during DNA replication. These medicaments may include the above-mentioned pharmaceutical compositions.

The following examples are illustrative, but not limiting, of the methods and preparations of the present disclosure. Other suitable modifications and adaptations of various conditions and parameters normally encountered in clinical therapy and which are obvious to those skilled in the art are within the spirit and scope of the disclosure.

EXAMPLES

General Remarks

All reagents were of commercial quality. Solvents were dried and purified by standard methods. Mass spectrum analyses were recorded on a Platform II (Agilent 6110) single quadrupole mass spectrometer equipped with an electrospray interface. $^1$H NMR spectra was recorded at 400 MHz, on a Brücker Ascend 400 apparatus. Chemical shifts were recorded in ppm from low-field relative to internal TMS (0.00 ppm), and J coupling constants were reported in hertz (Hz). The optical purity of the compound sample was analyzed on a Shimadzu LC-30ADsf.

Example 1

(S)-5-((5-(2-methoxy-6-(morpholin-2-ylmethoxy)phenyl)-1H-pyrazol-3-yl)amino)pyrazine-2-carbonitrile a) (2E)-3-(dimethylamino)-1-(2-hydroxy-6-methoxyphenyl)-2-propenyl-1-one: A mixture of 1-(2-hydroxy-6-methoxyphenyl)-1-ethanone (25 g, 150.4 mmol) and N,N-dimethylformamide dimethyl acetal (DMF-DMA, 80.6 mL, 676.1 mmol) was stirred at 110° C. for 1 hour. The reaction solution was quenched with water (100 mL) and filtered, and the solid was washed with water (100 mL×3) to obtain the target product (30.5 g, 91% yield, yellow solid). MS (ESI, m/z): 222 [M+H]$^+$.

b) 3-methoxy-2-(1,2-oxazol-5-yl)phenol: A mixture of (2E)-3-(dimethylamino)-1-(2-hydroxy-6-methoxyphenyl)-2-propenyl-1-one (8.2 g, 37.1 mmol) and hydroxylamine hydrochloride (2.3 g, 55.5 mmol) in ethanol was stirred at 70° C. for 1 hour under the protection of N$_2$. The reaction solution was quenched with water (100 mL) and filtered, and the solid was washed with water (100 mL×3) to obtain the target product (6.8 g, 95% yield, yellow solid). MS (ESI, m/z): 192 [M+H]$^+$.

c) tert-butyl (2S)-2-[3-methoxy-2-(1,2-oxazol-5-yl)phenoxymethyl]morpholine-4-carboxylate: A mixture of triphenylphosphine (PPh$_3$, 5.5 g, 20.9 mmol) and diisopropyl azodicarboxylate (DIAD, 4.2 g, 20.9 mmol) in tetrahydrofuran (30 mL) was stirred under the protection of N$_2$ for 30 minutes at 0° C. Then 3-methoxy-2-(1,2-oxazol-5-yl)phenol (2.0 g, 10.5 mmol) and tert-butyl (2S)-2-(hydroxymethyl)morpholine-4-carboxylate (2.7 g, 12.6 mmol) were added to the reaction at 0° C. The reaction mixture was stirred at room temperature for 16 hours. The reaction solution was quenched with water (100 mL), and extracted with ethyl acetate (80 mL×3). The organic phases were combined, washed with saturated brine (40 mL×2), and dried with anhydrous sodium sulfate. The mixture was filtered, the filtrate was concentrated under reduced pressure to obtain the crude product, which was purified by silica gel column chromatography (eluting with ethyl acetate in petroleum ether (1-50%)) to obtain the target product (1.5 g, 36%, grayish white solid). MS (ESI, m/z): 391 [M+H]$^+$.

d) tert-butyl (2S)-2-[2-(2-cyanoacetyl)-3-methoxyphenoxymethyl]morpholine-4-carboxylate: A mixture of tert-butyl (2S)-2-[3-methoxy-2-(1,2-oxazol-5-yl)phenoxymethyl]morpholine-4-carboxylate (1.50 g, 3.8 mmol) and potassium hydroxide (0.43 g, 7.7 mmol) in ethanol (15 mL) and water (5 ml) was stirred at room temperature for 16 hours. The reaction solution was extracted with ethyl acetate (80 mL×3), and the organic phases were combined, washed with saturated brine (40 mL×2) and dried with anhydrous sodium sulfate. The mixture was filtered, the filtrate was concentrated under reduced pressure to obtain the crude product, which was purified by silica gel column chromatography (eluting with ethyl acetate in petroleum ether (1-50%)) to obtain the target product (648 mg, 65% yield, grayish white solid). MS (ESI, m/z): 391 [M+H]$^+$.

e) tert-butyl (2S)-2-[2-(5-amino-2H-pyrazol-3-yl)-3-methoxyphenoxymethyl]morpholine-4-carboxylate: A mixture of tert-butyl (2S)-2-[2-(2-cyanoacetyl)-3-methoxyphenoxymethyl]morpholine-4-carboxylate (648 mg, 1.7 mmol) and hydrazine hydrate (0.35 mL, 2.5 mmol, 35%) in tetrahydrofuran (1 mL), water (1 mL) and methanol (2 mL) was stirred, to which was added acetic acid (0.10 mL, 1.58 mmol). The reaction mixture was stirred at 120° C. for 3 hours, and after cooled to room temperature, it was diluted with water (50 mL), and extracted with ethyl acetate (80 mL×3). The organic phases were combined, washed with saturated brine (40 mL×2), and dried with anhydrous sodium sulfate. The mixture was filtered, the filtrate was concentrated under reduced pressure to obtain the crude product, which was purified by silica gel column chromatography (eluting with methanol in dichloromethane (1-10%)) to obtain the target product (512 mg, 76% yield, grayish white solid). MS (ESI, m/z): 405 [M+H]$^+$.

f) tert-butyl (2S)-2-(2-[5-[(5-cyanopyrazin-2-yl)amino]-2H-pyrazol-3-yl]-3-methoxyphenoxy)morpholine-4-carboxylate: N-ethylmorpholine (48 μL, 0.534 mmol) was added to a mixture of tert-butyl (2S)-2-[2-(5-amino-2H-pyrazol-3-yl)-3-methoxyphenoxymethyl]morpholine-4-carboxylate (180 mg, 0.45 mmol) and 5-chloropyrazine-2-carbonitrile (71 mg, 0.51 mmol) in dimethyl sulfoxide (4 mL). The reaction mixture was stirred under the protection of N$_2$ at 80° C. for 3 hours, and the obtained reaction solution was diluted with water (20 mL) and extracted with ethyl acetate (30 mL×3). The organic phases were combined, washed with saturated brine (40 mL×2), and dried with anhydrous sodium sulfate. The mixture was filtered, the filtrate was concentrated under reduced pressure to obtain the crude product, which was purified by silica gel column chromatography (eluting with methanol in dichloromethane (1-10%)) to obtain the target product (154 mg, 68% yield, grayish white solid). MS (ESI, m/z): 508 [M+H]$^+$.

g) (S)-5-((5-(2-methoxy-6-(morpholin-2-ylmethoxy)phenyl)-1H-pyrazol-3-yl)amino)pyrazine-2-carbonitrile: A solution of tert-butyl (2S)-2-(2-[5-[(5-cyanopyrazin-2-yl)amino]-2H-pyrazol-3-yl]-3-methoxyphenoxy)morpholine-4-carboxylate (120 mg, 0.236 mmol) in dichloromethane (1 mL) and trifluoroacetic acid (0.2 mL) was stirred at room temperature for 1 hour. The reaction solution was concentrated under reduced pressure to obtain the crude product, which was purified by reverse phase chromatography (XBridge Shield RP18 OBD column, 30×150 mm, 5 μm; mobile phase A: water (10 mM $NH_4HCO_3$), mobile phase B: acetonitrile; UV 254 nm) to obtain the target compound (30 mg, 31% yield, grayish white solid).

Example 2

(S)-5-((5-(2-methoxy-6-(morpholin-2-ylmethoxy) phenyl)-1H-pyrazol-3-yl)amino)picolinonitrile The compound of this example was prepared using a method similar to that of Example 1.

Example 3

(R)-5-((5-(2-methoxy-6-(morpholin-2-ylmethoxy) phenyl)-1H-pyrazol-3-yl)amino)pyrazine-2-carbonitrile a) 1-(2-methoxy-6-((4-methoxybenzyl)oxy)phenyl)ethane-1-one: $K_2CO_3$ (4.16 g, 30.09 mmol) was added to a solution of 1-(2-hydroxy-6-methoxyphenyl)ethenone (2 g, 12.04 mmol) in DMF (16 mL), and the mixture was stirred at 25° C. for 30 min. Then p-methoxybenzyl chloride (PMBCl, 2.26 g, 14.44 mmol, 1.97 mL) was added dropwise to the above reaction mixture, and the reaction mixture was stirred at 25° C. for 12 h. Water (80 mL) was added to quench the reaction, the mixture was extracted with EA (80 mL×3), and the organic phases were combined, washed with saturated sodium chloride solution (50 mL×3), dried with anhydrous sodium sulfate, then filtered and concentrated under reduced pressure. The residue obtained was pulped in PE (10 mL) at 30° C. for 10 min to obtain the target crude product (3.12 g, yellow solid, 90.4% yield). $^1$H NMR (400 MHz, $CDCl_3$): δ 7.31-7.29 (m, 2H), 7.24 (t, J=8.4 Hz, 1H), 6.91-6.88 (m, 2H), 6.61 (d, J=4.4 Hz, 1H), 6.57 (d, J=4.4 Hz, 1H), 5.02 (s, 2H), 3.82-3.81 (m, 6H), 2.47 (s, 3H).

b) 1-(2-methoxy-6-((4-methoxyphenyl)methoxy)phenyl)-3,3-bis(methylsulfonyl)-2-propen-1-one: 1-(2-methoxy-6-((4-methoxybenzyl)oxy)phenyl)ethan-1-one (1 g, 3.49 mmol) was added to a mixture of t-BuOLi (615.11 mg, 7.68 mmol, 692.70 uL) in anhydrous DMSO (2 mL) under the protection of nitrogen. The internal temperature was kept below 30° C., the obtained mixture was stirred for 30 min, and $CS_2$ (319.11 mg, 4.19 mmol, 253.26 uL) was slowly added. The mixture was stirred at 30° C. for 1 h, and MeI (991.46 mg, 6.99 mmol, 434.85 uL) was slowly added, with the internal temperature kept below 30° C. The obtained mixture was stirred at 30° C. for 1.5 h. Water (80 mL) was added to dilute the mixture, the mixture was extracted with EA (30 mL×3), and the organic phases were combined, dried with anhydrous sodium sulfate, then filtered and concentrated under reduced pressure. The residue obtained was pulped in EA at 30° C. for 15 min and washed with MTBE (10 mL×3) to obtain the target crude product (1.04 g, yellow solid, 76.5% yield). MS (ESI, m/z): 391.0 [M+H]$^+$. $^1$H NMR (400 MHz, $CDCl_3$): δ 7.31-7.29 (m, 2H), 7.22 (t, J=8.4 Hz, 1H), 6.88-6.86 (m, 2H), 6.59 (t, J=8.8 Hz, 2H), 6.26 (s, 1H), 5.03 (s, 1H), 3.81-3.75 (m, 6H), 2.51 (s, 3H), 2.31 (s, 3H).

c) 5-(((E)-3-(2-methoxy-6-((4-methoxyphenyl)methoxy) phenyl)-1-methylsulfonyl-3-oxo-1-propenyl)amino)pyrazine-2-carbonitrile: A mixed solution of NaH (46.09 mg, 1.15 mmol, 60% purity) and THF (3 mL) was cooled to 5-15° C., and 5-aminopyrazine-2-carbonitrile (110.73 mg, 921.86 umol) was added in four portions to control the release of hydrogen, fading away foams at the interval of adding, with the temperature maintained at 10° C. The mixture was stirred for 90 min, and at the meantime the temperature was allowed to rise to 15° C. 1-(2-Methoxy-6-((4-methoxyphenyl)methoxy)phenyl)-3,3-bis(methylsulfonyl)-2-propen-1-one (300 mg, 768.22 umol) was added to the above reaction mixture in several portions to control the foams. The mixture was stirred for 15 min, then heated to reflux and react at 66° C. for 2 h. The reaction mixture was poured into cold water (40 mL), and extracted with EA (40 mL×3). The organic phases were combined, dried with anhydrous sodium sulfate, filtered, and concentrated under reduced pressure. The obtained residue was recrystallized in EA (10 mL) at 30° C. to obtain the target crude product (231 mg, yellow solid, 65.1% yield). MS (ESI, m/z): 463.1 [M+H]$^+$.

d) 5-((5-(2-methoxy-6-((4-methoxyphenyl)methoxy)phenyl)-1H-pyrazol-3-yl)amino)pyrazine-2-carbonitrile: The atmosphere in a reaction flask containing a mixture of 5-(((E)-3-(2-methoxy-6-((4-methoxyphenyl)methoxy)phenyl)-1-methylsulfonyl-3-oxo-1-propenyl)amino)pyrazine-2-carbonitrile (230 mg, 497.28 umol), AcOH (86.95 mg, 1.45 mmol, 82.81 uL) and EtOH (5.5 mL) was replaced with nitrogen for three times. Then $N_2H_4 \cdot H_2O$ (49.31 mg, 965.32 umol, 47.87 uL, 98% purity) was added dropwise, and the resulting mixture was stirred at 65° C. for 1 h under the protection of nitrogen. The reaction mixture was filtered to obtain a filter cake. The filter cake was washed with EtOH (5 mL×3) to obtain the target crude product (197 mg, yellow solid, 85.7% yield). MS (ESI, m/z): 429.1 [M+H]$^+$.

e) 5-((5-(2-hydroxy-6-methoxyphenyl)-1H-pyrazol-3-yl) amino)pyrazine-2-carbonitrile dihydrochloride: HCl-dioxane solution (4 M, 5.75 mL) was added to a solution of 5-((5-(2-methoxy-6-((4-methoxyphenyl)methoxy)phenyl)-1H-pyrazol-3-yl)amino)pyrazine-2-carbonitrile (197 mg, 459.80 umol) in dioxane (6 mL). The obtained mixture was stirred at 25° C. for 10 h, and then concentrated under reduced pressure to obtain the target crude product (161 mg, yellow solid, 95.3% yield). MS (ESI, m/z): 309.1 [M+H]$^+$.

f) tert-butyl (2R)-2-((2-[3-((5-cyanopyrazin-2-yl)amino)-1H-pyrazol-5-yl]-3-methoxyphenoxy)methyl]morpholine-4-carboxylate: A −5° C. solution of 5-((5-(2-hydroxy-6-methoxy-phenyl)-1H-pyrazol-3-yl)amino)pyrazine-2-carbonitrile dihydrochloride (161 mg, 422.33 umol) in THF (2 ml) was added with TEA (105.69 mg, 1.04 mmol, 145.38 uL). The resulting mixed solution was stirred at −5° C. for 30 min to obtain mixture A. Triphenylphosphate (342.44 mg, 1.31 mmol) was dissolved in THF (2 ml) at 25° C. The resulting colorless and clear solution was cooled to −5° C. in acetone/ice bath, and diisopropyl azodicarboxylate (DIAD, 253.44 mg, 1.25 mmol, 243.69 uL) was added dropwise to the solution for 20 min, with the temperature maintained below 10° C. The resulting thick white pulp was cooled again to −5-0° C., a solution of tert-butyl (2R)-2-(hydroxymethyl)morpholine-4-carboxylate (283.65 mg, 1.31 mmol) in THF (2 mL) was added, and the mixture was stirred at −5° C. for 20 min to obtain mixture B. Mixture A was added dropwise to mixture B at −5° C. and stirred at 50° C. for 30 min. The residue obtained from the reaction mixture by concentration under reduced pressure was purified by preparative thin plate chromatography ($SiO_2$, PE:EA=1:1), and then isolated and purified by preparative column to obtain the target crude product (12 mg, yellow solid, 5.6% yield). MS (ESI, m/z): 508.2 [M+H]⁺.

g) (R)-5-((5-(2-methoxy-6-(morpholin-2-ylmethoxy)phenyl)-1H-pyrazol-3-yl)amino)pyrazine-2-carbonitrile: TFA (808.77 mg, 7.09 mmol, 525.17 uL) was added to a solution of tert-butyl (2R)-2-((2-[3-[((5-cyanopyrazin-2-yl)amino)-1H-pyrazol-5-yl]-3-methoxyphenoxy)methyl]morpholine-4-carboxylate (12 mg, 23.64 umol) in DCM (2.5 mL) at 0° C. The resulting mixture was stirred at 20° C. for 1 h, and then concentrated under reduced pressure to obtain the crude product, which was isolated and purified by preparative chromatographic column to obtain the target compound (7.59 mg, 14.05 umol, white solid, 59.44% yield).

The compound of Example 4 was synthesized from the compound of Example 1 and MeI in DMF in the presence of $K_2CO_3$. The compound can also be synthesized by other methods known to those skilled in the art.

Examples 5-50 were prepared using the synthesis methods similar to that of Example 1 or 2. The compounds can also be synthesized by other methods known to those skilled in the art.

| Example | Compound | MW | LC-MS (ESI, m/z) | ¹H NMR (400 MHz) | SFC (ee %) |
|---|---|---|---|---|---|
| 1 | (structure) | 407.43 | [M + H]⁺ 408 | DMSO-d₆: δ 12.32 (s, 1H), 10.74 (s, 1H), 8.70 (d, J = 1.2 Hz, 1H), 8.50 (brs, 1H), 7.32 (dd, J = 8.4, 8.4 Hz, 1H), 6.97 (s, 1H), 6.79 (dd, J = 8.4, 4.8 Hz, 2H), 4.02-4.01 (m, 2H), 3.84 (s, 3H), 3.80-3.77 (m, 2H), 3.53-3.47 (m, 1H), 2.93 (d, J = 11.7 Hz, 1H), 2.74-2.62 (m, 2H), 2.61-2.52 (m, 2H). | — |
| 2 | (structure) | 406.45 | [M + H]⁺ 407.1 | DMSO-d₆: δ 12.16 (s, 1H), 9.54 (s, 1H), 8.62 (d, J = 2.4 Hz, 1H), 7.96 (dd, J = 8.4 Hz, 1H), 7.80 (d, J = 12.0 Hz, 1H), 7.31 (t, J = 8.0 Hz, 1H), 6.78 (dd, J = 8.0 Hz, 2H), 6.36 (s, 1H), 4.02 (d, J = 8.0 Hz, 2H), 3.83 (s, 3H), 3.75-3.76 (m, 2H), 3.49-3.50 (m, 1H), 2.83 (dd, J = 8.0 Hz, 1H), 2.66-2.67 (m, 2H), 2.53-2.52 (m, 1H). | 100% |
| 3 | (structure) | 407.43 | [M + H]⁺ 408.2 | MeOD: δ 8.52-8.50 (m, 2H), 7.36 (t, J = 8.4 Hz, 1H), 6.89 (s, 1H), 6.87 (d, J = 8.4 Hz, 1H), 6.78 (d, J = 8 Hz, 1H), 4.21-4.18 (m, 3H), 4.16-4.08 (m, 1H), 3.91-3.88 (m, 4H), 3.39-3.36 (m, 1H), 3.27 (s, 1H), 3.15-3.08 (m, 2H). | 100% |

-continued

| Example | Compound | MW | LC-MS (ESI, m/z) | ¹H NMR (400 MHz) | SFC (ee %) |
|---|---|---|---|---|---|
| 4 | | 421.46 | [M + H]⁺ 422.3 | DMSO-d₆: δ 12.31 (s, 1H), 10.72 (s, 1H), 8.66 (s, 1H), 8.54 (s, 1H), 7.31 (t, J = 8.0 Hz, 1H), 6.94 (s, 1H), 6.76-6.79 (m, 2H), 4.06-4.03 (m, 2H), 3.82-3.80 (m, 5H), 3.55 (t, J = 8.0 Hz, 1H), 2.75 (d, J = 12.0 Hz, 1H), 2.57 (d, J = 12.0 Hz, 1H), 2.11 (s, 3H), 1.97 (t, J = 8.0 Hz, 1H), 1.86 (t, J = 8.0 Hz, 1H). | 100% |
| 5 | | 450.42 | [M + H]⁺ 451.1 | DMSO-d₆: δ 12.24 (d, J = 0.6 Hz, 1H), 10.46 (s, 1H), 8.62 (s, 1H), 8.54 (s, 1H), 7.31 (t, J = 8.0 Hz, 1H), 6.95 (s, 1H), 7.76-7.79 (m, 2H), 4.03 (s, 1H), 4.01 (d, J = 4.0 Hz, 2H), 3.83 (s, 3H), 3.77 (d, J = 6.0 Hz, 2H), 3.49-3.50 (m, 1H), 2.91 (d, J = 6.0 Hz, 1H), 2.56-2.63 (m, 3H). | 100% |
| 6 | | 396.45 | [M + H]⁺ 397.0 | CDCl₃: δ 8.66 (s, 1H), 8.44-8.38 (m, 1H), 7.99 (s, 1H), 7.80-7.75 (m, 1H), 7.26-7.24 (m, 1H), 6.83 (s, 1H), 6.70 (d, J = 8.4 Hz, 1H), 6.62 (d, J = 8.4 Hz, 1H), 4.14-4.10 (m, 4H), 3.88 (s, 3H), 3.89-3.79 (m, 1H), 3.28-3.29 (m, 1H), 3.10-3.07 (m, 2H), 3.00-2.94 (m, 1H), 2.44 (s, 3H). | 100% |
| 7 | | 407.43 | [M + H]⁺ 408.3 | MeOD: δ 8.54 (s, 1H), 8.42 (s, 1H), 7.36 (t, J = 8.4 Hz, 1H), 6.92 (s, 1H), 6.82 (d, J = 8.4 Hz, 1H), 6.79 (d, J = 8.4 Hz, 1H), 4.12-4.10 (m, 2H), 4.06-3.96 (m, 1H), 3.88 (s, 3H), 3.88-3.84 (m, 1H), 3.59-3.56 (m, 2H), 3.35-3.30 (m, 1H), 3.06-3.05 (m, 2H). | 100% |

| Example | Compound | MW | LC-MS (ESI, m/z) | ¹H NMR (400 MHz) | SFC (ee %) |
|---|---|---|---|---|---|
| 8 | | 406.45 | — | — | — |
| 9 | | 405.46 | [M + H]⁺ 406.2 | MeOD: δ 8.52 (s, 1H), 8.46 (s, 1H), 7.35 (t, J = 8.0 Hz, 1H), 6.81-6.75 (m, 3H), 4.09-4.05 (m, 1H), 3.98-3.95 (m, 1H), 3.85 (s, 3H), 3.40-3.31 (m, 1H), 3.30-3.28 (m, 1H), 2.85-2.78 (m, 2H), 2.26-2.24 (m, 1H), 1.96-1.92 (m, 2H), 1.80-1.65 (m, 1H), 1.55-1.40 (m 1H). | 100% |
| 10 | | 406.45 | [M + H]⁺ 407.2 | MeOD: δ 8.49 (brs, 2H), 7.36 (t, J = 4.2 Hz, 1H), 6.88 (s, 1H), 6.82 (d, J = 8.4 Hz, 1H), 6.77 (d, J = 8.4 Hz, 1H), 4.13 (d, J = 4.4 Hz, 2H), 3.88 (s, 3H), 3.35-3.30 (m, 2H), 3.27-3.24 (m, 2H), 3.06-3.00 (m, 2H), 2.99-2.88 (m, 1H). | — |
| 11 | | 420.48 | [M + H]⁺ 421.2 | MeOD: δ 8.54 (d, J = 1.2 Hz, 1H), 8.40 (d, J = 1.2 Hz, 1H), 7.19 (t, J = 8.2 Hz, 1H), 6.96 (s, 1H), 6.62-6.59 (m, 2H), 4.77-4.64 (m, 2H), 4.16-4.14 (m, 1H), 3.87 (s, 3H), 3.77-3.74 (m, 1H), 3.67-3.57 (m, 2H), 3.57-3.46 (m, 2H), 3.33 (d, J = 12.0 Hz, 1H), 3.10 (s, 3H). | 100% |

-continued

| Example | Compound | MW | LC-MS (ESI, m/z) | ¹H NMR (400 MHz) | SFC (ee %) |
|---|---|---|---|---|---|
| 12 | | 405.46 | [M + H]⁺ 406.2 | DMSO-d₆: δ 12.31 (s, 1H), 10.70 (s, 1H), 8.64 (s, 1H), 8.52 (s, 1H), 7.32 (t, J = 8.0 Hz, 1H), 6.87 (s, 1H), 6.79-6.76 (m, 2H), 3.88 (d, J = 4.0 Hz, 2H), 3.81 (s, 3H), 3.20-3.15 (m, 2H), 2.74-2.73 (m, 2H), 2.05-1.95 (m, 1H), 1.98 (d, J = 8.0 Hz, 2H), 1.33-1.27 (m, 2H). | — |
| 13 | | 391.44 | [M + H]⁺ 392.3 | DMSO-d₆: δ 12.37 (brs, 1H), 10.79 (brs, 1H), 8.65 (d, J = 8.4 Hz, 1H), 8.61 (brs, 1H), 8.52 (s, 1H), 7.32 (t, J = 8.4 Hz, 1H), 6.91-6.86 (m, 1H), 6.79-6.76 (m, 2H), 4.05-4.03 (m, 1H), 3.97-3.95 (m, 1H), 3.82 (s, 3H), 3.25-3.20 (m, 2H), 3.07-3.01 (m, 2H), 2.92-2.85 (m, 1H), 2.02-1.99 (m, 1H), 1.63-1.59 (m, 1H). | 100% |
| 14 | | 425.42 | [M + H]⁺ 426.1 | DMSO-d₆: δ 12.35 (s, 1H), 10.72 (brs, 1H), 8.68 (s, 1H), 8.51 (s, 1H), 6.95 (s, 1H), 6.71 (d, J = 11.2 Hz, 2H), 4.02-4.00 (m, 2H), 3.83 (s, 3H), 3.76-3.73 (m, 2H), 3.49-3.43 (m, 1H), 2.87 (d, J = 11.6 Hz, 1H), 2.67-2.50 (m, 3H). | 100% |
| 15 | | 441.88 | [M + H]⁺ 442.1 | DMSO-d₆: δ 12.53 (s, 1H), 10.81 (s, 1H), 8.69 (s, 1H), 8.49 (s, 1H), 7.49 (d, J = 9.2 Hz, 1H), 6.99 (d, J = 9.2 Hz, 2H), 4.03-4.01 (m, 2H), 3.79-3.67 (m, 2H), 3.75 (s, 3H), 3.57-3.45 (m, 1H), 2.86 (d, J = 10.0 Hz, 1H), 2.68-2.55 (m, 3H). | 99.39% |

-continued

| Example | Compound | MW | LC-MS (ESI, m/z) | ¹H NMR (400 MHz) | SFC (ee %) |
|---|---|---|---|---|---|
| 16 | | 441.88 | [M + H]⁺ 442.1 | CDCl₃: δ 11.94 (brs, 1H), 8.73 (d, J = 6.0 Hz, 1H), 8.45 (d, J = 1.2 Hz, 1H), 7.43 (s, 1H), 6.97 (s, 1H), 6.70 (d, J = 18.8 Hz, 2H), 4.23-4.21 (m, 1H), 4.20-4.14 (m, 1H), 4.11-4.09 (m, 1H), 4.07-4.03 (m, 1H), 3.96 (s, 3H), 3.82-3.75 (m, 1H), 3.03-2.96 (m, 2 H), 2.92-2.82 (m, 2H). | 100% |
| 17 | | 441.88 | [M + H]⁺ 442.1 | DMSO-d₆: δ 12.54 (s, 1H), 10.76 (s, 1H), 8.66 (s, 1H), 8.49 (s, 1H), 7.50 (d, J = 8.0 Hz, 1H), 6.96 (d, J = 8.0 Hz, 1H), 6.84 (s, 1H), 3.80 (s, 3H), 3.66-3.62 (m, 2H), 3.56-3.55 (m, 2H), 2.75-2.60 (m, 1H), 2.58-2.52 (m, 3H), 2.34-2.32 (m, 1H). | 98.00% |
| 18 | | 486.33 | [M + H]⁺ 486.0 | DMSO-d₆: δ 12.35 (s, 1H), 10.74 (d, J = 1.6 Hz, 1H), 8.68 (s, 1H), 8.47 (br s, 1H), 7.00-6.99 (m, 3H), 4.04 (d, J = 4.8 Hz, 2H), 3.85 (s, 3H), 3.76-3.74 (m, 2H), 3.50-3.44 (m, 1H), 2.88-2.85 (m, 1H), 2.67-2.62 (m, 3H). | 100% |
| 19 | | 475.43 | [M + H]⁺ 476.1 | MeOD: δ 8.54 (d, J = 1.2 Hz, 1 H), 8.49 (brs, 1H), 7.09 (s, 1H), 7.06 (s, 2H), 4.21-4.19 (m, 1H), 4.16-4.11 (m, 1H), 4.00-3.97 (m, 1H), 3.70 (s, 3H), 3.92-3.85 (m, 1H), 3.74-3.66 (m, 1H), 2.96-2.95 (m, 1H), 2.85-2.83 (m, 2H), 2.82-2.75 (m, 1H). | — |

-continued

| Example | Compound | MW | LC-MS (ESI, m/z) | ¹H NMR (400 MHz) | SFC (ee %) |
|---|---|---|---|---|---|
| 20 | | 461.41 | [M + H]⁺ 462.0 | DMSO-d$_6$: δ 12.79 (brs, 1H), 10.82 (s, 1H), 8.65 (s, 1H), 8.48 (s, 1H), 7.51 (t, J = 8.0 Hz, 1H), 7.22 (d, J = 8.0 Hz, 1H), 7.10 (d, J = 8.0 Hz, 1H), 6.82 (s, 1H), 4.08-4.05 (m, 2H), 3.76-3.73 (m, 2H), 3.51-3.45 (m, 1H), 2.89 (d, J = 12.0 Hz, 1H), 2.70-2.57 (m, 2H), 2.54-2.50 (m, 1H). | 100% |
| 21 | | 406.45 | — | — | — |
| 22 | | 420.48 | — | — | — |
| 23 | | 404.48 | — | — | — |

-continued

| Example | Compound | MW | LC-MS (ESI, m/z) | ¹H NMR (400 MHz) | SFC (ee %) |
|---|---|---|---|---|---|
| 24 | (structure) | 404.46 | [M + H]⁺ 405.1 | MeOD: δ 8.67 (d, J = 1.6 Hz, 1H), 8.05 (dd, J = 9.2, 2.2 Hz, 1H), 7.46 (t, J = 8.6 Hz, 1H), 7.23 (d, J = 8.8 Hz, 1H), 6.86-6.81 (m, 2H), 6.59 (s, 1H), 4.10-3.99 (m, 2H), 3.88 (s, 3H), 3.42-3.33 (m, 2H), 2.89-2.82 (m, 2H), 2.32 (brs, 1H), 1.98-1.94 (m, 2H), 1.79-1.76 (m, 1H), 1.46-1.43 (m, 1H). | 100% |
| 25 | (structure) | 405.45 | [M + H]⁺ 406.1 | MeOD: δ 7.77 (d, J = 8.0 Hz, 1H), 7.63-7.60 (m, 1H), 7.32 (t, J = 8.0 Hz, 1H), 6.88 (s, 1H), 6.78-6.74 (m, 2H), 3.99-3.95 (m, 1H), 3.89 (s, 3H), 3.88-3.85 (m, 1H), 3.36-3.31 (m, 1H), 3.05 (t, J = 12.0 Hz, 1H), 2.59-2.56 (m, 1H), 2.51 (t, J = 12.0 Hz, 1H), 2.16-2.06 (m, 1H), 1.88-1.87 (m, 1H), 1.77-1.74 (m, 1H), 1.73-1.60 (m, 1H), 1.34-1.32 (m, 1H). | 96.52% |
| 26 | (structure) | 410.47 | [M + H]⁺ 411.2 | DMSO-d₆: δ 11.92 (brs, 1H), 9.32 (s, 1H), 8.43 (d, J = 1.6 Hz, 1H), 7.91 (s, 1H), 7.30 (t, J = 8.0 Hz, 1H), 6.76-6.73 (m, 2H), 6.48 (s, 1H), 3.93-3.89 (m, 2H), 3.88 (s, 3H), 3.83 (s, 3H), 3.23 (dd, J = 11.6, 2.8 Hz, 1H), 3.05 (d, J = 12.4 Hz, 1H), 2.61-2.58 (m, 2H), 2.09 (brs, 1H), 1.80 (d, J = 12.0 Hz, 1H), 1.67-1.66 (m, 1H), 1.29-1.28 (m, 1H), 1.26-1.25 (m, 1H). | 100% |
| 27 | (structure) | 408.5 | [M + H]⁺ 409.1 | MeOD: δ 8.40 (s, 1H), 8.05 (s, 1H), 7.33 (t, J = 8.4 Hz, 1H), 6.79-6.74 (m, 2H), 6.63 (s, 1H), 4.04-4.00 (m, 1H), 3.94-3.90 (m, 1H), 3.86 (s, 3H), 3.28-3.26 (m, 1H), 3.18-3.13 (m, 1H), 2.75-2.64 (m, 4H), 2.19-2.12 (m, 1H), 1.94-1.82 (m, 2H), 1.70-1.59 (m, 1H), 1.47-1.37 (m, 1H), 1.30-1.26 (m, 3H). | 100% |

-continued

| Example | Compound | MW | LC-MS (ESI, m/z) | ¹H NMR (400 MHz) | SFC (ee %) |
|---|---|---|---|---|---|
| 28 | | 419.48 | [M + H]⁺ 420.3 | MeOD: δ 8.49 (s, 1H), 7.38-7.34 (m, 1H), 6.79 (d, J = 8.0 Hz, 1H), 6.77-6.74 (m, 2H), 4.06 (dd, J = 9.6 Hz, 4.8 Hz, 1H), 3.95 (dd, J = 9.8 Hz, 7.0 Hz, 2H), 3.85 (s, 3H), 3.37 (d, J = 3.6 Hz, 2H), 2.86-2.74 (m, 2H), 2.59 (s, 3H), 2.22-2.17 (m, 1H), 1.95-1.92 (m, 2H), 1.91-1.69 (m, 1H), 1.46-1.44 (m, 1H). | 100% |
| 29 | | 419.48 | [M + H]⁺ 420.2 | MeOD: δ 8.41 (s, 1H), 7.36 (t, J = 8.4 Hz, 1H), 6.91 (s, 1H), 6.78 (m, 2H), 4.09-4.05 (m, 1H), 3.98-3.94 (m, 1H), 3.85 (s, 3H), 3.42-3.37 (m, 1H), 3.29-3.19 (m, 1H), 2.85-2.78 (m, 2H), 2.58 (s, 3H), 2.27-2.20 (m, 1H), 1.97-1.90 (m, 2H), 1.76-1.66 (m, 1H), 1.53-1.42 (m, 1H). | 100% |
| 30 | | 391.43 | [M + H]⁺ 392.2 | DMSO-d₆: δ 12.30 (s, 1H), 10.74 (s, 1H), 8.66 (d, J = 0.8 Hz, 1H), 8.51 (s, 1H), 8.33 (s, 1H), 7.31 (t, J = 8.4 Hz, 1H), 6.92 (s, 1H), 6.82 (d, J = 8.4 Hz, 1H), 6.75 (d, J = 8.4 Hz, 1H), 4.59-4.55 (m, 1H), 3.81 (s, 3H), 2.98-2.94 (m, 2H), 2.80-2.75 (m, 2H), 1.93-1.91 (m, 2H), 1.68-1.65 (m, 2H). | — |
| 31 | | 377.40 | [M + H]⁺ 378.2 | MeOD: δ 8.51 (s, 1H), 8.48 (s, 1H), 7.38 (t, J = 8.4 Hz, 1H), 6.85-6.81 (m, 3H), 4.22-4.15 (m, 4H), 4.07-4.03 (m, 2H), 3.88 (s, 3H), 3.39-3.37 (m, 1H). | — |

-continued

| Example | Compound | MW | LC-MS (ESI, m/z) | ¹H NMR (400 MHz) | SFC (ee %) |
|---|---|---|---|---|---|
| 32 | | 419.48 | [M + H]⁺ 420.2 | MeOD: δ 8.52 (d, J = 1.2 Hz, 1H), 8.49 (d, J = 8.8 Hz, 1H), 7.35 (t, J = 8.0 Hz, 1H), 6.80-6.75 (m, 3H), 4.06-4.03 (m, 1H), 3.95-3.91 (m, 1H), 3.86 (s, 3H), 3.26-3.23 (m, 2H), 3.63 (s, 3H), 2.59-2.52 (m, 2H), 2.24-2.22 (m, 1H), 1.92-1.91 (m, 2H), 1.88-1.73 (m, 1H), 1.36-1.29 (m, 1H) | 100% |
| 33 | | 405.45 | [M + H]⁺ 406.0 | DMSO-d₆: δ 10.75-10.73 (m, 1H), 8.64 (d, J = 2.8 Hz, 1H), 8.50-8.46 (m, 1H), 7.30 (t, J = 8.2 Hz, 1H), 6.97-6.93 (m, 1H), 6.79 (s, 1H), 6.77 (s, 1H), 4.06 (dd, J = 3.6 Hz, 9.6 Hz, 1H), 3.97 (dd, J = 5.6 Hz, 9.6 Hz, 1H), 3.83 (s, 3H), 3.03 (dd, J = 1.8 Hz, 10.2 Hz, 1H), 2.60-2.57 (m, 1H), 1.77-1.74 (m, 1H), 1.62-1.54 (m, 2H), 1.41-1.30 (m, 1H), 1.31-1.23 (m, 2H). | 100% |
| 34 | | 406.44 | [M + H]⁺ 407.2 | DMSO-d₆: δ 12.3 (d, J = 1.2 Hz, 1H), 10.73 (s, 1H), 8.62 (s, 1H), 8.50 (s, 1H), 7.31 (dd, J = 8.4 Hz, J = 13.6 Hz, 1H), 6.70 (s, 1H), 6.76 (d, J = 8.4 Hz, 2H), 3.95-3.89 (m, 3H), 3.87 (s, 3H), 3.85-3.81 (m, 1H), 3.28-3.21 (m, 2H), 1.79-1.78 (m, 1H), 1.56-1.54 (m, 2H), 1.54-1.50 (m, 1H), 1.36-1.35 (m, 1H). | 100% |
| 35 | | 419.48 | [M + H]⁺ 420.2 | MeOD: δ 8.51 (d, J = 1.6 Hz, 1H), 8.47 (s, 1H), 7.33 (t, J = 8.4 Hz, 1H), 6.85 (s, 1H), 6.76 (t, J = 8.4 Hz, 2H), 4.12-4.05 (m, 3H), 3.97-3.95 (m, 1H), 3.38-3.35 (m, 1H), 3.33-3.31 (m, 1H), 2.84-2.77 (m, 2H), 2.30-3.20 (m, 1H), 1.96-1.92 (m, 2H), 1.74-1.70 (m, 1H), 1.48-1.45 (m, 1H), 1.40-1.36 (m, 3H). | 100% |

| Example | Compound | MW | LC-MS (ESI, m/z) | ¹H NMR (400 MHz) | SFC (ee %) |
|---|---|---|---|---|---|
| 36 | | 433.51 | [M + H]⁺ 434.2 | MeOD: δ 8.51 (s, 1H), 8.47 (s, 1H), 7.32 (t, J = 8.4 Hz, 1H), 6.80-6.72 (m, 3H), 4.64-4.57 (m, 1H), 4.08-4.05 (m, 1H), 3.96-3.92 (m, 1H), 3.41-3.37 (m, 1H), 3.35-3.31 (s, 1H), 2.85-2.76 (m, 2H), 2.25-2.24 (m, 1H), 1.94 (d, J = 12.0 Hz, 2H), 1.74-1.70 (m, 1H), 1.74-1.70 (m, 1H), 1.29 (d, J = 6.0 Hz, 6H). | 100% |
| 37 | | 423.44 | [M + H]⁺ 424.2 | MeOD: δ 8.53 (d, J = 1.6 Hz, 1H), 8.47-8.46 (m, 1H), 7.19-7.14 (m, 1H), 6.90-6.89 (m, 1H), 6.83-6.80 (m, 1H), 3.94-3.82 (m, 2H), 3.80 (d, J = 1.6 Hz, 3H), 3.18-3.13 (m, 1H), 3.03-3.00 (m, 1H), 2.58-2.43 (m, 2H), 2.08-1.93 (m, 1H), 1.91-1.84 (m, 1H), 1.74-1.71 (m, 1H), 1.59-1.53 (m, 1H), 1.34-1.28 (m, 1H). | 100% |
| 38 | | 423.44 | [M + H]⁺ 424.1 | MeOD: δ 8.52 (s, 1H), 8.46 (s, 1H), 6.81 (s, 1H), 6.59-6.55 (m, 2H), 3.92-3.88 (m, 2H), 3.86 (s, 3H), 3.15-3.12 (m, 1H), 2.98-2.95 (m, 1H), 2.52-2.41 (m, 2H), 2.05-1.99 (m, 1H), 1.89-1.85 (m, 1H), 1.71-1.67 (m, 1H), 1.53-1.46 (m, 1H), 1.31-1.27 (m, 1H). | 100% |
| 39 | | 409.42 | [M + H]⁺ 410.2 | MeOD: δ 8.50 (d, J = 1.2 Hz, 1H), 8.44 (s, 1H), 6.85 (s, 1H), 6.60-6.57 (m, 2H), 4.07-4.03 (m, 1H), 3.94-3.83 (m, 1H), 3.87 (s, 3H), 3.12-3.07 (m, 1H), 2.96-2.85 (m, 2H), 2.81-2.77 (m, 1H), 2.69-2.60 (m, 1H), 2.07-2.01 (m, 1H), 1.67-1.58 (m, 1H). | 100% |

-continued

| Example | Compound | MW | LC-MS (ESI, m/z) | ¹H NMR (400 MHz) | SFC (ee %) |
|---|---|---|---|---|---|
| 40 | | 439.89 | [M + H]⁺ 440.2 | MeOD: δ 8.52 (d, J = 1.2 Hz, 2H), 8.44 (dd, J = 1.6, 7.8 Hz, 2H), 6.77 (d, J = 12.4 Hz, 1H), 4.59-4.04 (m, 1H), 3.98-3.94 (m, 1H), 3.86 (s, 3H), 3.40-3.37 (m, 2H), 2.82-2.76 (m, 2H), 1.95-1.92 (m, 1H), 1.77-1.73 (m, 2H), 1.48-1.47 (m, 1H), 1.44-1.43 (m, 1H). | — |
| 41 | | 484.35 | [M + H]⁺ 483.8 | MeOD: δ 8.54-8.52 (m, 1H), 8.48-8.45 (m, 1H), 6.97-6.95 (m, 2H), 6.84-6.81 (m, 1H), 4.03-4.00 (m, 1H), 3.95-3.89 (m, 1H), 3.86 (s, 3H), 3.37-3.33 (m, 1H), 3.22-3.18 (m, 1H), 2.75-2.65 (m, 2H), 2.24-2.10 (m, 1H), 1.97-1.81 (m, 2H), 1.72-1.59 (m, 1H), 1.48-1.32 (m, 1H). | 100% |
| 42 | | 419.48 | [M + H]⁺ 420.1 | MeOD: δ 8.53 (s, 2H), 7.22 (d, J = 8.4 Hz, 1H), 6.83 (s, 1H), 6.81 (d, J = 8.4 Hz, 1H), 4.04-4.00 (m, 1H), 3.92-3.88 (m, 1H), 3.49 (s, 3H), 3.39-3.35 (m, 2H), 2.83-2.74 (m, 2H), 2.26 (s, 3H), 2.21-2.20 (m, 1H), 1.93 (d, J = 12.0 Hz, 2H), 1.72-1.70 (m, 1H), 1.46-1.40 (m, 1H). | 100% |
| 43 | | 419.48 | [M + H]⁺ 420.1 | MeOD: δ 8.51 (d, J = 1.2 Hz, 1H), 8.46 (s, 1H), 6.78 (s, 1H), 6.62 (d, J = 12.0 Hz, 2H), 4.07-4.04 (m, 1H), 3.96-3.92 (m, 1H), 3.84 (s, 3H), 3.39-3.38 (m, 2H), 2.84-2.78 (m, 2H), 2.39 (s, 3H), 2.24-2.22 (m, 1H), 1.96-1.94 (m, 2H), 1.93-1.92 (m, 1H), 1.51-1.46 (m, 1H) | 100% |

-continued

| Example | Compound | MW | LC-MS (ESI, m/z) | ¹H NMR (400 MHz) | SFC (ee %) |
|---|---|---|---|---|---|
| 44 | | 421.45 | [M + H]⁺ 422.2 | MeOD: δ 8.51-8.50 (m, 2H), 6.87 (s, 1H), 6.66 (s, 1H), 6.62 (s, 1H), 4.23-4.16 (m, 3H), 4.14-4.08 (m, 1H), 3.91-3.84 (m, 1H), 3.87 (s, 3H), 3.39-3.36 (m, 1H), 3.31-3.28 (m, 1H), 3.19-3.09 (m, 2H), 2.39 (s, 3H). | 100% |
| 45 | | 473.45 | [M + H]⁺ 474.2 | MeOD: δ 8.55 (s, 1H), 8.53 (d, J = 1.6 Hz, 1H), 7.04 (d, J = 4.8 Hz, 2H), 6.90 (s, 1H), 4.10-4.07 (m, 1H), 4.03-3.99 (m, 1H), 3.93 (s, 3H), 3.35-3.32 (m, 1H), 3.21 (d, J = 12.8 Hz, 1H), 2.77-2.68 (m, 2H), 2.23-2.16 (m, 1H), 1.96-1.93 (m, 1H), 1.91-1.85 (m, 1H), 1.72-1.61 (m, 1H), 1.48-1.38 (m, 1H). | — |
| 46 | | 393.42 | [M + H]⁺ 394.0 | MeOD: δ 8.53 (d, J = 1.2 Hz, 2 H), 7.43-7.38 (m, 1H), 6.98 (d, J = 8.4 Hz, 1 H), 6.92-6.88 (m, 1 H), 6.86 (s, 1H), 4.14-4.11 (m, 1 H), 4.03-3.99 (m, 1H), 3.43-3.39 (m, 1 H), 3.32-3.31 (m, 1 H), 2.84-2.78 (m, 2 H), 2.33-2.24 (m, 1H), 1.98-1.93 (m, 2 H), 1.78-1.70 (m, 1 H), 1.52-1.41 (m, 1 H). | — |
| 47 | | 409.87 | [M + H]⁺ 410.1 | MeOD: δ 8.52 (d, J = 1.2 Hz, 1H), 8.50 (s, 1H), 8.45 (s, 1H), 7.40 (t, J = 8.0 Hz, 1H), 7.17 (d, J = 8.0 Hz, 1H), 7.06 (d, J = 8.0 Hz, 1H), 6.66 (s, 1H), 4.05-4.03 (m, 1H), 3.93-3.88 (m, 1H), 3.34-3.32 (m, 1H), 3.31-3.28 (m, 1H), 2.78-2.67 (m, 2H), 2.19-2.17 (m, 1H), 1.94-1.86 (m, 1H), 1.67-1.66 (m, 2H), 1.45-1.41 (m, 1H), 1.41-1.38 (m, 1H) | 100% |

-continued

| Example | Compound | MW | LC-MS (ESI, m/z) | $^1$H NMR (400 MHz) | SFC (ee %) |
|---|---|---|---|---|---|
| 48 | | 391.43 | [M + H]$^+$ 392.2 | MeOD: δ 8.54 (s, 1H), 8.44 (s, 1H), 7.19-7.15 (m, 1H), 6.88 (s, 1H), 6.62-6.60 (m, 2H), 4.09-4.06 (m, 1H), 4.00-3.96 (m, 1H), 3.47-3.43 (m, 1H), 3.35-3.33 (m, 1H), 2.90-2.82 (m, 2H), 2.31-2.28 (m, 1H), 2.04-1.94 (m, 2H), 1.81-1.68 (m, 1H), 1.55-1.44 (m, 1H). | — |
| 49 | | 433.51 | — | — | — |
| 50 | | 451.5 | [M + H]$^+$ 452.2 | MeOD: δ 8.53 (s, 1H), 8.51 (d, J = 1.2 Hz, 1H), 6.67 (s, 1H), 6.65-6.59 (m, 2H), 4.28-4.24 (m, 1H), 3.91-3.87 (m, 1H), 3.83 (s, 3H), 3.28-3.26 (m, 1H), 3.18-3.14 (m, 1H), 3.04-2.95 (m, 2H), 2.06-1.99 (m, 1H), 1.62-1.57 (m, 2H), 1.13 (s, 3H), 1.01 (s, 3H). | — |

Example 51

(S)-5-((5-(2-methoxy-6-(piperidin-3-ylmethoxy)phenyl)-4-methyl-1H-pyrazol-3-yl)amino)pyrazine-2-carbonitrile

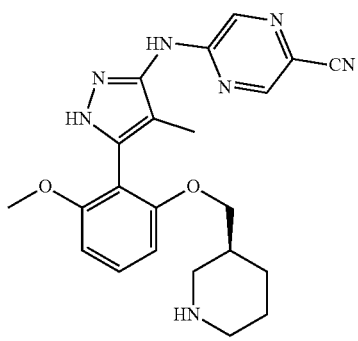 [SMILES: COc1cccc(OC[C@H]2CCCNC2)c1-c1[nH]nc(Nc2cnc(C#N)cn2)c1C]

a) tert-butyl (3 S)-3-[[2-(3-amino-4-bromo-1H-pyrazol-5-yl)-3-methoxy-phenoxy]methyl]piperidine-1-carboxylate:

To a solution of tert-butyl (3S)-3-[[2-(3-amino-1H-pyrazol-5-yl)-3-methoxyphenoxy]methyl]piperidine-1-carboxylate (1.6 g, 3.98 mmol, the compound was prepared using a method similar to that of Example 1e) in ACN (32 mL) was added NBS (778.29 mg, 4.37 mmol). The mixture was stirred at 25° C. for 12 hrs. The reaction mixture was quenched by addition of saturated Na$_2$CO$_3$ solution (150 mL) at 0° C., and then extracted with Ethyl acetate (50 mL×3). The combined organic layers were washed with brine (50 mL×3), dried over Na$_2$SO$_4$, filtered and concentrated under reduced pressure to give the crude product (1.9 g) as red oil. MS (ESI, m/z): 481.1 [M+H]$^+$.

b) tert-butyl (3 S)-3-[[2-(3-amino-4-methyl-1H-pyrazol-5-yl)-3-methoxy-phenoxy]methyl]piperidine-1-carboxylate:

To a solution of tert-butyl (3S)-3-[[2-(3-amino-4-bromo-1H-pyrazol-5-yl)-3-methoxy-phenoxy]methyl]piperidine-1-carboxylate (500 mg, 1.04 mmol) and methylboronic acid (373.05 mg, 6.23 mmol) in dioxane (50 mL) was added chloro(2-dicyclohexylphosphino-2',4',6'-triisopropyl-1,1'-biphenyl)[2-(2'-amino-1,1'-biphenyl)]palladium(II) (XPhos Pd G2, 163.45 mg, 207.74 umol), ditert-butyl-[2-(2,4,6-triisopropylphenyl)phenyl]phosphane (176.43 mg, 415.47 umol) and $K_2CO_3$ (861.31 mg, 6.23 mmol). The mixture was stirred at 100° C. for 12 hrs. The reaction mixture was filtered and concentrated under reduced pressure to give a residue. The residue was purified by reversed-phase HPLC (0.1% FA condition) to give a mixture of title product and the by-product (tert-butyl(3S)-3-[[2-(3-amino-1H-pyrazol-5-yl)-3-methoxy-phenoxy]methyl]piperidine-1-carboxylate) (180 mg) as brown solid. MS (ESI, m/z): 417.2 [M+H]$^+$.

c) tert-butyl (3S)-3-[[2-[3-[(5-cyanopyrazin-2-yl)amino]-4-methyl-1H-pyrazol-5-yl]-3-methoxy-phenoxy]methyl]piperidine-1-carboxylate: To a solution of the above mixture (Example 51b, 432.16 μmol, 180 mg) in DMSO (5 mL) was added 5-chloropyrazine-2-carbonitrile (180.91 mg, 1.30 mmol) and DIPEA (167.56 mg, 1.30 mmol). The mixture was stirred at 90° C. for 16 hrs. The reaction mixture was diluted with $H_2O$ (30 mL) and extracted with Ethyl acetate (30 mL×3), dried over $Na_2SO_4$, filtered and concentrated under reduced pressure to give a residue, which was purified by reversed-phase HPLC (0.1% FA condition), and further purified by prep-HPLC (column: Welch Ultimate XB—CN 250×70×10 um; mobile phase: [Hexane-EtOH(0.1% $NH_3 \cdot H_2O$)]; B %: 20%-60%, 15 min) to give the title product (50 mg, 22.27% yield) as yellow oil. MS (ESI, m/z): 520.2 [M+H]$^+$.

d) (S)-5-((5-(2-methoxy-6-(piperidin-3-ylmethoxy)phenyl)-4-methyl-1H-pyrazol-3-yl)amino)pyrazine-2-carbonitrile: To a solution of tert-butyl (3S)-3-[[2-[3-[(5-cyanopyrazin-2-yl)amino]-4-methyl-1H-pyrazol-5-yl]-3-methoxy-phenoxy]methyl]piperidine-1-carboxylate (50 mg, 96.23 μmol) in DCM (1 mL) was added TFA (274.30 mg, 2.41 mmol, 178.12 μL). The mixture was stirred at 25° C. for 2 hrs. The reaction mixture was concentrated under reduced pressure to give a residue, which was purified by prep-HPLC (column: Phenomenex luna C18 150×25 mm×10 μm; mobile phase: [water (0.225% FA)-ACN]; B %: 8%-38%, 10 min) to give the title compound (24.63 mg, 51.53 μmol, 53.55% yield, 97.40% purity) as yellow solid. MS (ESI, m/z): 420.2 [M+H]$^+$. $^1$H NMR (400 MHz, MeOD): δ 8.46 (d, J=1.2 Hz, 1H), 8.32 (d, J=1.2 Hz, 1H), 7.41 (t, J=8.4 Hz, 1H), 6.77 (dd, J=8.4 Hz, 17.6 Hz, 2H), 4.02-3.97 (m, 1H), 3.89-3.85 (m, 1H), 3.79 (s, 3H), 3.27-3.25 (m, 1H), 2.83-2.75 (m, 1H), 2.67 (t, J=12.0 Hz, 1H), 2.17-2.08 (m, 1H), 1.89-1.83 (m, 2H), 1.81 (s, 3H), 1.75-1.63 (m, 1H), 1.41-1.29 (m, 2H). SFC: ee %: 100%.

Example 52

(S)-5-((4-bromo-5-(2-methoxy-6-(piperidin-3-ylmethoxy)phenyl)-1H-pyrazol-3-yl)amino)pyrazine-2-carbonitrile

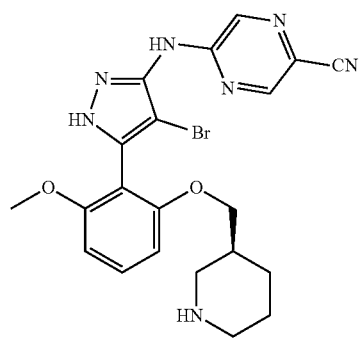 [SMILES: COc1cccc(OC[C@H]2CCCNC2)c1-c1[nH]nc(Nc2cnc(C#N)cn2)c1Br]

a) tert-butyl(3S)-3-[[2-[3-[(5-cyanopyrazin-2-yl)amino]-1H-pyrazol-5-yl]-3-methoxy-phenoxy]methyl]piperidine-1-carboxylate: To a solution of tert-butyl (3S)-3-[[2-(3-amino-1H-pyrazol-5-yl)-3-methoxy-phenoxy]methyl]piperidine-1-carboxylate (Example 51c, 500 mg, 1.24 mmol) in DMSO (5 mL) was added DIPEA (481.66 mg, 3.73 mmol, 649.13 μL) and 5-chloropyrazine −2-carbonitrile (520.05 mg, 3.73 mmol). The mixture was stirred at 90° C. for 16 hrs. The reaction mixture was diluted with $H_2O$ (30 mL) and extracted with ethyl acetate (30 mL×3), dried over $Na_2SO_4$, filtered and concentrated under reduced pressure to give a residue. The crude product was purified by reversed-phase HPLC (0.1% FA condition) to give a residue. The residue was purified by prep-HPLC (column: Phenomenex luna C18 250×50 mm×15 um; mobile phase: [water (0.225% FA)-ACN]; B %: 55-85%, 10 min) to give the target product (330 mg, 652.73 μmol, 52.54% yield) as brown solid. MS (ESI, m/z): 506.3 [M+H]$^+$.

b) tert-butyl (3S)-3-[[2-[4-bromo-3-[(5-cyanopyrazin-2-yl)amino]-1H-pyrazol-5-yl]-3-methoxy-phenoxy]methyl]piperidine-1-carboxylate: To a solution of tert-butyl (3S)-3-[[2-3[[(5-cyanopyrazin-2-yl)amino]-1H-pyrazol-5-yl]-3-methoxy-phenoxy]methyl]piperidine-1-carboxylate (280 mg, 553.83 μmol) in ACN (10 mL) was added NBS (108.43 mg, 609.22 μmol). The mixture was stirred at 25° C. for 12 hrs. The pH of the mixture was adjusted to 7 with $NaHCO_3$ solution (10 mL). The mixture was extracted with ethyl acetate (50 mL×3), dried over $Na_2SO_4$, filtered and concentrated under reduced pressure to give a residue. The crude product was purified by reversed-phase HPLC (0.1% FA condition) to give the title product (138 mg, 36.2% yield) as yellow oil. MS (ESI, m/z): 584.0 [M+H]$^+$.

c) (S)-5-((4-bromo-5-(2-methoxy-6-(piperidin-3-ylmethoxy)phenyl)-1H-pyrazol-3-yl)amino)pyrazine-2-carbonitrile: To a solution of tert-butyl (3S)-3-[[2-[4-bromo-3-[(5-cyanopyrazin-2-yl)amino]-1H-pyrazol-5-yl]-3-methoxy-phenoxy]methyl]piperidine-1-carboxylate (138 mg, 236.11 μmol) in DCM (2 mL) was added TFA (673.06 mg, 5.90 mmol, 437.05 and then the mixture was stirred at 25° C. for 2 hrs. The reaction mixture was concentrated under reduced pressure to give a residue, which was purified by prep-HPLC (column: Phenomenex luna C18 150×25 mm×10 um; mobile phase: [water (0.225% FA)-ACN]; B %: 10%-43%, 11 min) to give the target compound (81.54 mg, 151.62 μmol, 64.21% yield) as light yellow solid. MS (ESI, m/z): 484.0 [M+H]$^+$. 1H NMR (400 MHz, MeOD): δ 8.50 (d, J=1.2 Hz, 1H), 8.44 (d, J=1.2 Hz, 1H), 7.44 (t, J=8.4 Hz, 1H), 6.80-6.74 (m, 2H), 4.04-4.01 (m, 1H), 3.91-3.87 (m, 1H), 3.80 (s, 3H), 3.37-3.34 (m, 2H), 2.84-2.80 (m, 1H), 2.75-2.69 (m, 1H), 2.17-2.16 (m, 1H), 1.94-1.86 (m, 2H), 1.75-1.66 (m, 1H), 1.40-1.39 (m, 1H). SFC: ee %: 100%.

Examples 53-75 were prepared using the synthesis methods similar to that of Example 1 or 2. The compounds can also be synthesized by other methods known to those skilled in the art.

| Example | Compound | MW | LC-MS (ESI, m/z) | ¹H NMR (400 MHz) | SFC (ee %) |
|---|---|---|---|---|---|
| 53 | 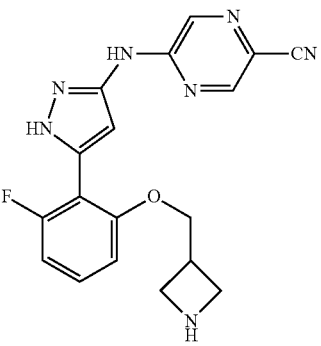 [SMILES: N#Cc1cnc(Nc2cc(-c3c(F)cccc3OCC3CNC3)[nH]n2)cn1] | 365.36 | [M + H]⁺ 366.2 | DMSO-$d_6$: δ 12.67-12.59 (m, 1H), 10.83 (s, 1H), 8.68 (d, J = 1.2 Hz, 1H), 8.66-8.60 (m, 1H), 8.48 (s, 1H), 7.47-7.41 (m, 1H), 7.05-6.97 (m, 2H), 6.90-6.84 (m, 1H), 4.27 (d, J = 6.8 Hz, 2H), 4.06-4.03 (m, 2H), 3.91-3.84 (m, 2H), 3.28-3.23 (m, 1H). | — |
| 54 | 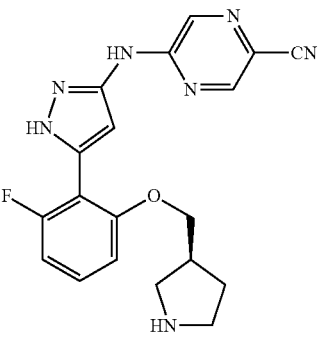 [SMILES: N#Cc1cnc(Nc2cc(-c3c(F)cccc3OC[C@H]3CCNC3)[nH]n2)cn1] | 379.39 | [M + H]⁺ 380.2 | MeOD: δ 8.52-8.53 (m, 1H), 8.47-8.41 (m, 1H), 7.44-7.38 (m, 1H), 7.00 (d, J = 8.4 HZ, 1H), 6.93-6.86 (m, 2H), 4.25-4.21 (m, 1H), 4.13-4.09 (m, 1H), 3.50-3.45 (m, 1H), 3.29-3.25 (m, 2H), 3.21-3.13 (m, 2H), 2.96-2.87 (m, 1H), 2.31-2.55 (m, 1H), 1.97-1.87 (m, 1H). | 100% |
| 55 | 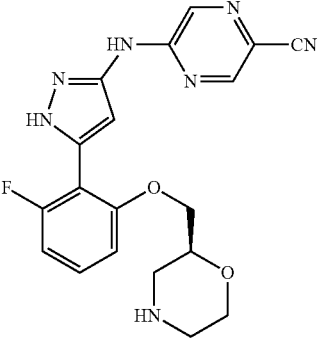 [SMILES: N#Cc1cnc(Nc2cc(-c3c(F)cccc3OC[C@@H]3CNCCO3)[nH]n2)cn1] | 395.39 | [M + H]⁺ 396.1 | DMSO-$d_6$: δ 12.57 (s, 1H), 10.84 (s, 1H), 6.69 (d, J = 1.2 Hz, 1H), 8.47 (m, 1H), 7.42-7.36 (m, 1H), 7.04-6.95 (m, 3H), 4.12-4.08 (m, 2H), 3.84-3.77 (m, 2H), 3.54-3.48 (m, 2H), 2.91-2.88 (m, 1H), 2.71-2.64 (m, 2H), 2.60-2.54 (m, 1H). | — |
| 56 | 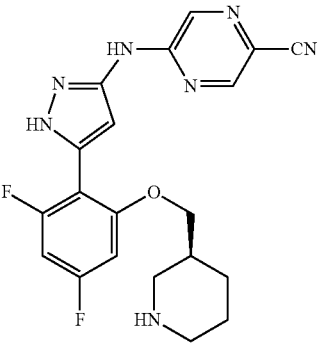 [SMILES: N#Cc1cnc(Nc2cc(-c3c(F)cc(F)cc3OC[C@H]3CCCNC3)[nH]n2)cn1] | 411.41 | [M + H]⁺ 412.2 | MeOD: δ 8.53 (d, J = 1.2 Hz, 2H), 6.87-6.83 (m, 1H), 6.80-6.73 (m, 2H), 4.12-4.09 (m, 1H), 4.02-3.98 (m, 1H), 3.42-3.35 (m, 2H), 2.87-2.78 (m, 2H), 2.31-2.26 (m, 1H), 1.97-1.93 (m, 2H), 1.79-1.67 (m, 1H), 1.51-1.41 (m, 1H). | 100% |

-continued

| Example | Compound | MW | LC-MS (ESI, m/z) | ¹H NMR (400 MHz) | SFC (ee %) |
|---|---|---|---|---|---|
| 57 | | 427.86 | [M + H]⁺ 428.3 | MeOD: δ 12.80 (s, 1H), 10.91 (s, 1H), 8.68 (d, J = 1.2 Hz, 1H), 8.55-8.47 (m, 1H), 8.37 (s, 1H), 7.20 (dd, J = 10.0 Hz, 2.0 Hz, 1H), 7.14 (s, 1H), 6.91 (s, 1H), 4.06-3.99 (m, 2H), 3.18-3.14 (m, 2H), 3.01-2.98 (m, 2H), 2.08-2.06 (m, 1H), 1.80-1.77 (m, 1H), 1.77-1.65 (m, 1H), 1.53-1.41 (m, 1H), 1.27-1.24 (m, 1H). | 100% |
| 58 | | 429.84 | [M + H]⁺ 430.1 | MeOD: δ 8.53 (d, J = 1.2 Hz, 1H), 7.10 (t, J = 1.4 Hz, 1H), 7.04 (dd, J = 10.4 Hz, 1.6 Hz, 1H), 6.96 (s, 1H), 4.30-4.27 (m, 1H), 4.23-4.19 (m, 1H), 4.14 (dd, J = 12.4 Hz, 2.4 Hz, 1H), 4.09-4.03 (m, 1H), 3.86-3.79 (m, 1H), 3.23-3.19 (m, 1H), 3.14-3.09 (m, 1H), 3.07-3.00 (m, 1H), 2.99-2.96 (m, 1H). | 100% |
| 59 | | 472.31 | [M + H]⁺ 472.0 | MeOD: δ 8.54-8.53 (m, 2H), 7.20-7.19 (m, 1H), 7.18-7.15 (m, 1H), 6.85 (s, 1H), 4.14-4.10 (m, 1H), 4.04-4.00 (m, 1H), 3.41-3.35 (m, 2H), 2.87-2.77 (m, 2H), 2.32-2.25 (m, 1H), 1.98-1.92 (m, 2H), 1.75-1.70 (m, 1H), 1.51-1.39 (m, 1H). | 100% |
| 60 | | 474.29 | [M + H]⁺ 474.0 | MeOD: δ 8.55 (d, J = 2.0 Hz, 1H), 8.43 (s, 1H), 7.26-7.25 (m, 1H), 7.21 (dd, J = 10.0 Hz, 1.6 Hz 1H), 7.98-7.97 (m, 1H), 4.33-4.30 (m, 1H), 4.26-4.22 (m, 1H), 4.20-4.16 (m, 1H), 4.13-4.08 (m, 1H), 3.89-3.83 (m, 1H), 3.29-3.26 (m, 1H), 3.19-3.15 (m, 1H), 3.12-3.05 (m, 1H), 3.04-2.98 (m, 1H). | — |

-continued
| Example | Compound | MW | LC-MS (ESI, m/z) | ¹H NMR (400 MHz) | SFC (ee %) |
|---|---|---|---|---|---|
| 61 | 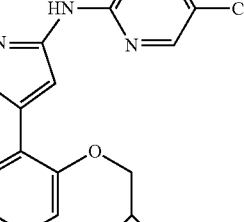 | 379.39 | [M + H]⁺ 380.2 | MeOD: δ 8.54 (d, J = 0.8 Hz, 1H), 8.41 (s, 1H), 6.87 (s, 1H), 6.82-6.77 (m, 2H), 4.27 (d, J = 5.2 Hz, 2H), 4.24-4.19 (m, 2H), 4.07-4.02 (m, 2H), 3.40-3.35 (m, 1H), 2.41 (s, 3H). | — |
| 62 | 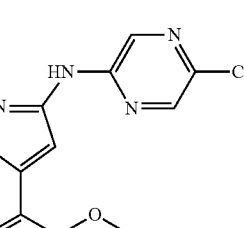 | 393.42 | [M + H]⁺ 394.2 | MeOD: δ 8.54-8.53 (m, 2H), 6.83 (s, 1H), 6.75 (d, J = 10.8 Hz, 1H), 4.23-4.19 (m, 1H), 4.11-4.07 (m, 1H), 3.50-3.45 (m, 1H), 3.29-3.26 (m, 2H), 3.19-3.13 (m, 1H), 2.94-2.87 (m, 1H), 2.40 (s, 3H), 2.31-2.22 (m, 1H), 1.96-1.87 (m, 1H). | — |
| 63 | 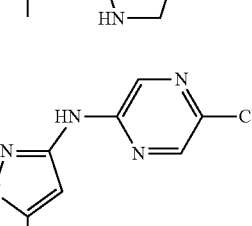 | 407.44 | [M + H]⁺ 408.2 | MeOD: δ 8.53 (s, 2H), 6.89-6.81 (m, 2H), 6.74 (d, J = 10.8 Hz, 1H), 4.12-4.09 (m, 1H), 4.02-3.98 (m, 1H), 3.44-3.40 (m, 1H), 3.35-3.33 (m, 1H), 2.88-2.78 (m, 2H), 2.40 (s, 3H), 2.35-2.23 (m, 1H), 1.99-1.93 (m, 2H), 1.80-1.68 (m, 1H), 1.52-1.41 (m, 1H). | — |
| 64 | 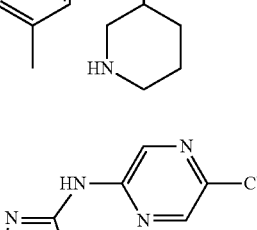 | 409.42 | [M + H]⁺ 410.2 | MeOD: δ 8.54 (d, J = 1.2 Hz, 1H), 8.49 (s, 1H), 6.93 (s, 1H), 6.84 (s, 1H), 6.77 (d, J = 11.6 Hz, 1H), 4.29-4.25 (m, 1H), 4.22-4.17 (m, 2H), 4.10-4.06 (m, 1H), 3.89-3.82 (m, 1H), 3.31-3.24 (m, 1H), 3.14-3.08 (m, 2H), 3.04-2.97 (m, 1H), 2.39 (s, 3H). | — |

| Example | Compound | MW | LC-MS (ESI, m/z) | ¹H NMR (400 MHz) | SFC (ee %) |
|---|---|---|---|---|---|
| 65 | 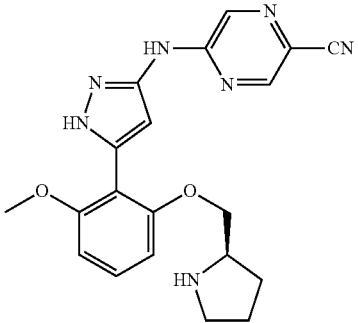 [SMILES: COc1cccc(OC[C@H]2CCCN2)c1-c1cc(Nc2cnc(C#N)cn2)n[nH]1] | 391.43 | [M + H]⁺ 392.1 | MeOD: δ 8.49 (d, J = 1.6 Hz, 1H), 8.47 (s, 1H), 7.39 (t, 1H), 6.84 (d, J = 8.4 Hz, 1H), 6.79 (d, J = 8.0 Hz, 1H), 6.76 (s, 1H), 4.348 (dd, J = 3.4 Hz, J = 10.6 Hz, 1H), 4.19-4.15 (m, 1H), 4.03-4.00 (m, 1H), 3.85 (s, 3H), 3.30-3.24 (m, 1H), 3.14-3.13 (m, 1H), 2.23-2.21 (m, 1H), 2.01-1.91 (m, 3H). | 100% |
| 66 | 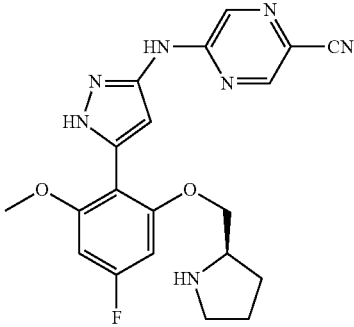 | 409.42 | [M + H]⁺ 410.3 | MeOD: δ 8.51 (s, 1H), 8.49 (d, J = 1.2 Hz, 1H), 6.73 (s, 1H), 6.67-6.61 (m, 2H), 4.31 (dd, J = 3.0 Hz, J = 10.0 Hz, 1H), 4.14 (dd, J = 6.4 Hz, J = 10.8 Hz, 1H), 4.04-3.95 (m, 1H), 3.84 (s, 3H), 3.20-3.19 (m, 1H), 3.18-3.10 (m, 1H), 2.21-2.19 (m, 1H), 1.96-1.90 (m, 3H). | — |
| 67 | 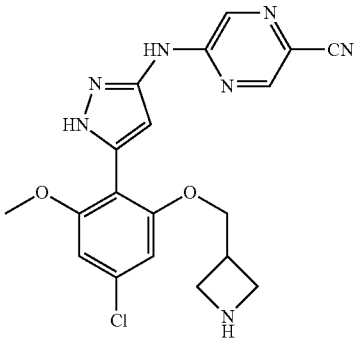 [SMILES: COc1cc(Cl)cc(OCC2CNC2)c1-c1cc(Nc2cnc(C#N)cn2)n[nH]1] | 411.84 | [M + H]⁺ 412.2 | DMSO: δ 12.45-12.37 (m, 1H), 10.78 (s, 1H), 8.71-8.62 (m, 2H), 8.46 (s, 1H), 6.92-6.97 (m, 2H), 6.84-6.82 (m, 1H), 4.26-4.24 (d, J = 6.8 Hz, 2H), 4.09-4.01 (m, 2H), 3.85-3.82 (m, 5H), 3.29-3.23 (m, 1H). | — |
| 68 | 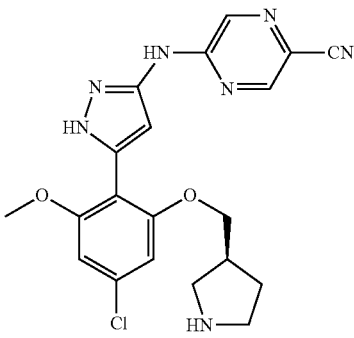 [SMILES: COc1cc(Cl)cc(OC[C@H]2CCNC2)c1-c1cc(Nc2cnc(C#N)cn2)n[nH]1] | 425.87 | [M + H]⁺ 426.1 | MeOD: δ 8.51 (d, J = 1.2 Hz, 1H), 8.42 (s, 1H), 6.86-6.83 (m, 3H), 4.18-4.15 (m, 1H), 4.06-4.04 (m, 1H), 3.87 (s, 3H), 3.48-3.45 (m, 1H), 3.28-3.24 (m, 2H), 3.15-3.10 (m, 1H), 2.91-2.84 (m, 1H), 2.29-2.20 (m, 1H), 1.94-1.85 (m, 1H). | 100% |

-continued

| Example | Compound | MW | LC-MS (ESI, m/z) | ¹H NMR (400 MHz) | SFC (ee %) |
|---|---|---|---|---|---|
| 69 | | 456.30 | — | — | — |
| 70 | | 470.32 | [M + H]⁺ 470.1 | MeOD: δ 8.53-8.51 (m, 2H), 6.99-6.98 (m, 1H), 6.84 (s, 1H), 4.18-4.14 (m, 1H), 4.06-4.02 (m, 1H), 3.87 (s, 3H), 3.49-3.44 (m, 1H), 3.27-3.23 (m, 2H), 3.14-3.09 (m, 1H), 2.90-2.83 (m, 1H), 2.28-2.19 (m, 1H), 1.94-1.84 (m, 1H). | — |
| 71 | | 470.33 | — | — | — |
| 72 | | 391.43 | [M + H]⁺ 392.3 | MeOD: δ 8.53 (s, 1H), 8.51 (d, J = 1.2 Hz, 1H), 6.67 (s, 1H), 6.66 (d, J = 4.8 Hz, 2H), 4.20 (d, J = 5.2 Hz, 2H), 4.15 (d, J = 5.2 Hz, 2H), 4.05-4.00 (m, 2H), 3.87 (s, 3H), 3.35-3.32 (m, 1H), 2.40 (s, 3H). | — |

-continued

| Example | Compound | MW | LC-MS (ESI, m/z) | ¹H NMR (400 MHz) | SFC (ee %) |
|---|---|---|---|---|---|
| 73 | (structure) | 405.46 | — | — | — |
| 74 | (structure) | 405.46 | — | — | — |
| 75 | (structure) | 433.51 | [M + H]⁺ 434.3 | MeOD: δ 8.54 (s, 1H), 8.52 (d, J = 1.2 Hz, 1H), 6.79-6.77 (m, 1H), 6.64 (d, J = 12.0 Hz, 2H), 4.08-4.04 (m, 1H), 3.97-3.93 (m, 1H), 3.85 (s, 3H), 3.41-3.35 (m, 2H), 2.84-2.77 (m, 2H), 2.72-2.66 (m, 2H), 2.29-2.17 (m, 1H), 2.00-1.89 (m, 2H), 1.76-1.67 (m, 1H), 1.52-1.42 (m, 1H), 1.28 (t, J = 7.6 Hz, 3H). | — |

Example 76

(S)-5-((5-(2-methoxy-6-(thiomorpholin-2-ylmethoxy)phenyl)-1H-pyrazol-3-yl)amino)pyrazine-2-carbonitrile and (R)-5-(5-(2-methoxy-6-(thiomorpholin-2-ylmethoxy)phenyl)-1H-pyrazol-3-yl)amino)pyrazine-2-carbonitrile a) tert-butyl 2-[[2-[3-[(5-cyanopyrazin-2-yl)amino]-1H-pyrazol-5-yl]-3-methoxyphenoxy]methyl]thiomorpholine-4-carboxylate: 5-[[5-(2-hydroxy-6-methoxy-phenyl)-1H-pyrazol-3-yl]amino]pyrazine-2-carbonitrile (Example 3e, 300 mg, 973.10 μmol) was added to a mixture of tert-butyl 2-(hydroxymethyl)thiomorpholine-4-carboxylate (340.57 mg, 1.46 mmol, 1.5 eq) in Tol. (16 mL) and added 2-(tributyl-phosphanylidene)acetonitrile (704.57 mg, 2.92 mmol). The mixture was heated at 90° C. for 4 h. The reaction mixture was concentrated under reduced pressure to give a residue, which was purified by prep-HPLC to give the target product (83 mg, crude, 16.3% yield) as yellow oil. MS (ESI, m/z): 524.3 [M+H]⁺.

b) 5-[[5-[2-methoxy-6-(thiomorpholin-2-ylmethoxy)phenyl]-1H-pyrazol-3-yl]amino]pyrazine-2-carbonitrile: A mixture of tert-butyl 2-[[3-[(5-cyanopyrazin-2-yl)amino]-1H-pyrazol-5-yl]-3-methoxy-phenoxy]methyl]thiomorpholine-4-carboxylate (81 mg, 154.70 μmol) in HCOOH (1 mL) was degassed and purged with N₂ for 3 times, and then the mixture was stirred at 25° C. for 1 hr under N₂ atmosphere. The reaction mixture was concentrated under reduced pressure to give a residue. The residue was purified by prep-HPLC (column: Phenomenex luna C18 150×25 mm×10 μm; mobile phase: [water (0.225% FA)-ACN]; B %: 9%-39%, 10 min) to give the target product (65 mg, crude, 99.2% yield) as yellow solid. MS (ESI, m/z): 524.3 [M+H]⁺. ¹H NMR (400 MHz, DMSO-d₆): δ 8.47 (s, 2H), 6.99-6.90 (m, 1H), 6.61 (d, J=10.4 Hz, 2H), 4.15-4.09 (m, 2H), 3.89 (s, 3H), 3.69-3.64 (m, 2H), 3.13 (s, 1H), 2.85-2.71 (m, 1H), 2.54-2.52 (m, 1H), 1.82-1.81 (m, 1H), 1.62-1.54 (m, 2H).

c) (S)-5-((5-(2-methoxy-6-(thiomorpholin-2-ylmethoxy)phenyl)-1H-pyrazol-3-yl)amino)pyrazine-2-carbonitrile and (R)-5-((5-(2-methoxy-6-(thiomorpholin-2-ylmethoxy)phenyl)-1H-pyrazol-3-yl)amino)pyrazine-2-carbonitrile: The above product was separated by SFC (column: DAICEL CHIRALPAK IG (250 mm×30 mm, 10 um); mobile phase: [0.1% NH3H2OMEOH]; B %: 70%-70%, 6.2; 60 min) to give two residues. The residue 1 was purified by prep-HPLC (column: Unisil 3-100 C18 Ultra 150×50 mm×3 μm; mobile phase: [water (0.225% FA)-ACN]; B %: 15%-35%, 10 min) to give one title compound (76-A, 17.42 mg, 39.50 μmol, 25.74% yield, 96.03% purity) as light yellow solid. The residue 2 was purified by prep-HPLC (column: Unisil 3-100 C18 Ultra 150×50 mm×3 μm; mobile phase: [water(0.225% FA)-ACN]; B %: 15%-35%, 10 min) to give the other title compound (76-B, 12.15 mg, 27.50 μmol, 17.91% yield, 95.84% purity) as light yellow solid.

Examples 77-80 were prepared using the synthesis methods similar to that of Example 1 or 2 and isolated using the method similar to that of Example 76. The compounds can also be synthesized by other methods known to those skilled in the art.

| Example | Compound | MW | LC-MS (ESI, m/z) | $^1$H NMR (400 MHz) | SFC (ee %) |
|---|---|---|---|---|---|
| 76 | | 423.49 | [M + H]$^+$ 424.6 | 76-A: MeOD: δ 8.52 (d, J = 1.2 Hz, 1H), 8.46 (s, 1H), 7.36 (t, 1H), 6.93 (s, 1H), 6.82 (d, J = 8.4 Hz, 1H), 6.78 (d, J = 8.4 Hz, 1H), 4.23 (d, J = 6.0 Hz, 2H), 3.88 (s, 3H), 3.49 (dd, J = 3.2 Hz, J = 12.4 Hz, 1H), 3.37-3.31 (m, 2H), 3.19-3.13 (m, 2H), 2.87-2.84 (m, 2H). | 76-A: 100% |
| | | | | 76-B: MeOD: δ 8.52 (d, J = 1.2 Hz, 1H), 8.48 (s, 1H), 7.36 (t, 1H), 6.92 (s, 1H), 6.82 (d, J = 8.4 Hz, 1H), 6.78 (d, J = 8.4 Hz, 1H), 4.24 (d, J = 6.0 Hz, 2H), 3.88 (s, 3H), 3.50 (dd, J = 3.2 Hz, J = 12.4 Hz, 1H), 3.42-3.39 (m, 2H), 3.20-3.17 (m, 2H), 2.88-2.85 (m, 2H). | 76-B: 100% |
| 77 | | 441.48 | [M + H]$^+$ 442.1 | 77-A: MeOD: δ 8.51 (d, J = 1.2 Hz, 1H), 8.47 (s, 1H), 6.68 (s, 1H), 6.65-6.60 (m, 2H), 4.23-4.22 (m, 2H), 3.87 (s, 3H), 3.48-3.44 (m, 2H), 3.36-3.35 (m, 1H), 3.30-3.13 (m, 2H), 2.84-2.82 (m, 2H). | 77-A: 100% |

-continued

| Example | Compound | LC-MS (ESI, MW m/z) | ¹H NMR (400 MHz) | SFC (ee %) |
|---|---|---|---|---|
|  | (structure: pyrazole-pyrazine with methoxy-fluoro-phenyl-O-CH2-thiomorpholine) |  | 77-B: MeOD: δ 8.52 (d, J = 1.2 Hz, 1H), 8.47 (s, 1H), 6.86 (d, J = 1.2 Hz, 1H), 6.65-6.60 (m, 2H), 4.23-4.22 (m, 2H), 3.87 (s, 3H), 3.48-3.44 (m, 2H), 3.36-3.35 (m, 1H), 3.30-3.13 (m, 2H), 2.84-2.82 (m, 2H). | 76-B: 90.5% |
| 78 | (two structures with Cl, methoxy, pyrazole-pyrazine-CN, thiomorpholine — enantiomer pair "and") | 457.94 | — | — |
| 79 | (structure with Br, methoxy, pyrazole-pyrazine-CN, thiomorpholine "and") | 502.39 | — | — |

| Example | Compound | MW | LC-MS (ESI, m/z) | $^1$H NMR (400 MHz) | SFC (ee %) |
|---------|----------|-----|------------------|----------------------|------------|
| 80 | (structures shown) and | 437.52 | — | — | — |

Example 81

Determination of the Inhibitory Effects of Compounds on CHK1 Kinase

CHK1 enzyme activity was measured using Promega's ADP-Glo™ kinase assay kit (#V9101) in a 384-well plate (Corning, #4512). 2 µL of kinase CHK1 (#V1941, Promega), 1 µL of compound diluted with buffer, and 2 µL of ATP substrate was successively added to a 384-well plate (final concentration of CHK1 was 1 ng/well, ATP was 10 µM). The positive control wells contained CHK1, ATP and DMSO whereas the negative control wells contained ATP, DMSO without enzyme. The mixtures were centrifuged at 1000 rpm for 1 minute and kept in darkness at room temperature for 1 hour to react. Then, 5 µL of ADP-Glo reagent was added to each well and incubated at room temperature for 40 minutes. At the end of incubation, 10 µL of kinase detection reagent was added to each well, and the relative chemiluminescence values (RLU) were measured on Varioskan® Flash (Thermo). The following calculation was performed: Inhibition rate %=(RLU of positive control−RLU of compound)/(RLU of positive control−RLU of negative control)×100. Data were analyzed using GraphPad Prism6.0 and fitted using the curve equation: Y=Bottom+(Top−Bottom)/(1+10^((Log IC$_{50}$−X)*HillSlope)), and IC$_{50}$ values were calculated.

Table 1 summarizes the inhibitory effects of compounds on CHK1 kinase activity at a concentration of 10 nM (Inh %).

TABLE 1

| Example | 1 | 2 | 3 | 4 | 5 | 6 | 7 | 9 | 10 | 11 | 14 | 15 | 16 | 17 | 18 | 19 | 20 | 24 | 25 |
|---|---|---|---|---|---|---|---|---|---|---|---|---|---|---|---|---|---|---|---|
| Conc.(nM) | 10 | 10 | 10 | 10 | 10 | 10 | 10 | 10 | 10 | 10 | 10 | 10 | 10 | 10 | 10 | 10 | 10 | 10 | 10 |
| Inh % | 95 | 85 | 79 | 82 | 50 | 85 | 95 | 92 | 95 | 4.9 | 94 | 40 | 93 | 50 | 79 | 91 | 31 | 89 | 91 |

| Example | 26 | 27 | 30 | 32 | 33 | 34 | 36 | 42 | 47 | 53 | 55 | 57 | LY2606368 |
|---|---|---|---|---|---|---|---|---|---|---|---|---|---|
| Conc.(nM) | 10 | 10 | 10 | 10 | 10 | 10 | 10 | 10 | 10 | 10 | 10 | 10 | 10 |
| Inh % | 93 | 95 | 89 | 91 | 97 | 69 | 63 | 85 | 40 | 95 | 82 | 92 | 97 |

Table 2 summarizes the inhibitory effects of compounds on CHK1 kinase activity ($IC_{50}$).

TABLE 2

| Example | 1 | 9 | 12 | 13 | 14 | 28 | 31 | 35 | 37 | 38 | 39 | 40 | 41 | 43 | 44 | 45 | 46 |
|---|---|---|---|---|---|---|---|---|---|---|---|---|---|---|---|---|---|
| $IC_{50}$ (nM) | 0.84 | 0.97 | 0.72 | 0.45 | 0.69 | 0.3 | 0.38 | 1.78 | 0.77 | 0.52 | 0.2 | 0.88 | 0.85 | 1.17 | 0.93 | 1.57 | 0.59 |

| Example | 48 | 54 | 56 | 59 | 62 | 63 | 65 | 66 | 67 | 68 | 70 | 76-A | 76-B | LY2606368 |
|---|---|---|---|---|---|---|---|---|---|---|---|---|---|---|
| $IC_{50}$ (nM) | 0.58 | 0.86 | 1.02 | 2.27 | 1.58 | 1.66 | 0.26 | 1.22 | 1.72 | 0.44 | 1.16 | 0.79 | 1.21 | 1.34 |

Therefore, as determined by the CHK1 kinase experiment, the compound of Example 1 and its analogues have good inhibitory effect on CHK1 kinase.

Example 82

Determination of Inhibitory Effects of Compounds on the Proliferation of Human Breast Cancer Cell HCC1806 using MTT Assay Newly revived HCC1806 cells (purchased from Guangzhou Genio) were cultured and passaged for at least three generations before use. Cells were used at 90% confluency for experiments. Cells were digested with trypsinase and centrifuged at 800 rpm for 5 minutes. The cell pellets were resuspended in fresh RPMI1640 medium and cells were counted. Cells were seeded on 96-well cell culture plates at 2000 cells/well and incubated overnight at 37° C., 5% $CO_2$. The stock solutions of the test substances (including the test compounds and the reference compound) were serially diluted to 8 concentrations with DMSO at a ratio of 1:3. Five μL of each of the serially diluted solutions were added to 120 μL of medium (diluted by 25 times) and mixed by shaking. The medium of cells cultured overnight was replaced by 195 μL/well of fresh medium and 5 μL/well of diluted medium containing test compounds. The cell culture plates were returned to incubator at 37° C., 5% $CO_2$ for 3 days. At the end of treatment the cell viability was determined by MTT colorimetric assay. Cell culture medium in each well was replaced by 100 μL/well of serum-free fresh medium containing MTT (0.5 mg/mL), and the culture was continued for additional 4 hours. Medium was then discarded and 100 μL/well of DMSO was added, the plates were shaken for 10 minutes in darkness and the absorbances were measured at the wavelengths of 552/690 nm in a multi-function reader.

Data was analyzed by GraphPad Prism 6.0. The inhibitory effects of compounds on cell proliferation were plotted based on cell viability vs. the logarithm of compound concentration. Cell viability %=($OD_{compound}$−$OD_{background}$)/($OD_{DMSO}$−$OD_{background}$)×100. The $IC_{50}$ values were fitted by a sigmoidal dose response curve equation Y=100/(1+10^(Log C-Log $IC_{50}$)), wherein C was the concentration of a compound.

Table 3 summarizes the inhibitory effect ($IC_{50}$) of compounds on the proliferation of human breast cancer cell HCC1806.

TABLE 3

| Example | 1 | 2 | 3 | 4 | 5 | 6 | 7 | 9 | 10 | 11 | 12 | 13 | 14 | 15 | 16 | 17 |
|---|---|---|---|---|---|---|---|---|---|---|---|---|---|---|---|---|
| $IC_{50}$ (nM) | 7.4 | 153.4 | 94.2 | 139.4 | 393.8 | 186.6 | 37.6 | 1.2 | 24.8 | >1000 | 13.9 | 2.1 | 12.0 | >1000 | 11.8 | 895.4 |
| Example | 18 | 19 | 20 | 24 | 25 | 26 | 27 | 28 | 29 | 30 | 31 | 32 | 33 | 34 | 35 | 36 |
| $IC_{50}$ (nM) | 39.2 | 31.4 | 995.4 | 69.2 | 112.7 | 117.9 | 129.0 | 42.2 | >1000 | 31.7 | 6.4 | 31.7 | 32.4 | 102.1 | 21.6 | 698.2 |
| Example | 37 | 38 | 39 | 40 | 41 | 42 | 43 | 44 | 45 | 46 | 47 | 48 | 50 | 51 | 53 | 54 |
| $IC_{50}$ (nM) | 30.5 | 3.5 | 1.0 | 5.5 | 4.4 | 69.2 | 1.6 | 13.3 | 8.8 | 14.7 | 381.1 | 6.5 | 26.8 | >1000 | 89.4 | 30.7 |
| Example | 55 | 56 | 57 | 58 | 59 | 60 | 61 | 62 | 63 | 64 | 65 | 66 | 67 | 68 | 70 | 72 |
| $IC_{50}$ (nM) | 314.6 | 27.4 | 170.0 | >1000 | 60.0 | >1000 | 110.9 | 21.6 | 52.6 | 676.5 | 11.9 | 26.5 | 8.7 | 2.8 | 4.9 | 5.7 |

| Example | 75 | 76-A | 76-B | 77-A | 77-B | LY2606368 |
|---|---|---|---|---|---|---|
| $IC_{50}$ (nM) | 3.1 | 1.4 | 18.5 | 3.6 | 16.7 | 3.5 |

Therefore, as determined by MTT assay, the compound of Example 1 and its analogues have good inhibitory effect on the proliferation of HCC1806 cell.

Example 83

Determination of Inhibitory Effects of Compounds on the Proliferation of Human Pancreatic Cancer Cell SW1990 Using MTT Assay Newly revived SW1990 cells (purchased from Shanghai Fuheng Biology) were cultured and passaged for at least three generations before use. Cells were used at about 90% confluency for experiments. Cells were digested with trypsinase and centrifuged at 800 rpm for 5 minutes. The cell pellets were resuspended in fresh DMEM medium and cells were counted. Cells were seeded on 96-well cell culture plates at 5000 cells/well and incubated overnight at 37° C., 5% $CO_2$. The stock solutions of the test substances (including the test compounds and the reference compound) were serially diluted to 8 concentrations with DMSO at a ratio of 1:3. 5 µL of each serially diluted solutions was added to 120 µL of medium (diluted by 25 times) and mixed by shaking. The medium of cells cultured overnight was replaced by 195 µL/well of fresh medium and 5 µL/well of diluted medium containing test compounds. The cell culture plates were returned to incubator at 37° C. and 5% $CO_2$ for 5 days. At the end of the treatment the cell viability was determined by MTT colorimetric assay. Cell culture medium in each well was replaced by 100 µL/well of serum-free fresh medium containing MTT (0.5 mg/mL), and the culture was continued for additional 4 hours. Medium was then discarded and 100 µL/well of DMSO was added. The plates were shaken for 10 minutes in darkness and the absorbances were measured at wavelengths of 552/690 nm in a multi-function reader.

Data was analyzed by GraphPad Prism 6.0. The inhibitory effects of compounds on cell proliferation were plotted based on cell viability vs. the logarithm of compound concentration. Cell viability %=($OD_{compound}-OD_{background}$)/($OD_{DMSO}-OD_{background}$)×100. The $IC_{50}$ values were fitted by a sigmoidal dose response curve equation $Y=100/(1+10^{(Log C-Log IC_{50})})$, wherein C was the concentration of a compound.

Table 4 summarizes the inhibitory effect ($IC_{50}$) of compounds on the proliferation of human pancreatic cancer cell SW1990.

Therefore, as determined by MTT assay, the compound of Example 1 and its analogues have good inhibitory effect on the proliferation of SW1990 cell.

Example 84

Determination of Inhibitory Effects of the Compounds of the Disclosure on the Proliferation of Human Colon Cancer Cell LoVo Using MTT Assay Newly revived LoVo cells (purchased from Shanghai Cell Institute) were cultured and passaged for at least three generations before use. Cells were used at 90% confluence for experiment. Cells were digested with trypsinase and centrifuged at 800 rpm for 5 minutes and the supernatant was discarded. The cell pellets were resuspended in fresh RPMI1640 medium and counted. Cells were seeded on 96-well cell culture plates at 5000 cells/well and incubated overnight at 37° C., 5% $CO_2$. The stock solutions of the test substances (including the test compounds and the reference compound) were serially diluted to 8 concentrations with DMSO at a ratio of 1:3. 5 µL of each series diluted solutions was added to 120 µL of medium (diluted by 25 times) and mixed by shaking. The medium of the cells cultured overnight was replaced by 195 µL/well of fresh medium and 5 µL/well of diluted medium containing test compound. The cell culture plates were returned to incubator at 37° C. and 5% $CO_2$ for 4 days. At the end of treatment, the cell viability was determined by MTT colorimetric assay. Cell culture medium in each well was replaced by 100 µL/well of serum-free DMEM medium containing MTT (0.5 mg/mL), and the culture was continued for additional 4 hours. Medium was then discarded and 100 µL/well of DMSO was added. The plates were shaken for 10 minutes in darkness and the absorbance was measured at wavelengths of 552/690 nm in a multi-function reader.

Data was analyzed by GraphPad Prism 6.0. The inhibitory effects of compounds on cell proliferation were plotted based on cell viability vs. the logarithm of compound concentration. Cell viability %=($OD_{compound}-OD_{background}$)/($OD_{DMSO}-OD_{background}$)×100. The $IC_{50}$ values were fitted by a sigmoidal dose response curve equation $Y=100/(1+10^{(Log C-Log IC_{50})})$, wherein C was the concentration of a compound.

Table 5 summarizes the inhibitory effect ($IC_{50}$) of compounds on the proliferation of human colon cancer cell LoVo.

TABLE 4

| Example | 1 | 2 | 3 | 4 | 5 | 9 | 12 | 13 | 14 | 15 | 16 | 17 | 18 | 30 | LY2606368 |
|---|---|---|---|---|---|---|---|---|---|---|---|---|---|---|---|
| $IC_{50}$ (nM) | 6.3 | 84.9 | 50.7 | 122.6 | 287.4 | 1.2 | 10.1 | 1.9 | 6.1 | 809.1 | 11.8 | 615.2 | 19.6 | 19.1 | 3.3 |

TABLE 5

| Example | 1 | 6 | 7 | 9 | 10 | 11 | 14 | 19 | 20 | 24 | 25 | 26 | 27 | 28 | 29 | 31 |
|---|---|---|---|---|---|---|---|---|---|---|---|---|---|---|---|---|
| $IC_{50}$ (nM) | 15.5 | 192.4 | 30.1 | 4.4 | 23.0 | >1000 | 19.2 | 31.2 | >1000 | 70.8 | 103.7 | 102.7 | 83.8 | 42.5 | >1000 | 5.6 |
| Example | 32 | 33 | 34 | 35 | 36 | 37 | 38 | 39 | 40 | 41 | 42 | 43 | 44 | 45 | 46 | 47 |
| $IC_{50}$ (nM) | 25.6 | 26.0 | 64.9 | 21.2 | 807.2 | 28.8 | 3.2 | 1.0 | 6.6 | 5.1 | 66.6 | 1.6 | 18.0 | 9.5 | 13.3 | 533.3 |
| Example | 48 | 50 | 51 | 53 | 54 | 55 | 56 | 57 | 58 | 59 | 60 | 61 | 62 | 63 | 64 | 65 |
| $IC_{50}$ (nM) | 5.4 | 35.2 | >1000 | 72.0 | 16.2 | 153.1 | 22.3 | 105.5 | 913.2 | 60.8 | 553.8 | 97.0 | 18.0 | 40.2 | 322.9 | 7.3 |

| Example | 66 | 67 | 68 | 70 | 72 | 75 | 76-A | 76-B | 77-A | 77-B | LY2606368 |
|---|---|---|---|---|---|---|---|---|---|---|---|
| $IC_{50}$ (nM) | 14.3 | 9.1 | 2.3 | 3.6 | 6.0 | 3.2 | 2.1 | 17.8 | 3.1 | 17.3 | 5.56 |

Therefore, as determined by MTT assay, the compound of Example 1 and its analogues have good inhibitory effect on the proliferation of LoVo cell.

Having sufficiently described the disclosure, it will be recognized by those of ordinary skill in the art that the same implementation can be performed using various and equivalent conditions, formulations and other parameters without departing from the spirit of the disclosure or any embodiment thereof. All patents, applications and publications cited herein are incorporated by reference herein in their entirety.

What is claimed is:

1. A compound of Formula I, or a pharmaceutically acceptable salt, geometric isomer, enantiomer, diastereoisomer, racemate, solvate, or hydrate thereof:

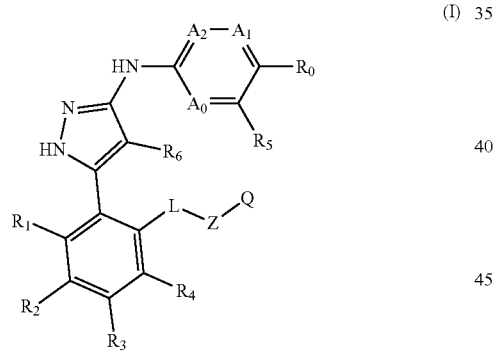

(I)

wherein,
$A_0$, $A_1$ and $A_2$ are independently selected from a group consisting of N and $CR^a$;
$R_0$ is selected from a group consisting of hydrogen, cyano, alkyl, alkoxy and carbonyl, wherein the alkyl, alkoxy and carbonyl is optionally substituted;
$R_1$ is selected from a group consisting of halo, hydroxy and an optionally substituted alkoxy;
$R_2$-$R_4$ are independently selected from a group consisting of hydrogen, halo, alkyl, alkoxy, nitro, carbonyl and acylamino, wherein the alkyl, alkoxy, carbonyl and acylamino is optionally substituted;
$R_5$ is selected from a group consisting of hydrogen, an optionally substituted alkyl and an optionally substituted alkoxy;
$R_6$ is selected from a group consisting of hydrogen, halo and an optionally substituted alkyl;
L is a bond, —C($R^b$)$_2$—, O, S or $NR^b$;

Z is a bond or alkylene;
Q is an optionally substituted heterocyclic group;
$R^a$ is selected from a group consisting of H, an optionally substituted alkyl and halo;
$R^b$ is independently selected from a group consisting of hydrogen and an optionally substituted alkyl.

2. The compound of claim 1, or a pharmaceutically acceptable salt, geometric isomer, enantiomer, diastereoisomer, racemate, solvate, or hydrate thereof, wherein,
$A_0$ and $A_1$ are N or CH; $A_2$ is N, CH or $CCH_3$;
$R_0$ is cyano, $C_{1-3}$ alkyl, $C_{1-3}$ alkoxy or halogenated $C_{1-3}$ alkyl;
$R_1$ is halo, hydroxy, $C_1$-$C_3$ alkoxy or halogenated $C_1$-$C_3$ alkoxy;
$R_2$-$R_4$ are independently hydrogen, halo, $C_1$-$C_3$ alkyl, $C_1$-$C_3$ alkoxy or halogenated $C_{1-3}$ alkyl;
$R_5$ is hydrogen;
$R_6$ is hydrogen;
L is $C_{1-3}$ alkylene, O, S or $NR^b$;
Z is $C_{1-3}$ alkylene;
Q is an unsubstituted saturated 3-7 membered heterocyclic group or a saturated 3-7 membered heterocyclic group substituted by 1-2 optionally substituted $C_{1-3}$ alkyls, wherein the substituent(s) are not at the connecting position.

3. The compound of claim 1, wherein the compound is a compound of Formula IIa or IIb or a pharmaceutically acceptable salt, geometric isomer, enantiomer, diastereoisomer, racemate, solvate, or hydrate thereof:

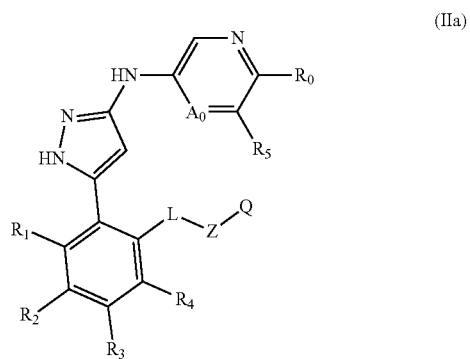

(IIa)

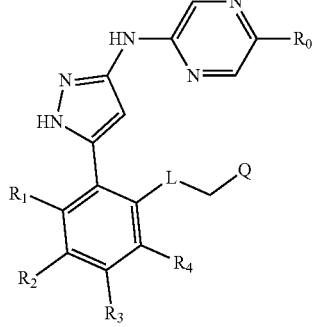

(IIb)

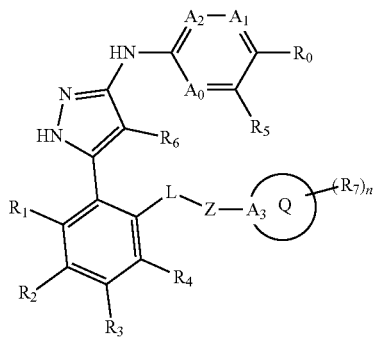

(IV)

wherein $R_0$ is cyano, $C_{1-3}$ alkyl, $C_{1-3}$ alkoxy or halogenated $C_{1-3}$ alkyl;

$R_1$ is halo, hydroxy, $C_1$-$C_3$ alkoxy or halogenated $C_1$-$C_3$ alkoxy;

$R_2$-$R_4$ are independently selected from the group consisting of hydrogen, halo, $C_1$-$C_3$ alkyl, $C_1$-$C_3$ alkoxy and halogenated $C_{1-3}$ alkyl;

L is $C_{1-3}$ alkylene, O, S or $NR^b$, wherein $R^b$ is hydrogen or $C_{1-3}$ alkyl;

Z is a bond or alkylene;

Q is an unsubstituted heterocyclic group or a substituted heterocyclic group with the substituent(s) not at the connecting position.

4. The compound of claim 1, wherein the compound is a compound of Formula III or a pharmaceutically acceptable salt, geometric isomer, enantiomer, diastereoisomer, racemate, solvate, or hydrate thereof:

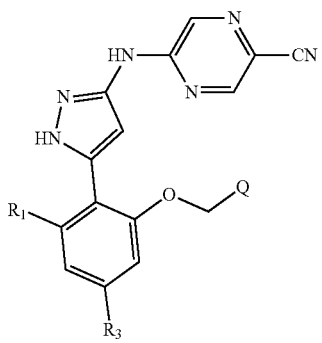

(III)

wherein $R_1$ is halo, hydroxy, $C_1$-$C_3$ alkoxy or halogenated $C_1$-$C_3$ alkoxy;

$R_3$ is hydrogen, halo, $C_1$-$C_3$ alkyl, $C_1$-$C_3$ alkoxy or halogenated $C_{1-3}$ alkyl;

Q is an unsubstituted saturated 3-7 membered heterocyclic group or a saturated 3-7 membered heterocyclic group substituted by 1-2 optionally substituted $C_{1-3}$ alkyls not at the connecting position.

5. The compound of claim 1, wherein the compound is a compound of Formula IV or a pharmaceutically acceptable salt, geometric isomer, enantiomer, diastereoisomer, racemate, solvate, or hydrate thereof:

wherein $A_0$, $A_1$, $A_2$, $R_0$-$R_6$, L, and Z are defined as in claim 1;

$A_3$ is CH or N;

ring Q is a 3-7 membered heterocyclic group;

$R_7$ is selected from a group consisting of halo, hydroxy, amino, carboxyl, an optionally substituted alkyl, an optionally substituted alkoxy, an optionally substituted aryl, an optionally substituted heteroaryl and an optionally substituted heterocyclic group;

n is an integer selected from the group consisting of 0-3.

6. The compound of claim 5, or a pharmaceutically acceptable salt, geometric isomer, enantiomer, diastereoisomer, racemate, solvate, or hydrate thereof, wherein:

$A_0$ and $A_1$ are N or CH; $A_2$ is N, CH or $CCH_3$;

$R_0$ is cyano, $C_{1-3}$ alkyl, $C_{1-3}$ alkoxy or halogenated $C_{1-3}$ alkyl;

$R_1$ is halo, hydroxy, $C_1$-$C_3$ alkoxy or halogenated $C_1$-$C_3$ alkoxy;

$R_2$-$R_4$ are independently hydrogen, halo, $C_1$-$C_3$ alkyl, $C_1$-$C_3$ alkoxy or halogenated $C_{1-3}$ alkyl;

$R_5$ is hydrogen;

$R_6$ is hydrogen;

L is $C_{1-3}$ alkylene, O, S or $NR^b$;

Z is $C_{1-3}$ alkylene;

ring Q is a saturated 3-7 membered heterocyclic group substituted by one or more $R_7$ groups;

$R_7$ is $C_{1-3}$ alkyl;

n is 0-2.

7. The compound of claim 5, or a pharmaceutically acceptable salt, geometric isomer, enantiomer, diastereoisomer, racemate, solvate, or hydrate thereof, wherein:

$A_0$ is N;

$A_1$ is N;

$A_2$ is CH;

$A_3$ is CH;

$R_0$ is cyano;

$R_1$ is halo, hydroxy, or $C_1$-$C_3$ alkoxy;

$R_2$ is H;

$R_3$ is hydrogen, halo, $C_1$-$C_3$ alkyl, or halogenated $C_{1-3}$ alkyl;

$R_4$ is H;

$R_5$ is hydrogen;

$R_6$ is hydrogen;

L is O;

Z is $C_{1-3}$ alkylene;

ring Q is an unsubstituted saturated 3-7 membered heterocyclic group; and n is 0.

8. The compound of claim 1, or a pharmaceutically acceptable salt, geometric isomer, diastereoisomer, racemate, solvate, or hydrate thereof, wherein the compound is selected from the group consisting of:

- (S)-5-((5-(2-methoxy-6-(morpholin-2-ylmethoxy)phenyl)-1H-pyrazol-3-yl)amino)pyrazine-2-carbonitrile;
- (S)-5-((5-(2-methoxy-6-(morpholin-2-ylmethoxy)phenyl)-1H-pyrazol-3-yl)amino)picolinonitrile;
- (R)-5-((5-(2-methoxy-6-(morpholin-2-ylmethoxy)phenyl)-1H-pyrazol-3-yl)amino)pyrazine-2-carbonitrile;
- (S)-5-((5-(2-methoxy-6-((4-methylmorpholin-2-yl)methoxy)phenyl)-1H-pyrazol-3-yl)amino)pyrazine-2-carbonitrile;
- (S)—N-(5-(2-methoxy-6-(morpholin-2-ylmethoxy)phenyl)-1H-pyrazol-3-yl)-5-(trifluoromethyl)pyrazin-2-amine;
- (S)—N-(5-(2-methoxy-6-(morpholin-2-ylmethoxy)phenyl)-1H-pyrazol-3-yl)-5-methylpyrazin-2-amine;
- (R)-5-((5-(2-methoxy-6-(morpholin-3-ylmethoxy)phenyl)-1H-pyrazol-3-yl)amino)pyrazine-2-carbonitrile;
- (S)-5-((5-(2-methoxy-6-((tetrahydro-2H-pyran-2-yl)methoxy)phenyl)-1H-pyrazol-3-yl)amino)pyrazine-2-carbonitrile;
- (S)-5-((5-(2-methoxy-6-(piperidin-3-ylmethoxy)phenyl)-1H-pyrazol-3-yl)amino)pyrazine-2-carbonitrile;
- (S)-5-((5-(2-methoxy-6-(piperazin-2-ylmethoxy)phenyl)-1H-pyrazol-3-yl)amino)pyrazine-2-carbonitrile;
- (S)-5-((5-(2-methoxy-6-((1-methylpiperazin-2-yl)methoxy)phenyl)-1H-pyrazol-3-yl)amino)pyrazine-2-carbonitrile;
- 5-((5-(2-methoxy-6-(piperidin-4-ylmethoxy)phenyl)-1H-pyrazol-3-yl)amino)pyrazine-2-carbonitrile;
- (S)-5-((5-(2-methoxy-6-(pyrrolidin-3-ylmethoxy)phenyl)-1H-pyrazol-3-yl)amino)pyrazine-2-carbonitrile;
- (S)-5-((5-(4-fluoro-2-methoxy-6-(morpholin-2-ylmethoxy)phenyl)-1H-pyrazol-3-yl)amino)pyrazine-2-carbonitrile;
- (S)-5-((5-(3-chloro-2-methoxy-6-(morpholin-2-ylmethoxy)phenyl)-1H-pyrazol-3-yl)amino)pyrazine-2-carbonitrile;
- (S)-5-((5-(4-chloro-2-methoxy-6-(morpholin-2-ylmethoxy)phenyl)-1H-pyrazol-3-yl)amino)pyrazine-2-carbonitrile;
- (S)-5-((5-(3-chloro-6-methoxy-2-(morpholin-2-ylmethoxy)phenyl)-1H-pyrazol-3-yl)amino)pyrazine-2-carbonitrile;
- (S)-5-((5-(4-bromo-2-methoxy-6-(morpholin-2-ylmethoxy)phenyl)-1H-pyrazol-3-yl)amino)pyrazine-2-carbonitrile;
- (S)-5-((5-(2-methoxy-6-(morpholin-2-ylmethoxy)-4-(trifluoromethyl)phenyl)-1H-pyrazol-3-yl)amino)pyrazine-2-carbonitrile;
- (S)-5-((5-(2-(morpholin-2-ylmethoxy)-6-(trifluoromethoxy)phenyl)-1H-pyrazol-3-yl)amino)pyrazine-2-carbonitrile;
- (S)-5-((5-(2-methoxy-6-((morpholin-2-ylmethyl)amino)phenyl)-1H-pyrazol-3-yl)amino)pyrazine-2-carbonitrile;
- (S)-5-((5-(2-methoxy-6-(methyl (morpholin-2-ylmethyl)amino)phenyl)-1H-pyrazol-3-yl)amino)pyrazine-2-carbonitrile;
- 5-((5-(2-methoxy-6-(2-(piperazin-1-yl)ethyl)phenyl)-1H-pyrazol-3-yl)amino)pyrazine-2-carbonitrile;
- (S)-6-((5-(2-methoxy-6-(piperidin-3-ylmethoxy)phenyl)-1H-pyrazol-3-yl)amino)nicotinonitrile;
- (S)-6-((5-(2-methoxy-6-(piperidin-3-ylmethoxy)phenyl)-1H-pyrazol-3-yl)amino)pyridazine-3-carbonitrile;
- (S)-5-methoxy-N-(5-(2-methoxy-6-(piperidin-3-ylmethoxy)phenyl)-1H-pyrazol-3-yl)pyrazin-2-amine;
- (S)-5-ethyl-N-(5-(2-methoxy-6-(piperidin-3-ylmethoxy)phenyl)-1H-pyrazol-3-yl)pyrazin-2-amine;
- (S)-5-((5-(2-methoxy-6-(piperidin-3-ylmethoxy)phenyl)-1H-pyrazol-3-yl)amino)-3-methylpyrazine-2-carbonitrile;
- (S)-5-((5-(2-methoxy-6-(piperidin-3-ylmethoxy)phenyl)-1H-pyrazol-3-yl)amino)-6-methylpyrazine-2-carbonitrile;
- 5-((5-(2-methoxy-6-(piperidin-4-yloxy)phenyl)-1H-pyrazol-3-yl)amino)pyrazine-2-carbonitrile;
- 5-((5-(2-(azetidin-3-ylmethoxy)-6-methoxyphenyl)-1H-pyrazol-3-yl)amino)pyrazine-2-carbonitrile;
- (S)-5-((5-(2-methoxy-6-((1-methylpiperidin-3-yl)methoxy)phenyl)-1H-pyrazol-3-yl)amino)pyrazine-2-carbonitrile;
- (R)-5-((5-(2-methoxy-6-(piperidin-2-ylmethoxy)phenyl)-1H-pyrazol-3-yl)amino)pyrazine-2-carbonitrile;
- (S)-5-((5-(2-methoxy-6-((tetrahydro-2H-pyran-3-yl)methoxy)phenyl)-1H-pyrazol-3-yl)amino)pyrazine-2-carbonitrile;
- (S)-5-((5-(2-ethoxy-6-(piperidin-3-ylmethoxy)phenyl)-1H-pyrazol-3-yl)amino)pyrazine-2-carbonitrile;
- (S)-5-((5-(2-isopropoxy-6-(piperidin-3-ylmethoxy)phenyl)-1H-pyrazol-3-yl)amino)pyrazine-2-carbonitrile;
- (S)-5-((5-(3-fluoro-2-methoxy-6-(piperidin-3-ylmethoxy)phenyl)-1H-pyrazol-3-yl)amino)pyrazine-2-carbonitrile;
- (S)-5-((5-(4-fluoro-2-methoxy-6-(piperidin-3-ylmethoxy)phenyl)-1H-pyrazol-3-yl)amino)pyrazine-2-carbonitrile;
- (S)-5-((5-(4-fluoro-2-methoxy-6-(pyrrolidin-3-ylmethoxy)phenyl)-1H-pyrazol-3-yl)amino)pyrazine-2-carbonitrile;
- (S)-5-((5-(4-chloro-2-methoxy-6-(piperidin-3-ylmethoxy)phenyl)-1H-pyrazol-3-yl)amino)pyrazine-2-carbonitrile;
- (S)-5-((5-(4-bromo-2-methoxy-6-(piperidin-3-ylmethoxy)phenyl)-1H-pyrazol-3-yl)amino)pyrazine-2-carbonitrile;
- (S)-5-((5-(2-methoxy-3-methyl-6-(piperidin-3-ylmethoxy)phenyl)-1H-pyrazol-3-yl)amino)pyrazine-2-carbonitrile;
- (S)-5-((5-(2-methoxy-4-methyl-6-(piperidin-3-ylmethoxy)phenyl)-1H-pyrazol-3-yl)amino)pyrazine-2-carbonitrile;
- (S)-5-((5-(2-methoxy-4-methyl-6-(morpholin-2-ylmethoxy)phenyl)-1H-pyrazol-3-yl)amino)pyrazine-2-carbonitrile;
- (S)-5-((5-(2-methoxy-6-(piperidin-3-ylmethoxy)-4-(trifluoromethyl)phenyl)-1H-pyrazol-3-yl)amino)pyrazine-2-carbonitrile;
- (S)-5-((5-(2-fluoro-6-(piperidin-3-ylmethoxy)phenyl)-1H-pyrazol-3-yl)amino)pyrazine-2-carbonitrile;
- (S)-5-((5-(2-chloro-6-(piperidin-3-ylmethoxy)phenyl)-1H-pyrazol-3-yl)amino)pyrazine-2-carbonitrile;
- (S)-5-((5-(2-hydroxy-6-(piperidin-3-ylmethoxy)phenyl)-1H-pyrazol-3-yl)amino)pyrazine-2-carbonitrile;
- (S)-5-((5-(2-((4,4-dimethylpiperidin-3-yl)methoxy)-6-methoxyphenyl)-1H-pyrazol-3-yl)amino)pyrazine-2-carbonitrile;
- 5-((5-(2-((4,4-dimethylpiperidin-3-yl)methoxy)-4-fluoro-6-methoxyphenyl)-1H-pyrazol-3-yl)amino)pyrazine-2-carbonitrile;
- (S)-5-((5-(2-methoxy-6-(piperidin-3-ylmethoxy)phenyl)-4-methyl-1H-pyrazol-3-yl)amino)pyrazine-2-carbonitrile;

(S)-5-((4-bromo-5-(2-methoxy-6-(piperidin-3-yl-methoxy)phenyl)-1H-pyrazol-3-yl)amino)pyrazine-2-carbonitrile;

5-((5-(2-(azetidin-3-ylmethoxy)-6-fluorophenyl)-1H-pyrazol-3-yl)amino)pyrazine-2-carbonitrile;

(S)-5-((5-(2-fluoro-6-(pyrrolidin-3-ylmethoxy)phenyl)-1H-pyrazol-3-yl)amino)pyrazine-2-carbonitrile;

(S)-5-((5-(2-fluoro-6-(morpholin-2-ylmethoxy)phenyl)-1H-pyrazol-3-yl)amino)pyrazine-2-carbonitrile;

(S)-5-((5-(2,4-difluoro-6-(piperidin-3-ylmethoxy)phenyl)-1H-pyrazol-3-yl)amino)pyrazine-2-carbonitrile;

(S)-5-((5-(4-chloro-2-fluoro-6-(piperidin-3-ylmethoxy)phenyl)-1H-pyrazol-3-yl)amino)pyrazine-2-carbonitrile;

(S)-5-((5-(4-chloro-2-fluoro-6-(morpholin-2-ylmethoxy)phenyl)-1H-pyrazol-3-yl)amino)pyrazine-2-carbonitrile;

(S)-5-((5-(4-bromo-2-fluoro-6-(piperidin-3-ylmethoxy)phenyl)-1H-pyrazol-3-yl)amino)pyrazine-2-carbonitrile;

(S)-5-((5-(4-bromo-2-fluoro-6-(morpholin-2-ylmethoxy)phenyl)-1H-pyrazol-3-yl)amino)pyrazine-2-carbonitrile;

5-((5-(2-(azetidin-3-ylmethoxy)-6-fluoro-4-methylphenyl)-1H-pyrazol-3-yl)amino)pyrazine-2-carbonitrile;

(S)-5-((5-(2-fluoro-4-methyl-6-(pyrrolidin-3-ylmethoxy)phenyl)-1H-pyrazol-3-yl)amino)pyrazine-2-carbonitrile;

(S)-5-((5-(2-fluoro-4-methyl-6-(piperidin-3-ylmethoxy)phenyl)-1H-pyrazol-3-yl)amino)pyrazine-2-carbonitrile;

(S)-5-((5-(2-fluoro-4-methyl-6-(morpholin-2-ylmethoxy)phenyl)-1H-pyrazol-3-yl)amino)pyrazine-2-carbonitrile;

(R)-5-((5-(2-methoxy-6-(pyrrolidin-2-ylmethoxy)phenyl)-1H-pyrazol-3-yl)amino)pyrazine-2-carbonitrile;

(R)-5-((5-(4-fluoro-2-methoxy-6-(pyrrolidin-2-ylmethoxy)phenyl)-1H-pyrazol-3-yl)amino)pyrazine-2-carbonitrile;

5-((5-(2-(azetidin-3-ylmethoxy)-4-chloro-6-methoxyphenyl)-1H-pyrazol-3-yl)amino)pyrazine-2-carbonitrile;

(S)-5-((5-(4-chloro-2-methoxy-6-(pyrrolidin-3-ylmethoxy)phenyl)-1H-pyrazol-3-yl)amino)pyrazine-2-carbonitrile;

5-((5-(2-(azetidin-3-ylmethoxy)-4-bromo-6-methoxyphenyl)-1H-pyrazol-3-yl)amino)pyrazine-2-carbonitrile;

(S)-5-((5-(4-bromo-2-methoxy-6-(pyrrolidin-3-ylmethoxy)phenyl)-1H-pyrazol-3-yl)amino)pyrazine-2-carbonitrile;

(R)-5-((5-(4-bromo-2-methoxy-6-(pyrrolidin-2-ylmethoxy)phenyl)-1H-pyrazol-3-yl)amino)pyrazine-2-carbonitrile;

5-((5-(2-(azetidin-3-ylmethoxy)-6-methoxy-4-methylphenyl)-1H-pyrazol-3-yl)amino)pyrazine-2-carbonitrile;

(S)-5-((5-(2-methoxy-4-methyl-6-(pyrrolidin-3-ylmethoxy)phenyl)-1H-pyrazol-3-yl)amino)pyrazine-2-carbonitrile;

(R)-5-((5-(2-methoxy-4-methyl-6-(pyrrolidin-2-ylmethoxy)phenyl)-1H-pyrazol-3-yl)amino)pyrazine-2-carbonitrile;

(S)-5-((5-(4-ethyl-2-methoxy-6-(piperidin-3-ylmethoxy)phenyl)-1H-pyrazol-3-yl)amino)pyrazine-2-carbonitrile;

(S)-5-((5-(2-methoxy-6-(thiomorpholin-2-ylmethoxy)phenyl)-1H-pyrazol-3-yl)amino)pyrazine-2-carbonitrile and (R)-5-((5-(2-methoxy-6-(thiomorpholin-2-ylmethoxy)phenyl)-1H-pyrazol-3-yl)amino)pyrazine-2-carbonitrile;

(S)-5-((5-(4-fluoro-2-methoxy-6-(thiomorpholin-2-ylmethoxy)phenyl)-1H-pyrazol-3-yl)amino)pyrazine-2-carbonitrile and (R)-5-((5-(4-fluoro-2-methoxy-6-(thiomorpholin-2-ylmethoxy)phenyl)-1H-pyrazol-3-yl)amino)pyrazine-2-carbonitrile;

(S)-5-((5-(4-chloro-2-methoxy-6-(thiomorpholin-2-ylmethoxy)phenyl)-1H-pyrazol-3-yl)amino)pyrazine-2-carbonitrile and (R)-5-((5-(4-chloro-2-methoxy-6-(thiomorpholin-2-ylmethoxy)phenyl)-1H-pyrazol-3-yl)amino)pyrazine-2-carbonitrile;

(S)-5-((5-(4-bromo-2-methoxy-6-(thiomorpholin-2-ylmethoxy)phenyl)-1H-pyrazol-3-yl)amino)pyrazine-2-carbonitrile and (R)-5-((5-(4-bromo-2-methoxy-6-(thiomorpholin-2-ylmethoxy)phenyl)-1H-pyrazol-3-yl)amino)pyrazine-2-carbonitrile;

(S)-5-((5-(2-methoxy-4-methyl-6-(thiomorpholin-2-ylmethoxy)phenyl)-1H-pyrazol-3-yl)amino)pyrazine-2-carbonitrile and (R)-5-((5-(2-methoxy-4-methyl-6-(thiomorpholin-2-ylmethoxy)phenyl)-1H-pyrazol-3-yl)amino)pyrazine-2-carbonitrile;

or a pharmaceutically acceptable salt, geometric isomer, enantiomer, diastereoisomer, racemate, solvate, or hydrate thereof.

9. A pharmaceutical composition comprising the compound of claim 1, or a pharmaceutically acceptable salt, geometric isomer, enantiomer, diastereoisomer, racemate, solvate, or hydrate thereof, and a pharmaceutically acceptable carrier.

10. The pharmaceutical composition of claim 9, wherein the pharmaceutical composition further comprises at least one existing anticancer agent or a pharmaceutically acceptable salt thereof.

11. The compound of claim 1, or a pharmaceutically acceptable salt, geometric isomer, enantiomer, diastereoisomer, racemate, solvate, or hydrate thereof, wherein, $R^a$ is H or $C_{1-3}$ alkyl;

$R_0$ is cyano, $C_{1-3}$ alkyl, $C_{1-3}$ alkoxy or halogenated $C_{1-3}$ alkyl;

$R_1$ is halo, hydroxy, $C_{1-3}$ alkoxy or halogenated $C_{1-3}$ alkoxy;

$R_2$-$R_4$ are independently selected from a group consisting of hydrogen, halo, $C_1$-$C_3$ alkyl and halogenated $C_{1-3}$ alkyl;

$R_5$ is hydrogen or $C_1$-$C_3$ alkyl;

$R_6$ is hydrogen or $C_1$-$C_3$ alkyl;

L is $C_{1-3}$ alkylene, O, S or $NR^b$, $R^b$ is hydrogen or $C_{1-3}$ alkyl;

Z is $C_{1-3}$ alkylene; and

Q is unsubstituted saturated 3-7 membered heterocyclic group or a saturated 3-7 membered heterocyclic group substituted by 1-2 optionally substituted $C_{1-3}$ alkyls, wherein the substituent(s) are not at the connecting position.

12. The compound of claim 3, or a pharmaceutically acceptable salt, geometric isomer, enantiomer, diastereoisomer, racemate, solvate, or hydrate thereof, wherein Q is an unsubstituted saturated 3-7 membered heterocyclic group or a saturated 3-7 membered heterocyclic group substituted by 1-2 optionally substituted $C_{1-3}$ alkyls.

13. The compound of claim 3, or a pharmaceutically acceptable salt, geometric isomer, enantiomer, diastereoisomer, racemate, solvate, or hydrate thereof, wherein Q is selected from the group consisting of:

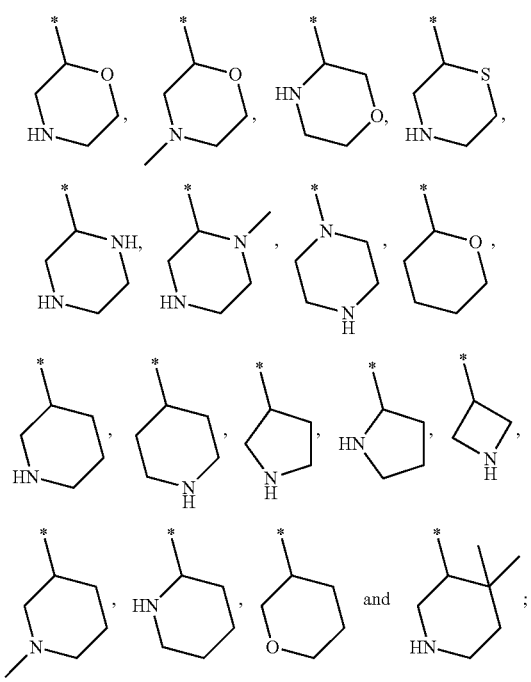

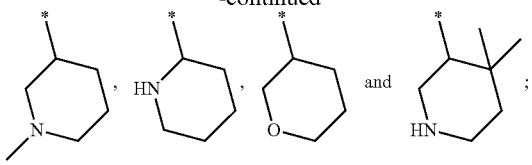

wherein * is the connecting position of Q to the rest of the compound.

14. The compound of claim 4, or a pharmaceutically acceptable salt, geometric isomer, enantiomer, diastereoisomer, racemate, solvate, or hydrate thereof, wherein Q is selected from the group consisting of:

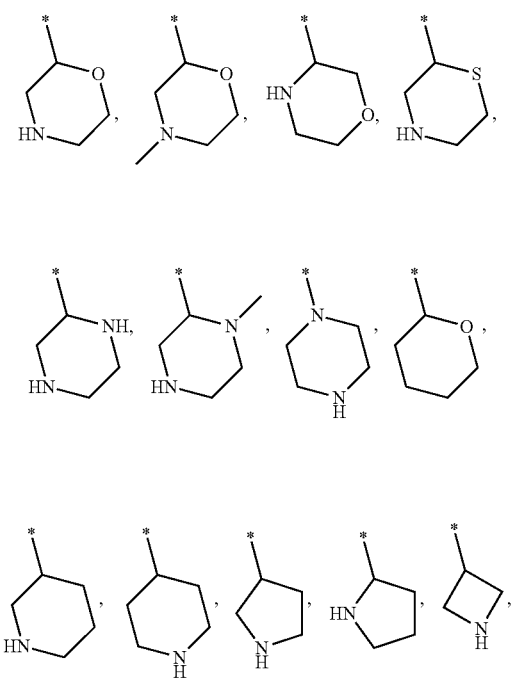

wherein * is the connecting position of Q to the rest of the compound.

15. A method for treating cancer, comprising administering to a subject in need thereof an effective amount of a compound of claim 1, or a pharmaceutically acceptable salt, geometric isomer, enantiomer, diastereoisomer, racemate, solvate, or hydrate thereof, or a pharmaceutical composition comprising the compound or a pharmaceutically acceptable salt, geometric isomer, enantiomer, diastereoisomer, racemate, solvate, or hydrate thereof.

16. The method of claim 15, wherein the cancer is selected from the group consisting of: liver cancer, melanoma, Hodgkin's disease, non-Hodgkin's lymphoma, acute lymphocytic leukemia, chronic lymphocytic leukemia, multiple myeloma, neuroblastoma, breast cancer, ovarian cancer, lung cancer, Wilms tumor, cervical cancer, testicular cancer, soft tissue sarcoma, primary macroglobulinemia, bladder cancer, chronic myeloid leukemia, primary brain cancer, malignant melanoma, small cell lung cancer, gastric cancer, colon cancer, malignant pancreatic islet tumor, malignant carcinoid cancer, choriocarcinoma, mycosis fungoides, head and neck cancer, osteogenic sarcoma, pancreatic cancer, acute myeloid leukemia, hairy cell leukemia, rhabdomyosarcoma, Kaposi's sarcoma, urogenital tumors, thyroid cancer, esophageal cancer, malignant hypercalcemia, cervical hyperplasia, renal cell carcinoma, endometrial cancer, polycythemia vera, idiopathic thrombocythemia, adrenocortical carcinoma, skin cancer and prostate cancer.

17. The method of claim 15, wherein the subject is further administered with at least one known existing anticancer agent or a pharmaceutically acceptable salt thereof, and/or is treated in combination with radiotherapy.

18. The method of claim 17, wherein the existing anticancer agent(s) are one or more anticancer agents selected from the group consisting of: busulfan, melphalan, chlorambucil, cyclophosphamide, ifosfamide, temozolomide, bendamustine, cis-platin, mitomycin C, bleomycin, carboplatin, camptothecin, irinotecan, topotecan, doxorubicin, epirubicin, aclarubicin, mitoxantrone, methylhydroxy ellipticine, etoposide, 5-azacytidine, gemcitabine, 5-fluorouracil, capecitabine, methotrexate, 5-fluoro-2'-deoxy-uridine, fludarabine, nelarabine, ara-C, pralatrexate, pemetrexed, hydroxyurea, thioguanine, colchicine, vinblastine, vincristine, vinorelbine, paclitaxel, ixabepilone, cabazitaxel, docetaxel, mAb, panitumumab, necitumumab, nivolumab, pembrolizumab, ramucirumab, bevacizumab, pertuzumab, trastuzumab, cetuximab, obinutuzumab, ofatumumab, rituximab, alemtuzumab, ibritumomab, tositumomab, brentuximab, daratumumab, elotuzumab, T-DM1, Ofatumumab, Dinutuximab, Blinatumomab, ipilimumab, avastin, herceptin, mabthera, imatinib, gefitinib, erlotinib, osimertinib, afatinib, ceritinib, alectinib, crizotinib, erlotinib, lapatinib, sorafenib, sunitinib, nilotinib, dasatinib, pazopanib, torisel, everolimus, vorinostat, romidepsin, panobinostat, belinostat, tamoxifen, letrozole, fulvestrant, mitoguazone, octreotide, retinoic acid, arsenic trioxide, zoledronic acid, bortezomib, carfilzomib, Ixazomib, vismodegib, sonidegib, denosumab, thalidomide, lenalidomide, Venetoclax, Aldesleukin (recombinant human interleukin-2), sipueucel-T (prostate cancer therapeutic vaccine), Palbociclib, Olaparib, Niraparib, Rucaparib, Talazoparib and Senaparib.

19. The pharmaceutical composition of claim 10, wherein the at least one existing anticancer agent is selected from the group consisting of busulfan, melphalan, chlorambucil, cyclophosphamide, ifosfamide, temozolomide, bendamustine, cis-platin, mitomycin C, bleomycin, carboplatin, camptothecin, irinotecan, topotecan, doxorubicin, epirubicin, aclarubicin, mitoxantrone, methylhydroxy ellipticine, etoposide, 5-azacytidine, gemcitabine, 5-fluorouracil, capecitabine, methotrexate, 5-fluoro-2'-deoxy-uridine, fludarabine, nelarabine, ara-C, pralatrexate, pemetrexed, hydroxyurea, thioguanine, colchicine, vinblastine, vincristine, vinorelbine, paclitaxel, ixabepilone, cabazitaxel, docetaxel, mAb, panitumumab, necitumumab, nivolumab, pembrolizumab, ramucirumab, bevacizumab, pertuzumab, trastuzumab, cetuximab, obinutuzumab, ofatumumab, rituximab, alemtuzumab, ibritumomab, tositumomab, brentuximab, daratumumab, elotuzumab, T-DM1, Ofatumumab, Dinutuximab, Blinatumomab, ipilimumab, avastin, herceptin, mabthera, imatinib, gefitinib, erlotinib, osimertinib, afatinib, ceritinib, alectinib, crizotinib, erlotinib, lapatinib, sorafenib, sunitinib, nilotinib, dasatinib, pazopanib, torisel, everolimus, vorinostat, romidepsin, panobinostat, belinostat, tamoxifen, letrozole, fulvestrant, mitoguazone, octreotide, retinoic acid, arsenic trioxide, zoledronic acid, bortezomib, carfilzomib, Ixazomib, vismodegib, sonidegib, denosumab, thalidomide, lenalidomide, Venetoclax, Aldesleukin (recombinant human interleukin-2), sipueucel-T (prostate cancer therapeutic vaccine), Palbociclib, Olaparib, Niraparib, Rucaparib, Talazoparib and Senaparib.

20. The pharmaceutical composition of claim 9, wherein the compound is a compound of Formula III or a pharmaceutically acceptable salt, geometric isomer, enantiomer, diastereoisomer, racemate, solvate, or hydrate thereof:

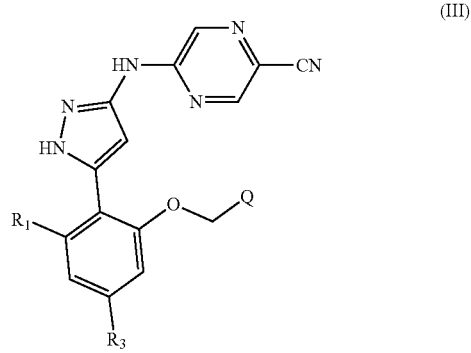

(III)

wherein $R_1$ is halo, hydroxy, $C_1$-$C_3$ alkoxy or halogenated $C_1$-$C_3$ alkoxy;

$R_3$ is hydrogen, halo, $C_1$-$C_3$ alkyl, $C_1$-$C_3$ alkoxy or halogenated $C_{1-3}$ alkyl;

Q is an unsubstituted saturated 3-7 membered heterocyclic group or a saturated 3-7 membered heterocyclic group substituted by 1-2 optionally substituted $C_{1-3}$ alkyls not at the connecting position.

* * * * *